United States Patent
Kim et al.

(10) Patent No.: US 11,737,123 B2
(45) Date of Patent: Aug. 22, 2023

(54) COMMUNICATION BASED ON A MULTI-RESOURCE UNIT IN WIRELESS LOCAL AREA NETWORK SYSTEM

(71) Applicant: SAMSUNG ELECTRONICS CO., LTD., Suwon-si (KR)

(72) Inventors: Myeongjin Kim, Seongnam-si (KR); Wookbong Lee, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 17/237,405

(22) Filed: Apr. 22, 2021

(65) Prior Publication Data

US 2021/0337546 A1  Oct. 28, 2021

Related U.S. Application Data

(60) Provisional application No. 63/042,664, filed on Jun. 23, 2020, provisional application No. 63/014,213, filed on Apr. 23, 2020.

(30) Foreign Application Priority Data

Dec. 15, 2020 (KR) .................. 10-2020-0175835

(51) Int. Cl.
*H04W 72/04* (2023.01)
*H04W 72/53* (2023.01)
(Continued)

(52) U.S. Cl.
CPC ....... *H04W 72/53* (2023.01); *H04W 72/0453* (2013.01); *H04W 72/21* (2023.01)

(58) Field of Classification Search
CPC ......... H04W 72/0453; H04W 72/0413; H04W 72/0493; H04L 5/0094; H04L 5/0039
See application file for complete search history.

(56) References Cited

U.S. PATENT DOCUMENTS 9,722,740 B2  8/2017  Suh et al.
10,200,228 B2  2/2019  Wu et al.
(Continued)

FOREIGN PATENT DOCUMENTS

KR  10-2017-0016978  2/2017
WO     2017030404   2/2017

OTHER PUBLICATIONS

European Search Report dated Oct. 14, 2021 in corresponding European Application No. 21170010.9 (9 pages).
(Continued)

*Primary Examiner* — Brian D Nguyen
(74) *Attorney, Agent, or Firm* — F. Chau & Associates, LLC

(57) ABSTRACT

Systems and methods for communicating are described. According to some embodiments, a first device, with at least one second device in a wireless local area network (WLAN) system may allocate at least one resource unit (RU) to the at least one second device and generate an RU allocation subfield defining the allocated at least one RU. In some examples, the allocation of the at least one RU includes allocating a single RU or a multi-RU to a second device and setting a maximum of one multiplexed second device in a single RU or a multi-RU corresponding to less than 242 subcarriers.

20 Claims, 48 Drawing Sheets

(51) Int. Cl.
*H04W 72/0453* (2023.01)
*H04W 72/21* (2023.01)

(56) References Cited

U.S. PATENT DOCUMENTS

| | | | |
|---|---|---|---|
| 10,218,553 B2 | 2/2019 | Seok | |
| 10,263,821 B2 | 4/2019 | Lee et al. | |
| 10,306,667 B2 | 5/2019 | Kim et al. | |
| 10,505,691 B2 | 12/2019 | Choi et al. | |
| 10,616,017 B2 | 4/2020 | Liu et al. | |
| 2016/0057657 A1 | 2/2016 | Seok | |
| 2016/0113009 A1 | 4/2016 | Seok | |
| 2021/0212035 A1* | 7/2021 | Son | H04L 5/0044 |
| 2021/0281384 A1* | 9/2021 | Hu | H04L 5/0094 |
| 2021/0314922 A1* | 10/2021 | Lim | H04L 5/0091 |
| 2022/0345275 A1* | 10/2022 | Hu | H04L 5/0094 |
| 2022/0345276 A1* | 10/2022 | Redlich | H04W 72/1289 |
| 2022/0353015 A1* | 11/2022 | Yu | H04L 5/0044 |
| 2022/0361170 A1* | 11/2022 | Park | H04L 27/2621 |
| 2022/0399970 A1* | 12/2022 | Kim | H04L 5/0046 |

OTHER PUBLICATIONS

Ross, et al., "Further discussion on RU allocation subfield in EHT-SIG", IEEE Draft; 11-20-0609-00-00BE-FURTHER-DISCUSSION-ON-RU-ALLOCATION-SUBFIELD-IN-EHT-SIG, IEEE—Samentor,Piscataway, NJ, USA, vol. 802.11.EHT; 802.11be Apr. 22, 2020 (Apr. 22, 2020), pp. 1-22, XP068167588; Retrieved from the Internet: URL: http://mentor.ieee.org/802.11/dcn/20/11-20-0609-00-00be-further-discussion-on-ru-allocation-subfield-in-eht-sig.pptx.

Ross, et al., "Multi-RU Combination and Signaling", IEEE Draft; 11-20-0400-00-00BE-MULTI-RU-COMBINATION-AND-SIGNALING-FOR-OFDMA-TRANSMISSION, IEEE—SA Mentor,Piscataway, NJ USA, vol. 802.11.EHT; 802.11be Mar. 16, 2020 (Mar. 16, 2020), pp. 1-17, XP068167093; Retrieved from the Internet: URL:https://mentor.ieee.org/802.11/dcn/20/11-20-0400-00-00be-multi-ru-combination-and-signaling-for-ofdma-transmission. pptx.

* cited by examiner

FIG. 20                                          T1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 (00000000) | 26 | 26 | 26 | 26 | 26 | 26 | 26 | 26 | 26 | 1 |
| 1 (00000001) | 26 | 26 | 26 | 26 | 26 | 26 | 26 | 52 | | 1 |
| 2 (00000010) | 26 | 26 | 26 | 26 | 26 | 52 | | 26 | 26 | 1 |
| 3 (00000011) | 26 | 26 | 26 | 26 | 26 | 52 | | 52 | | 1 |
| 4 (00000100) | 26 | 26 | 52 | | 26 | 26 | 26 | 26 | 26 | 1 |
| 5 (00000101) | 26 | 26 | 52 | | 26 | 26 | 26 | 52 | | 1 |
| 6 (00000110) | 26 | 26 | 52 | | 26 | 52 | | 26 | 26 | 1 |
| 7 (00000111) | 26 | 26 | 52 | | 26 | 52 | | 52 | | 1 |
| 8 (00001000) | 52 | | 26 | 26 | 26 | 26 | 26 | 26 | 26 | 1 |
| 9 (00001001) | 52 | | 26 | 26 | 26 | 26 | 26 | 52 | | 1 |
| 10 (00001010) | 52 | | 26 | 26 | 26 | 52 | | 26 | 26 | 1 |
| 11 (00001011) | 52 | | 26 | 26 | 26 | 52 | | 52 | | 1 |
| 96–111 ($0110y_1y_0z_1z_0$) | 106 | | | | – | | | 106 | | 16 |
| 112 (01110000) | 52 | | 52 | | – | | 52 | | 52 | 1 |
| 113 (01110001) | 242-tone RU empty (with zero users) | | | | | | | | | 1 |
| 114 (01110010) | 484-tone RU ; contributes zero User fields to the User specific field in the same HE-SIG-B content channel as this RU Allocation subfield | | | | | | | | | 1 |
| 115 (01110011) | 996-tone RU ; contributes zero User fields to the User specific field in the same HE-SIG-B content channel as this RU Allocation subfield | | | | | | | | | 1 |
| 116–119 ($011101x_1x_0$) | Reserved | | | | | | | | | 4 |
| 120–127 ($01111y_2y_1y_0$) | Reserved | | | | | | | | | 8 |
| 128–191 ($10y_2y_1y_0z_2z_1z_0$) | 106 | | | | 26 | | | 106 | | 64 |
| 192–199 ($11000y_2y_1y_0$) | 242 | | | | | | | | | 8 |
| 200–207 ($11001y_2y_1y_0$) | 484 | | | | | | | | | 8 |
| 208–215 ($11010y_2y_1y_0$) | 996 | | | | | | | | | 8 |
| 216–223 ($11011y_2y_1y_0$) | Reserved | | | | | | | | | 8 |
| 224–255 ($111x_4x_3x_2x_1x_0$) | Reserved | | | | | | | | | 32 |

| #1 | #2 | #3 | #4 | #5 | #6 | #7 | #8 | #9 |
|---|---|---|---|---|---|---|---|---|
| 26 | 26+52 multi-RU | | | 26 | 26 | 26 | 26 | 26 |
| 26 | 26+52 multi-RU | | | 26 | 26 | 26 | 52 | |
| 26 | 26+52 multi-RU | | | 26 | 52 | | 26 | 26 |
| 26 | 26+52 multi-RU | | | 26 | 52 | | 52 | |
| 26 | 26 | 26 | 26 | 26 | 52+26 multi-RU | | | 26 |
| 26 | 26 | 52 | | 26 | 52+26 multi-RU | | | 26 |
| 52 | | 26 | 26 | 26 | 52+26 multi-RU | | | 26 |
| 52 | | 52 | | 26 | 52+26 multi-RU | | | 26 |
| 26 | 26+52 multi-RU | | | 26 | 106 | | | |
| 106 | | | | 26 | 52+26 multi-RU | | | 26 |
| 106+26 multi-RU | | | | 26 | 26 | 26 | 26 | |
| 106+26 multi-RU | | | | 26 | 26 | 26 | 52 | |
| 106+26 multi-RU | | | | 52 | | 26 | 26 | |
| 106+26 multi-RU | | | | 52 | | 52 | | |
| 106+26 multi-RU | | | | 26+106 multi-RU | | | | |
| 26 | 26 | 26 | 26 | 26+106 multi-RU | | | | |
| 26 | 26 | 52 | | 26+106 multi-RU | | | | |
| 52 | | 26 | 26 | 26+106 multi-RU | | | | |
| 52 | | 52 | | 26+106 multi-RU | | | | |
| 106 | | | | 26+106 multi-RU | | | | |
| 26 | 26+52 multi-RU | | | 26+106 multi-RU | | | | |
| 106+26 multi-RU | | | | 52+26 multi-RU | | | 26 | |
| 26 | 26+52 multi-RU | | | 26 | 52+26 multi-RU | | | 26 |
| RU484+RU242; MRU 1 – [empty-RU242 RU242 RU484] | | | | | | | | |
| RU484+RU242; MRU 2 – [RU242 empty-RU242 RU484] | | | | | | | | |
| RU484+RU242; MRU 3 – [RU484 empty-RU242 RU242] | | | | | | | | |
| RU484+RU242; MRU 4 – [RU484 RU242 empty-RU242] | | | | | | | | |
| RU996+RU484; MRU 1 – [empty-RU484 RU484 RU996] | | | | | | | | |
| RU996+RU484; MRU 2 – [RU484 empty-RU484 RU996] | | | | | | | | |
| RU996+RU484; MRU 3 – [RU996 empty-RU484 RU484] | | | | | | | | |
| RU996+RU484; MRU 4 – [RU996 RU484 empty-RU484] | | | | | | | | |
| 2×RU996+RU484; MRU 1 – [empty-RU484 RU484 RU996 RU996] | | | | | | | | |
| 2×RU996+RU484; MRU 2 – [RU484 empty-RU484 RU996 RU996] | | | | | | | | |
| 2×RU996+RU484; MRU 3 – [RU996 RU996 empty-RU484 RU484] | | | | | | | | |
| 2×RU996+RU484; MRU 4 – [RU996 RU996 RU484 empty-RU484] | | | | | | | | |
| 3×RU996+RU484; MRU 1 – [empty-RU484 RU484 RU996 RU996 RU996] | | | | | | | | |
| 3×RU996+RU484; MRU 2 – [RU484 empty-RU484 RU996 RU996 RU996] | | | | | | | | |
| 3×RU996+RU484; MRU 3 – [RU996 RU996 RU996 empty-RU484 RU484] | | | | | | | | |
| 3×RU996+RU484; MRU 4 – [RU996 RU996 RU996 RU484 empty-RU484] | | | | | | | | |
| 3×RU996 (any 3); MRU 1 – [empty-RU996 RU996 RU996 RU996] | | | | | | | | |
| 3×RU996 (any 3); MRU 2 – [RU996 empty-RU996 RU996 RU996] | | | | | | | | |
| 3×RU996 (any 3); MRU 3 – [RU996 RU996 empty-RU996 RU996] | | | | | | | | |
| 3×RU996 (any 3); MRU 4 – [RU996 RU996 RU996 empty-RU996] | | | | | | | | |

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 || 1 |
| 2 | 26 | 26 | 26 | 26 | 26 | 52 || 26 | 26 | 1 |
| 3 | 26 | 26 | 26 | 26 | 26 | 52 || 52 || 1 |
| 4 | 26 | 26 | 52 || 26 | 26 | 26 | 26 | 26 | 1 |
| 5 | 26 | 26 | 52 || 26 | 26 | 26 | 52 || 1 |
| 6 | 26 | 26 | 52 || 26 | 52 || 26 | 26 | 1 |
| 7 | 26 | 26 | 52 || 26 | 52 || 52 || 1 |
| 8 | 52 || 26 | 26 | 26 | 26 | 26 | 26 | 26 | 1 |
| 9 | 52 || 26 | 26 | 26 | 26 | 26 | 52 || 1 |
| 10 | 52 || 26 | 26 | 26 | 52 || 26 | 26 | 1 |
| 11 | 52 || 26 | 26 | 26 | 52 || 52 || 1 |
| 12 | 52 || 52 || 26 | 26 | 26 | 26 | 26 | 1 |
| 13 | 52 || 52 || 26 | 26 | 26 | 52 || 1 |
| 14 | 52 || 52 || 26 | 52 || 26 | 26 | 1 |
| 15 | 52 || 52 || 26 | 52 || 52 || 1 |
| 16-19 (000100y1y0) | 52 ||| 52 ||| - | 106 ||| 4 |
| 20-23 (000101y1y0) | 106 ||| - || 52 ||| 52 || 4 |
| 24-27 (000110y1y0) | 26 | 26 | 26 | 26 | 26 | 106 |||| 4 |
| 28-31 (000111y1y0) | 26 | 26 | 52 || 26 | 106 |||| 4 |
| 32-35 (001000y1y0) | 52 || 26 | 26 | 26 | 106 |||| 4 |
| 36-39 (001001y1y0) | 52 ||| 52 || 26 | 106 |||| 4 |
| 40-43 (001010y1y0) | 106 ||| 26 | 26 | 26 | 26 | 26 | 4 |
| 44-47 (001011y1y0) | 106 ||| 26 | 26 | 26 | 52 || 4 |
| 48-51 (001100y1y0) | 106 ||| 26 | 52 || 26 | 26 | 4 |
| 52-55 (001101y1y0) | 106 ||| 26 | 52 || 52 || 4 |
| 56 | 52 || 52 || - | 52 || 52 || 1 |
| 57-63 | Reserved |||||||||| 7 |

FIG. 24B

| Index | | | | | | | | |
|---|---|---|---|---|---|---|---|---|
| 64-79 (0100y1y0z1z0) | 106 | | | | - | 106 | | 16 |
| 80-95 (0101y1y0z1z0) | 106 | | | | 26 | 106 | | 16 |
| 96 | 26 | 26+52 multi-RU | | | 26 | 26 | 26 | 26 | 26 | 1 |
| 97 | 26 | 26+52 multi-RU | | | 26 | 26 | 26 | 52 | 1 |
| 98 | 26 | 26+52 multi-RU | | | 26 | 52 | 26 | 26 | 1 |
| 99 | 26 | 26+52 multi-RU | | | 26 | 52 | 52 | 1 |
| 100 | 26 | 26 | 26 | 26 | 52+26 multi-RU | 26 | 1 |
| 101 | 26 | 26 | 52 | 26 | 52+26 multi-RU | 26 | 1 |
| 102 | 52 | 26 | 26 | 26 | 52+26 multi-RU | 26 | 1 |
| 103 | 52 | 52 | 26 | 52+26 multi-RU | 26 | 1 |
| 104-107 (011010y1y0) | 26 | 26+52 multi-RU | 26 | 106 | 4 |
| 108-111 (011011y1y0) | 106 | 26 | 52+26 multi-RU | 26 | 4 |
| 112-115 (011101y1y0) | 106+26 multi-RU | 26 | 26 | 26 | 26 | 4 |
| 116-119 (0101y1y0z1z0) | 106+26 multi-RU | 26 | 26 | 52 | 4 |
| 120-123 (011110y1y0) | 106+26 multi-RU | 52 | 26 | 26 | 4 |
| 124-127 (011111y1y0) | 106+26 multi-RU | 52 | 52 | 4 |
| 128-143 (1000y1y0z1z0) | 106+26 multi-RU | 106 | 16 |
| 144-147 (1001000y1y0) | 26 | 26 | 26 | 26 | 26+106 multi-RU | 4 |
| 148-151 (1001001y1y0) | 26 | 26 | 52 | 26+106 multi-RU | 4 |
| 152-155 (1001010y1y0) | 52 | 26 | 26 | 26+106 multi-RU | 4 |
| 156-159 (1001011y1y0) | 52 | 52 | 26+106 multi-RU | 4 |
| 160-175 (1010y1y0z1z0) | 106 | 26+106 multi-RU | 16 |
| 176-179 (101100y1y0) | 26 | 26+52 multi-RU | 26+106 multi-RU | 4 |
| 180-183 (101101y1y0) | 106+26 multi-RU | 52+26 multi-RU | 26 | 4 |
| 184 | 26 | 26+52 multi-RU | 26 | 52+26 multi-RU | 26 | 1 |
| 185-191 | Reserved | 7 |

FIG. 24C

| 192-199<br>(11000y3y1y0) | 242 | 8 |
|---|---|---|
| 200 | 484 | 1 |
| 201 | 996 | 1 |
| 202 | RU484+RU242; option 1 - First RU242 is not allocated in<br>[RU242 RU242 RU484] (60MHz) | 1 |
| 203 | RU484+RU242; option 2 - Second RU242 is not allocated in<br>[RU242 RU242 RU484] | 1 |
| 204 | RU484+RU242; option 3 - First RU242 is not allocated in<br>[RU484 RU242 RU242] | 1 |
| 205 | RU484+RU242; option 4 - Second RU242 is not allocated in<br>[RU484 RU242 RU242] | 1 |
| 206 | RU484+RU996; option 1 - First RU484 is not allocated in<br>[RU484 RU484 RU996] (120MHz) | 1 |
| 207 | RU484+RU996; option 2 - Second RU484 is not allocated in<br>[RU484 RU484 RU996] | 1 |
| 208 | RU484+RU996; option 3 - First RU484 is not allocated in<br>[RU996 RU484 RU484] | 1 |
| 209 | RU484+RU996; option 4 - Second RU484 is not allocated in<br>[RU996 RU484 RU484] | 1 |
| 210 | RU996+RU996+RU996; option 1- First RU996 is not allocated in<br>[RU996 RU996 RU996 RU996] (240MHz) | 1 |
| 211 | RU996+RU996+RU996; option 2 - Second RU996 is not allocated in<br>[RU996 RU996 RU996 RU996] | 1 |
| 212 | RU996+RU996+RU996; option 3 - Third RU996 is not allocated in<br>[RU996 RU996 RU996 RU996] | 1 |
| 213 | RU996+RU996+RU996; option 4 - Fourth RU996 is not allocated in<br>[RU996 RU996 RU996 RU996] | 1 |
| 214 | 242-tone RU empty (with zero users) | 1 |
| 215 | 484-tone RU; contributes zero User fields to the User Specific field in<br>the same content channel as this RU Allocation subfield | 1 |
| 216 | 996-tone RU; contributes zero User fields to the User Specific field in<br>the same content channel as this RU Allocation subfield | 1 |
| 217 | M-RU; contributes zero User fields to the User Specific field in<br>the same content channel as this RU Allocation subfield | 1 |
| 218-255 | Reserved | 1 |

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 52 | | 52 | | - | 106 | | | | 1 |
| 17 | 106 | | | | - | 52 | | 52 | | 1 |
| 18 | 26 | 26 | 26 | 26 | 26 | 106 | | | | 1 |
| 19 | 26 | 26 | 52 | | 26 | 106 | | | | 1 |
| 20 | 52 | | 26 | 26 | 26 | 106 | | | | 1 |
| 21 | 52 | | 52 | | 26 | 106 | | | | 1 |
| 22 | 106 | | | | 26 | 26 | 26 | 26 | 26 | 1 |
| 23 | 106 | | | | 26 | 26 | 26 | 52 | | 1 |
| 24 | 106 | | | | 26 | 52 | | 26 | 26 | 1 |
| 25 | 106 | | | | 26 | 52 | | 52 | | 1 |
| 26 | 52 | | 52 | | - | 52 | | 52 | | 1 |
| 27 | 106 | | | | - | 106 | | | | 1 |
| 28 | 106 | | | | 26 | 106 | | | | 1 |

FIG. 25B

| Index | | | | | | | | | | # |
|---|---|---|---|---|---|---|---|---|---|---|
| 29 | 26 | 26+52 multi-RU | | | 26 | 26 | 26 | 26 | 26 | 1 |
| 30 | 26 | 26+52 multi-RU | | | 26 | 26 | 26 | 52 | | 1 |
| 31 | 26 | 26+52 multi-RU | | | 26 | 52 | | 26 | 26 | 1 |
| 32 | 26 | 26+52 multi-RU | | | 26 | 52 | | 52 | | 1 |
| 33 | 26 | 26 | 26 | 26 | 26 | 52+26 multi-RU | | | 26 | 1 |
| 34 | 26 | 26 | 52 | | 26 | 52+26 multi-RU | | | 26 | 1 |
| 35 | 52 | | 26 | 26 | 26 | 52+26 multi-RU | | | 26 | 1 |
| 36 | 52 | | 52 | | 26 | 52+26 multi-RU | | | 26 | 1 |
| 37 | 26 | 26+52 multi-RU | | | 26 | 106 | | | | 1 |
| 38 | 106 | | | | 26 | 52+26 multi-RU | | | 26 | 1 |
| 39 | 106+26 multi-RU | | | | | 26 | 26 | 26 | 26 | 1 |
| 40 | 106+26 multi-RU | | | | | 26 | 26 | 52 | | 1 |
| 41 | 106+26 multi-RU | | | | | 52 | | 26 | 26 | 1 |
| 42 | 106+26 multi-RU | | | | | 52 | | 52 | | 1 |
| 43 | 106+26 multi-RU | | | | | 106 | | | | 1 |
| 44 | 26 | 26 | 26 | 26 | 26+106 multi-RU | | | | | 1 |
| 45 | 26 | 26 | 52 | | 26+106 multi-RU | | | | | 1 |
| 46 | 52 | | 26 | 26 | 26+106 multi-RU | | | | | 1 |
| 47 | 52 | | 52 | | 26+106 multi-RU | | | | | 1 |
| 48 | 106 | | | | 26+106 multi-RU | | | | | 1 |
| 49 | 26 | 26+52 multi-RU | | | 26+106 multi-RU | | | | | 1 |
| 50 | 106+26 multi-RU | | | | | 52+26 multi-RU | | | 26 | 1 |
| 51 (00110011) | 26 | 26+52 multi-RU | | | 26 | 52+26 multi-RU | | | 26 | 1 |
| 52–55 | Reserved | | | | | | | | | 4 |
| 56–63 (00111y2y1y0) | 242 | | | | | | | | | 8 |
| 64–71 (01000y2y1y0) | 484 | | | | | | | | | 8 |
| 72–79 (01001y2y1y0) | 996 | | | | | | | | | 8 |

FIG. 25C

| | | |
|---|---|---|
| 80-87 (01010y2y1y0) | RU484+RU242; option 1 – First RU242 is not allocated in [RU242 RU242 RU484] (60MHz) | 8 |
| 88-95 (01011y2y1y0) | RU484+RU242; option 2 – Second RU242 is not allocated in [RU242 RU242 RU484] | 8 |
| 96-103 (01100y2y1y0) | RU484+RU242; option 3 – First RU242 is not allocated in [RU484 RU242 RU242 ] | 8 |
| 104-111 (01101y2y1y1) | RU484+RU242; option 4 – Second RU242 is not allocated in [RU484 RU242 RU242] | 8 |
| 112-119 (01110y2y1y1) | RU484+RU996; option 1 – First RU484 is not allocated in [RU484 RU484 RU996] (120MHz) | 8 |
| 120-127 (01111y2y1y1) | RU484+RU996; option 2 – Second RU484 is not allocated in [RU484 RU484 RU996] | 8 |
| 128-135 (10000y2y1y1) | RU484+RU996; option 3 – First RU484 is not allocated in [RU996 RU484 RU484] | 8 |
| 136-143 (10001y2y1y1) | RU484+RU996; option 4 – Second RU484 is not allocated in [RU996 RU484 RU484] | 8 |
| 144-151 (10010y2y1y1) | RU996+RU996+RU996; option 1– First RU996 is not allocated in [RU996 RU996 RU996 RU996] (240MHz) | 8 |
| 152-159 (10011y2y1y2) | RU996+RU996+RU996; option 2 – Second RU996 is not allocated in [RU996 RU996 RU996 RU996] | 8 |
| 160-167 (10100y2y1y2) | RU996+RU996+RU996; option 3 – Third RU996 is not allocated in [RU996 RU996 RU996 RU996] | 8 |
| 168-175 (10101y2y1y2) | RU996+RU996+RU996; option 4 – Fourth RU996 is not allocated in [RU996 RU996 RU996 RU996] | 8 |
| 176 | 242-tone RU empty (with zero users) | 1 |
| 177 | 484-tone RU; contributes zero User fields to the User Specific field in the same content channel as this RU Allocation subfield | 1 |
| 178 | 996-tone RU; contributes zero User fields to the User Specific field in the same content channel as this RU Allocation subfield | 1 |
| 179 | M-RU; contributes zero User fields to the User Specific field in the same content channel as this RU Allocation subfield | 1 |
| 180-255 | Reserved | 76 |

| RU Allocation subfield (B8 B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16-23 (000010y3y1y0) | 52 | | 52 | | – | 106 | | | | 8 |
| 24-31 (000011y3y1y0) | 106 | | | | – | 52 | | 52 | | 8 |
| 32-39 (000100y3y1y0) | 26 | 26 | 26 | 26 | 26 | 106 | | | | 8 |
| 40-47 (000101y3y1y0) | 26 | 26 | 52 | | 26 | 106 | | | | 8 |
| 48-55 (000110y3y1y0) | 52 | | 26 | 26 | 26 | 106 | | | | 8 |
| 56-63 (000111y3y1y0) | 52 | | 52 | | 26 | 106 | | | | 8 |
| 64-71 (001000y3y1y0) | 106 | | | | 26 | 26 | 26 | 26 | 26 | 8 |
| 72-79 (001001y3y1y0) | 106 | | | | 26 | 26 | 26 | 52 | | 8 |
| 80-87 (001010y3y1y0) | 106 | | | | 26 | 52 | | 26 | 26 | 8 |
| 88-95 (001011y3y1y0) | 106 | | | | 26 | 52 | | 52 | | 8 |
| 96(001100000) | 52 | | 52 | | – | 52 | | 52 | | 1 |
| 97-111 | Reserved | | | | | | | | | 15 |

FIG. 26B

| Index | C1 | C2 | C3 | C4 | C5 | C6 | C7 | N |
|---|---|---|---|---|---|---|---|---|
| 112-127 (00111y1y0z1z0) | 106 | | | - | 106 | | | 16 |
| 128-143 (01000y1y0z1z0) | 106 | | | 26 | 106 | | | 16 |
| 144 | 26 | 26+52 multi-RU | | 26 | 26 | 26 | 26 | 1 |
| 145 | 26 | 26+52 multi-RU | | 26 | 26 | 26 | 52 | 1 |
| 146 | 26 | 26+52 multi-RU | | 26 | 52 | 26 | 26 | 1 |
| 147 | 26 | 26+52 multi-RU | | 26 | 52 | 52 | | 1 |
| 148 | 26 | 26 | 26 | 26 | 26 | 52+26 multi-RU | 26 | 1 |
| 149 | 26 | 26 | 52 | | 26 | 52+26 multi-RU | 26 | 1 |
| 150 | 52 | 26 | 26 | | 26 | 52+26 multi-RU | 26 | 1 |
| 151 | 52 | 52 | | | 26 | 52+26 multi-RU | 26 | 1 |
| 152-159 (010011y2y1y0) | 26 | 26+52 multi-RU | | 26 | 106 | | | 8 |
| 160-167 (010100y2y1y0) | 106 | | | 26 | 52+26 multi-RU | | 26 | 8 |
| 168-175 (010101y2y1y0) | 106+26 multi-RU | | | 26 | 26 | 26 | 26 | 8 |
| 176-183 (010110y2y1y0) | 106+26 multi-RU | | | 26 | 26 | 52 | | 8 |
| 184-191 (010111y2y1y0) | 106+26 multi-RU | | | 52 | | 26 | 26 | 8 |
| 192-199 (011000y2y1y0) | 106+26 multi-RU | | | 52 | | 52 | | 8 |
| 200-207 (011001y2y1y0) | 26 | 26 | 26 | 26 | 26+106 multi-RU | | | 8 |
| 208-215 (011010y2y1y0) | 26 | 26 | 52 | | 26+106 multi-RU | | | 8 |
| 216-223 (011011y2y1y0) | 52 | 26 | 26 | | 26+106 multi-RU | | | 8 |
| 224-231 (011100y2y1y0) | 52 | 52 | | | 26+106 multi-RU | | | 8 |
| 232-239 (011101y2y1y0) | 26 | 26+52 multi-RU | | | 26+106 multi-RU | | | 8 |
| 240-247 (011110y2y1y0) | 106+26 multi-RU | | | 52+26 multi-RU | | | 26 | 8 |
| 248-255 | Reserved | | | | | | | 8 |
| 256-319 (100y2y1y0z2z1z0) | 106+26 multi-RU | | | 106 | | | | 64 |
| 320-383 (101y2y1y0z2z1z0) | 106 | | | 26+106 multi-RU | | | | 64 |
| 384 (110000000000) | 26 | 26+52 multi-RU | | 26 | 52+26 multi-RU | | 26 | 1 |
| 385-399 | Reserved | | | | | | | 15 |

FIG. 26C

| 400-415<br>(11001y3y2y1y0) | 242 | 16 |
|---|---|---|
| 416 | 484 | 1 |
| 417 | 996 | 1 |
| 418 | RU484+RU242; option 1 – First RU242 is not allocated in [RU242 RU242 RU484] (60MHz) | 1 |
| 419 | RU484+RU242; option 2 – Second RU242 is not allocated in [RU242 RU242 RU484] | 1 |
| 420 | RU484+RU242; option 3 – First RU242 is not allocated in [RU484 RU242 RU242 ] | 1 |
| 421 | RU484+RU242; option 4 – Second RU242 is not allocated in [RU484 RU242 RU242] | 1 |
| 422 | RU484+RU996; option 1 – First RU484 is not allocated in [RU484 RU484 RU996] (60MHz) | 1 |
| 423 | RU484+RU996; option 2 – Second RU484 is not allocated in [RU484 RU484 RU996] | 1 |
| 424 | RU484+RU996; option 3 – First RU484 is not allocated in [RU996 RU484 RU484] | 1 |
| 425 | RU484+RU996; option 4 – Second RU484 is not allocated in [RU996 RU484 RU484] | 1 |
| 426 | RU996+RU996+RU996; option 1– First RU996 is not allocated in [RU996 RU996 RU996 RU996] (240MHz) | 1 |
| 427 | RU996+RU996+RU996; option 2 – Second RU996 is not allocated in [RU996 RU996 RU996 RU996] | 1 |
| 428 | RU996+RU996+RU996; option 3 – Third RU996 is not allocated in [RU996 RU996 RU996 RU996] | 1 |
| 429 | RU996+RU996+RU996; option 4 – Fourth RU996 is not allocated in [RU996 RU996 RU996 RU996] | 1 |
| 430 | 242-tone RU empty (with zero users) | 1 |
| 431 | 484-tone RU; contributes zero User fields to the User Specific field in the same content channel as this RU Allocation subfield | 1 |
| 432 | 996-tone RU; contributes zero User fields to the User Specific field in the same content channel as this RU Allocation subfield | 1 |
| 433 | M-RU; contributes zero User fields to the User Specific field in the same content channel as this RU Allocation subfield | 1 |
| 434-511 | Reserved | 78 |

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 52 | | 52 | | – | 106 | | | | 1 |
| 17 | 106 | | | | – | 52 | | 52 | | 1 |
| 18 | 26 | 26 | 26 | 26 | 26 | 106 | | | | 1 |
| 19 | 26 | 26 | 52 | | 26 | 106 | | | | 1 |
| 20 | 52 | | 26 | 26 | 26 | 106 | | | | 1 |
| 21 | 52 | | 52 | | 26 | 106 | | | | 1 |
| 22 | 106 | | | | 26 | 26 | 26 | 26 | 26 | 1 |
| 23 | 106 | | | | 26 | 26 | 26 | 52 | | 1 |
| 24 | 106 | | | | 26 | 52 | | 26 | 26 | 1 |
| 25 | 106 | | | | 26 | 52 | | 52 | | 1 |
| 26 | 52 | | 52 | | – | 52 | | 52 | | 1 |
| 27 | 106 | | | | – | 106 | | | | 1 |
| 28 | 106 | | | | 26 | 106 | | | | 1 |

FIG. 27B

| | | | | | | | | |
|---|---|---|---|---|---|---|---|---|
| 29 | 26 | 26+52 multi-RU | 26 | 26 | 26 | 26 | 26 | 1 |
| 30 | 26 | 26+52 multi-RU | 26 | 26 | 26 | 52 | | 1 |
| 31 | 26 | 26+52 multi-RU | 26 | 52 | | 26 | 26 | 1 |
| 32 | 26 | 26+52 multi-RU | 26 | 52 | | 52 | | 1 |
| 33 | 26 | 26 | 26 | 26 | 26 | 52+26 multi-RU | 26 | 1 |
| 34 | 26 | 26 | 52 | | 26 | 52+26 multi-RU | 26 | 1 |
| 35 | 52 | | 26 | 26 | 26 | 52+26 multi-RU | 26 | 1 |
| 36 | 52 | | 52 | | 26 | 52+26 multi-RU | 26 | 1 |
| 37 | 26 | 26+52 multi-RU | 26 | 106 | | | | 1 |
| 38 | 106 | | 26 | 52+26 multi-RU | | 26 | | 1 |
| 39 | 106+26 multi-RU | | 26 | 26 | 26 | 26 | | 1 |
| 40 | 106+26 multi-RU | | 26 | 26 | 52 | | | 1 |
| 41 | 106+26 multi-RU | | 52 | | 26 | 26 | | 1 |
| 42 | 106+26 multi-RU | | 52 | | 52 | | | 1 |
| 43 | 106+26 multi-RU | | 106 | | | | | 1 |
| 44 | 26 | 26 | 26 | 26 | 26+106 multi-RU | | | 1 |
| 45 | 26 | 26 | 52 | | 26+106 multi-RU | | | 1 |
| 46 | 52 | | 26 | 26 | 26+106 multi-RU | | | 1 |
| 47 | 52 | | 52 | | 26+106 multi-RU | | | 1 |
| 48 | 106 | | | | 26+106 multi-RU | | | 1 |
| 49 | 26 | 26+52 multi-RU | | | 26+106 multi-RU | | | 1 |
| 50 | 106+26 multi-RU | | | | 52+26 multi-RU | | 26 | 1 |
| 51(00110011) | 26 | 26+52 multi-RU | 26 | 52+26 multi-RU | | 26 | | 1 |
| 52-55 | Reserved | | | | | | | 4 |
| 56-63 (00111y2y1y0) | 242 | | | | | | | 8 |
| 64-71 (01000y2y1y0) | 484 | | | | | | | 8 |
| 72-79 (01001y2y1y0) | 996 | | | | | | | 8 |
| 80-87 (01010y2y1y0) | 2xRU996 | | | | | | | 8 |
| 88-95 (01011y2y1y0) | RU484+RU242; MRU 1 – [empty-RU242 RU242 RU484] | | | | | | | 8 |
| 96-103 (01100y2y1y0) | RU484+RU242; MRU 2 – [RU242 empty-RU242 RU484] | | | | | | | 8 |
| 104-111 (01101y2y1y0) | RU484+RU242; MRU 3 – [RU484 empty-RU242 RU242] | | | | | | | 8 |
| 112-119 (01110y2y1y0) | RU484+RU242; MRU 4 – [RU484 empty-RU242 RU242] | | | | | | | 8 |

FIG. 27C

| | | |
|---|---|---|
| 120-127 (01111y2y1y0) | RU996+RU484; MRU 1 – [empty-RU484 RU484 RU996] | 8 |
| 128-135 (10000y2y1y0) | RU996+RU484; MRU 2 – [RU484 empty-RU484 RU996] | 8 |
| 136-143 (10001y2y1y0) | RU996+RU484; MRU 3 – [RU996 empty-RU484 RU484] | 8 |
| 144-151 (10010y2y1y0) | RU996+RU484; MRU 4 – [RU996 RU484 empty-RU484] | 8 |
| 152-159 (10011y2y1y0) | 2×RU996+RU484; MRU 1 – [empty-RU484 RU484 RU996 RU996] | 8 |
| 160-167 (10100y2y1y0) | 2×RU996+RU484; MRU 2 – [RU484 empty-RU484 RU996 RU996] | 8 |
| 168-175 (10101y2y1y0) | 2×RU996+RU484; MRU 3 – [RU996 RU996 empty-RU484 RU484] | 8 |
| 176-183 (10110y2y1y0) | 2×RU996+RU484; MRU 4 – [RU996 RU996 RU484 empty-RU484] | 8 |
| 184-191 (10111y2y1y0) | 3×RU996+RU484; MRU 1 – [empty-RU484 RU484 RU996 RU996 RU996] | 8 |
| 192-199 (11000y2y1y0) | 3×RU996+RU484; MRU 2 – [RU484 empty-RU484 RU996 RU996 RU996] | 8 |
| 200-207 (11001y2y1y0) | 3×RU996+RU484; MRU 3 – [RU996 RU996 RU996 empty-RU484 RU484] | 8 |
| 208-215 (11010y2y1y0) | 3×RU996+RU484; MRU 4 – [RU996 RU996 RU996 RU484 empty-RU484] | 8 |
| 216-223 (11011y2y1y0) | 3×RU996 (any 3); MRU 1 – [empty-RU996 RU996 RU996 RU996] | 8 |
| 224-231 (11100y2y1y0) | 3×RU996 (any 3); MRU 2 – [RU996 empty-RU996 RU996 RU996] | 8 |
| 232-239 (11101y2y1y0) | 3×RU996 (any 3); MRU 3 – [RU996 RU996 empty-RU996 RU996] | 8 |
| 240-247 (11110y2y1y0) | 3×RU996 (any 3); MRU 4 – [RU996 RU996 RU996 empty-RU996] | 8 |
| 248 | 242-tone RU empty (with zero users) | 3 |
| 249 | 242-tone RU; contributes zero User fields to the User Specific field | 8 |
| 250 | 484-tone RU; contributes zero User fields to the User Specific field | 8 |
| 251 | 996-tone RU; contributes zero User fields to the User Specific field | 8 |
| 252 | M-RU; contributes zero User fields to the User Specific field | 8 |
| 253-255 | Reserved | 3 |

| RU Allocation subfield (B8 B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 || 1 |
| 2 | 26 | 26 | 26 | 26 | 26 | 52 || 26 | 26 | 1 |
| 3 | 26 | 26 | 26 | 26 | 26 | 52 || 52 || 1 |
| 4 | 26 | 26 | 52 || 26 | 26 | 26 | 26 | 26 | 1 |
| 5 | 26 | 26 | 52 || 26 | 26 | 26 | 52 || 1 |
| 6 | 26 | 26 | 52 || 26 | 52 || 26 | 26 | 1 |
| 7 | 26 | 26 | 52 || 26 | 52 || 52 || 1 |
| 8 | 52 || 26 | 26 | 26 | 26 | 26 | 26 | 26 | 1 |
| 9 | 52 || 26 | 26 | 26 | 26 | 26 | 52 || 1 |
| 10 | 52 || 26 | 26 | 26 | 52 || 26 | 26 | 1 |
| 11 | 52 || 26 | 26 | 26 | 52 || 52 || 1 |
| 12 | 52 || 52 || 26 | 26 | 26 | 26 | 26 | 1 |
| 13 | 52 || 52 || 26 | 26 | 26 | 52 || 1 |
| 14 | 52 || 52 || 26 | 52 || 26 | 26 | 1 |
| 15 | 52 || 52 || 26 | 52 || 52 || 1 |
| 16 | 52 || 52 || – | 106 |||| 1 |
| 17 | 106 |||| – | 52 || 52 || 1 |
| 18 | 26 | 26 | 26 | 26 | 26 | 106 |||| 1 |
| 19 | 26 | 26 | 52 || 26 | 106 |||| 1 |
| 20 | 52 || 26 | 26 | 26 | 106 |||| 1 |
| 21 | 52 || 52 || 26 | 106 |||| 1 |
| 22 | 106 |||| 26 | 26 | 26 | 26 | 26 | 1 |
| 23 | 106 |||| 26 | 26 | 26 | 52 || 1 |
| 24 | 106 |||| 26 | 52 || 26 | 26 | 1 |
| 25 | 106 |||| 26 | 52 || 52 || 1 |
| 26 | 52 || 52 || – | 52 || 52 || 1 |
| 27 | 106 |||| – | 106 |||| 1 |
| 28 | 106 |||| 26 | 106 |||| 1 |

FIG. 28B

| | | | | | | | | |
|---|---|---|---|---|---|---|---|---|
| 29 | 26 | 26 | 26 | 26 | 52+26 multi-RU | 26 | 26 | 1 |
| 30 | 26 | 26 | 26 | 26 | 52+26 multi-RU | 52 | | 1 |
| 31 | 26 | 26 | 52+26 multi-RU | | 26 | 26 | 26 | 1 |
| 32 | 26 | 26 | 52+26 multi-RU | | 26 | 26 | 52 | 1 |
| 33 | 26 | 26 | 52+26 multi-RU | | 52 | 26 | 26 | 1 |
| 34 | 26 | 26 | 52 | | 52+26 multi-RU | 26 | 26 | 1 |
| 35 | 26 | 26 | 52+26 multi-RU | | 52 | 52 | | 1 |
| 36 | 26 | 26 | 52 | | 52+26 multi-RU | 52 | | 1 |
| 37 | 52 | | 26 | 26 | 52+26 multi-RU | 26 | 26 | 1 |
| 38 | 52 | | 26 | 26 | 52+26 multi-RU | 52 | | 1 |
| 39 | 52 | | 52+26 multi-RU | | 26 | 26 | 26 | 1 |
| 40 | 52 | | 52+26 multi-RU | | 26 | 26 | 52 | 1 |
| 41 | 52 | | 52+26 multi-RU | | 52 | 26 | 26 | 1 |
| 42 | 52 | | 52 | | 52+26 multi-RU | 26 | 26 | 1 |
| 43 | 52 | | 52+26 multi-RU | | 52 | 52 | | 1 |
| 44 | 52 | | 52 | | 52+26 multi-RU | 52 | | 1 |
| 45 | 26 | 26 | 52+26 multi-RU | | 106 | | | 1 |
| 46 | 52 | | 52+26 multi-RU | | 106 | | | 1 |
| 47 | 106 | | | | 52+26 multi-RU | 26 | 26 | 1 |
| 48 | 106 | | | | 52+26 multi-RU | 52 | | 1 |
| 49 | 26 | 26+52 multi-RU | | 26 | 26 | 26 | 26 | 1 |
| 50 | 26 | 26+52 multi-RU | | 26 | 26 | 26 | 52 | 1 |
| 51 | 26 | 26+52 multi-RU | | 26 | 52 | 26 | 26 | 1 |
| 52 | 26 | 26+52 multi-RU | | 26 | 52 | 52 | | 1 |
| 53 | 26 | 26 | 26 | 26 | 26 | 52+26 multi-RU | 26 | 1 |
| 54 | 26 | 26 | 52 | 26 | 52+26 multi-RU | | 26 | 1 |
| 55 | 52 | | 26 | 26 | 26 | 52+26 multi-RU | 26 | 1 |
| 56 | 52 | | 52 | 26 | 52+26 multi-RU | | 26 | 1 |
| 57 | 26 | 26+52 multi-RU | | 26 | 106 | | | 1 |
| 58 | 106 | | | 26 | 52+26 multi-RU | | 26 | 1 |
| 59 | 106+26 multi-RU | | | 26 | 26 | 26 | 26 | 1 |
| 60 | 106+26 multi-RU | | | 26 | 26 | 52 | | 1 |
| 61 | 106+26 multi-RU | | | 52 | 26 | 26 | | 1 |
| 62 | 106+26 multi-RU | | | 52 | 52 | | | 1 |
| 63 | 106+26 multi-RU | | | 106 | | | | 1 |
| 64 | 26 | 26 | 26 | 26 | 26+106 multi-RU | | | 1 |
| 65 | 26 | 26 | 52 | | 26+106 multi-RU | | | 1 |
| 66 | 52 | | 26 | 26 | 26+106 multi-RU | | | 1 |
| 67 | 52 | | 52 | | 26+106 multi-RU | | | 1 |
| 68 | 106 | | | | 26+106 multi-RU | | | 1 |
| 69 | 26 | 26+52 multi-RU | | | 26+106 multi-RU | | | 1 |
| 70 | 106+26 multi-RU | | | | 52+26 multi-RU | | 26 | 1 |
| 71 | 26 | 26+52 multi-RU | | 26 | 52+26 multi-RU | | 26 | 1 |

FIG. 28C

| | | |
|---|---|---|
| 72-79 (001001y2y1y0) | 242 | 8 |
| 80-87 (001010y2y1y0) | 484 | 8 |
| 88-95 (001011y2y1y0) | 996 | 8 |
| 96-103 (001100y2y1y0) | 2xRU996 | 8 |
| 104-111 (001101y2y1y0) | RU484+RU242; MRU 1 - [empty-RU242 RU242 RU484] | 8 |
| 112-119 (001110y2y1y0) | RU484+RU242; MRU 2 - [RU242 empty-RU242 RU484] | 8 |
| 120-127 (001111y2y1y0) | RU484+RU242; MRU 3 - [RU484 empty-RU242 RU242] | 8 |
| 128-135 (010000y2y1y0) | RU484+RU242; MRU 4 - [RU484 RU242 empty-RU242] | 8 |
| 136-143 (010001y2y1y0) | RU996+RU484; MRU 1 - [empty-RU484 RU484 RU996] | 8 |
| 144-151 (010010y2y1y0) | RU996+RU484; MRU 2 - [RU484 empty-RU484 RU996] | 8 |
| 152-159 (010011y2y1y0) | RU996+RU484; MRU 3 - [RU996 empty-RU484 RU484] | 8 |
| 160-167 (010100y2y1y0) | RU996+RU484; MRU 4 - [RU996 RU484 empty-RU484] | 8 |
| 168-175 (010101y2y1y0) | 2×RU996+RU484; MRU 1 - [empty-RU484 RU484 RU996 RU996] | 8 |
| 176-183 (010110y2y1y0) | 2×RU996+RU484; MRU 2 - [RU484 empty-RU484 RU996 RU996] | 8 |
| 184-191 (010111y2y1y0) | 2×RU996+RU484; MRU 3 - [RU996 RU996 empty-RU484 RU484] | 8 |
| 192-199 (011000y2y1y0) | 2×RU996+RU484; MRU 4 - [RU996 RU996 RU484 empty-RU484] | 8 |
| 200-207 (011001y2y1y0) | 3×RU996+RU484; MRU 1 - [empty-RU484 RU484 RU996 RU996 RU996] | 8 |
| 208-215 (011010y2y1y0) | 3×RU996+RU484; MRU 2 - [RU484 empty-RU484 RU996 RU996 RU996] | 8 |
| 216-223 (011011y2y1y0) | 3×RU996+RU484; MRU 3 - [RU996 RU996 RU996 empty-RU484 RU484] | 8 |
| 224-231 (011100y2y1y0) | 3×RU996+RU484; MRU 4 - [RU996 RU996 RU996 RU484 empty-RU484] | 8 |

FIG. 28D

| 232-239<br>(011101y2y1y0) | 3×RU996 (any 3); MRU 1 – [empty-RU996 RU996 RU996 RU996] | 8 |
|---|---|---|
| 240-247<br>(011110y2y1y0) | 3×RU996 (any 3); MRU 2 – [RU996 empty-RU996 RU996 RU996] | 8 |
| 248-255<br>(011111y2y1y0) | 3×RU996 (any 3); MRU 3 – [RU996 RU996 empty-RU996 RU996] | 8 |
| 256-263<br>(100000y2y1y0) | 3×RU996 (any 3); MRU 4 – [RU996 RU996 RU996 empty-RU996] | 8 |
| 264 | 242-tone RU empty (with zero users) | 1 |
| 265 | 242-tone RU; contributes zero User fields to the User Specific field | 1 |
| 266 | 484-tone RU; contributes zero User fields to the User Specific field | 1 |
| 267 | 996-tone RU; contributes zero User fields to the User Specific field | 1 |
| 268 | M-RU; contributes zero User fields to the User Specific field | 1 |
| 269-511 | Reserved | 243 |

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | 52 | 1 |
| 2 | 26 | 26 | 26 | 26 | 26 | 52 | 52 | 26 | 26 | 1 |
| 3 | 26 | 26 | 26 | 26 | 26 | 52 | 52 | 52 | 52 | 1 |
| 4 | 26 | 26 | 52 | 52 | 26 | 26 | 26 | 26 | 26 | 1 |
| 5 | 26 | 26 | 52 | 52 | 26 | 26 | 26 | 52 | 52 | 1 |
| 6 | 26 | 26 | 52 | 52 | 26 | 52 | 52 | 26 | 26 | 1 |
| 7 | 26 | 26 | 52 | 52 | 26 | 52 | 52 | 52 | 52 | 1 |
| 8 | 52 | 52 | 26 | 26 | 26 | 26 | 26 | 26 | 26 | 1 |
| 9 | 52 | 52 | 26 | 26 | 26 | 26 | 26 | 52 | 52 | 1 |
| 10 | 52 | 52 | 26 | 26 | 26 | 52 | 52 | 26 | 26 | 1 |
| 11 | 52 | 52 | 26 | 26 | 26 | 52 | 52 | 52 | 52 | 1 |
| 12 | 52 | 52 | 52 | 52 | 26 | 26 | 26 | 26 | 26 | 1 |
| 13 | 52 | 52 | 52 | 52 | 26 | 26 | 26 | 52 | 52 | 1 |
| 14 | 52 | 52 | 52 | 52 | 26 | 52 | 52 | 26 | 26 | 1 |
| 15 | 52 | 52 | 52 | 52 | 26 | 52 | 52 | 52 | 52 | 1 |
| 16 | 52 | 52 | 52 | 52 | – | 106 | 106 | 106 | 106 | 1 |
| 17 | 106 | 106 | 106 | 106 | – | 52 | 52 | 52 | 52 | 1 |
| 18 | 26 | 26 | 26 | 26 | 26 | 106 | 106 | 106 | 106 | 1 |
| 19 | 26 | 26 | 52 | 52 | 26 | 106 | 106 | 106 | 106 | 1 |
| 20 | 52 | 52 | 26 | 26 | 26 | 106 | 106 | 106 | 106 | 1 |
| 21 | 52 | 52 | 52 | 52 | 26 | 106 | 106 | 106 | 106 | 1 |
| 22 | 106 | 106 | 106 | 106 | 26 | 26 | 26 | 26 | 26 | 1 |
| 23 | 106 | 106 | 106 | 106 | 26 | 26 | 26 | 52 | 52 | 1 |
| 24 | 106 | 106 | 106 | 106 | 26 | 52 | 52 | 26 | 26 | 1 |
| 25 | 106 | 106 | 106 | 106 | 26 | 52 | 52 | 52 | 52 | 1 |
| 26 | 52 | 52 | 52 | 52 | – | 52 | 52 | 52 | 52 | 1 |
| 27 | 106 | 106 | 106 | 106 | – | 106 | 106 | 106 | 106 | 1 |
| 28 | 106 | 106 | 106 | 106 | 26 | 106 | 106 | 106 | 106 | 1 |

FIG. 29B

| | | | | | | | | |
|---|---|---|---|---|---|---|---|---|
| 29 | 26 | 26 | 26 | 26 | 52+26 multi-RU | 26 | 26 | 1 |
| 30 | 26 | 26 | 26 | 26 | 52+26 multi-RU | 52 | | 1 |
| 31 | 26 | 26 | 52+26 multi-RU | 26 | 26 | 26 | 26 | 1 |
| 32 | 26 | 26 | 52+26 multi-RU | 26 | 26 | 52 | | 1 |
| 33 | 26 | 26 | 52+26 multi-RU | 52 | 26 | 26 | | 1 |
| 34 | 26 | 26 | 52 | 52+26 multi-RU | 26 | 26 | | 1 |
| 35 | 26 | 26 | 52+26 multi-RU | 52 | 52 | | | 1 |
| 36 | 26 | 26 | 52 | 52+26 multi-RU | 52 | | | 1 |
| 37 | 52 | 26 | 26 | 52+26 multi-RU | 26 | 26 | | 1 |
| 38 | 52 | 26 | 26 | 52+26 multi-RU | 52 | | | 1 |
| 39 | 52 | 52+26 multi-RU | 26 | 26 | 26 | 26 | | 1 |
| 40 | 52 | 52+26 multi-RU | 26 | 26 | 52 | | | 1 |
| 41 | 52 | 52+26 multi-RU | 52 | 26 | 26 | | | 1 |
| 42 | 52 | 52 | 52+26 multi-RU | 26 | 26 | | | 1 |
| 43 | 52 | 52+26 multi-RU | 52 | 52 | | | | 1 |
| 44 | 52 | 52 | 52+26 multi-RU | 52 | | | | 1 |
| 45 | 26 | 26 | 52+26 multi-RU | 106 | | | | 1 |
| 46 | 52 | 52+26 multi-RU | 106 | | | | | 1 |
| 47 | 106 | | 52+26 multi-RU | 26 | 26 | | | 1 |
| 48 | 106 | | 52+26 multi-RU | 52 | | | | 1 |
| 49 | 26 | 26+52 multi-RU | 26 | 26 | 26 | 26 | 26 | 1 |
| 50 | 26 | 26+52 multi-RU | 26 | 26 | 26 | 52 | | 1 |
| 51 | 26 | 26+52 multi-RU | 26 | 52 | 26 | 26 | | 1 |
| 52 | 26 | 26+52 multi-RU | 26 | 52 | 52 | | | 1 |
| 53 | 26 | 26 | 26 | 26 | 26 | 52+26 multi-RU | 26 | 1 |
| 54 | 26 | 26 | 52 | 26 | 52+26 multi-RU | 26 | | 1 |
| 55 | 52 | 26 | 26 | 26 | 52+26 multi-RU | 26 | | 1 |
| 56 | 52 | 52 | 26 | 52+26 multi-RU | 26 | | | 1 |
| 57 | 26 | 26+52 multi-RU | 26 | 106 | | | | 1 |
| 58 | 106 | | 26 | 52+26 multi-RU | 26 | | | 1 |
| 59 | 106+26 multi-RU | | 26 | 26 | 26 | 26 | | 1 |
| 60 | 106+26 multi-RU | | 26 | 26 | 52 | | | 1 |
| 61 | 106+26 multi-RU | | 52 | 26 | 26 | | | 1 |
| 62 | 106+26 multi-RU | | 52 | 52 | | | | 1 |
| 63 | 106+26 multi-RU | | 106 | | | | | 1 |
| 64 | 26 | 26 | 26 | 26 | 26+106 multi-RU | | | 1 |
| 65 | 26 | 26 | 52 | | 26+106 multi-RU | | | 1 |
| 66 | 52 | 26 | 26 | | 26+106 multi-RU | | | 1 |
| 67 | 52 | 52 | | | 26+106 multi-RU | | | 1 |
| 68 | 106 | | | | 26+106 multi-RU | | | 1 |
| 69 | 26 | 26+52 multi-RU | | | 26+106 multi-RU | | | 1 |
| 70 | 106+26 multi-RU | | | 52+26 multi-RU | 26 | | | 1 |
| 71 | 26 | 26+52 multi-RU | 26 | 52+26 multi-RU | 26 | | | 1 |

FIG. 29C

| 72-79<br>(01001y2y1y0) | 242 | 8 |
|---|---|---|
| 80-83<br>(010100y1y0) | 484 | 4 |
| 84-87<br>(010101y1y0) | 996 | 4 |
| 88-91<br>(010110y1y0) | 2xRU996 | 4 |
| 92-95<br>(010111y1y0) | RU484+RU242; MRU 1 – [empty-RU242 RU242 RU484] | 4 |
| 96-99<br>(011000y1y0) | RU484+RU242; MRU 2 – [RU242 empty-RU242 RU484] | 4 |
| 100-103<br>(011001y1y0) | RU484+RU242; MRU 3 – [RU484 empty-RU242 RU242] | 4 |
| 104-107<br>(011010y1y0) | RU484+RU242; MRU 4 – [RU484 RU242 empty-RU242] | 4 |
| 108-111<br>(011011y1y0) | RU996+RU484; MRU 1 – [empty-RU484 RU484 RU996] | 4 |
| 112-115<br>(011100y1y0) | RU996+RU484; MRU 2 – [RU484 empty-RU484 RU996] | 4 |
| 116-119<br>(011101y1y0) | RU996+RU484; MRU 3 – [RU996 empty-RU484 RU484] | 4 |
| 120-123<br>(011110y1y0) | RU996+RU484; MRU 4 – [RU996 RU484 empty-RU484] | 4 |
| 124-127<br>(011111y1y0) | 2xRU996+RU484; MRU 1 – [empty-RU484 RU484 RU996 RU996] | 4 |
| 128-131<br>(100000y1y0) | 2xRU996+RU484; MRU 2 – [RU484 empty-RU484 RU996 RU996] | 4 |
| 132-135<br>(100001y1y0) | 2xRU996+RU484; MRU 3 – [RU996 RU996 empty-RU484 RU484] | 4 |
| 136-139<br>(100010y1y0) | 2xRU996+RU484; MRU 4 – [RU996 RU996 RU484 empty-RU484] | 4 |
| 140-143<br>(100011y1y0) | 3xRU996+RU484; MRU 1 – [empty-RU484 RU484 RU996 RU996 RU996] | 4 |
| 144-147<br>(100100y1y0) | 3xRU996+RU484; MRU 2 – [RU484 empty-RU484 RU996 RU996 RU996] | 4 |
| 148-151<br>(100101y1y0) | 3xRU996+RU484; MRU 3 – [RU996 RU996 RU996 empty-RU484 RU484] | 4 |
| 152-155<br>(100110y1y0) | 3xRU996+RU484; MRU 4 – [RU996 RU996 RU996 RU484 empty-RU484] | 4 |

FIG. 29D

| | | |
|---|---|---|
| 156-159 (100111y1y0) | 3×RU996 (any 3); MRU 1 – [empty-RU996 RU996 RU996 RU996] | 4 |
| 160-163 (101000y1y0) | 3×RU996 (any 3); MRU 2 – [RU996 empty-RU996 RU996 RU996] | 4 |
| 164-167 (101001y1y0) | 3×RU996 (any 3); MRU 3 – [RU996 RU996 empty-RU996 RU996] | 4 |
| 168-171 (101010y1y0) | 3×RU996 (any 3); MRU 4 – [RU996 RU996 RU996 empty-RU996] | 4 |
| 172 | 242-tone RU empty (with zero users) | 1 |
| 173 | 242-tone RU; contributes zero User fields to the User Specific field | 1 |
| 174 | 484-tone RU; contributes zero User fields to the User Specific field | 1 |
| 175 | 996-tone RU; contributes zero User fields to the User Specific field | 1 |
| 176 | M-RU; contributes zero User fields to the User Specific field | 1 |
| 177-255 | Reserved | 79 |

| RU Allocation subfield (B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0  | 26 | 26 | 26 | 26 | 26 | 26 | 26 | 26 | 26 | 1 |
| 1  | 26 | 26 | 26 | 26 | 26 | 26 | 26 | 52 || 1 |
| 2  | 26 | 26 | 26 | 26 | 26 | 52 || 26 | 26 | 1 |
| 3  | 26 | 26 | 26 | 26 | 26 | 52 || 52 || 1 |
| 4  | 26 | 26 | 52 || 26 | 26 | 26 | 26 | 26 | 1 |
| 5  | 26 | 26 | 52 || 26 | 26 | 26 | 52 || 1 |
| 6  | 26 | 26 | 52 || 26 | 52 || 26 | 26 | 1 |
| 7  | 26 | 26 | 52 || 26 | 52 || 52 || 1 |
| 8  | 52 || 26 | 26 | 26 | 26 | 26 | 26 | 26 | 1 |
| 9  | 52 || 26 | 26 | 26 | 26 | 26 | 52 || 1 |
| 10 | 52 || 26 | 26 | 26 | 52 || 26 | 26 | 1 |
| 11 | 52 || 26 | 26 | 26 | 52 || 52 || 1 |
| 12 | 52 || 52 || 26 | 26 | 26 | 26 | 26 | 1 |
| 13 | 52 || 52 || 26 | 26 | 26 | 52 || 1 |
| 14 | 52 || 52 || 26 | 52 || 26 | 26 | 1 |
| 15 | 52 || 52 || 26 | 52 || 52 || 1 |
| 16 | 52 || 52 || – | 106 |||| 1 |
| 17 | 106 |||| – | 52 || 52 || 1 |
| 18 | 26 | 26 | 26 | 26 | 26 | 106 |||| 1 |
| 19 | 26 | 26 | 52 || 26 | 106 |||| 1 |
| 20 | 52 || 26 | 26 | 26 | 106 |||| 1 |
| 21 | 52 || 52 || 26 | 106 |||| 1 |
| 22 | 106 |||| 26 | 26 | 26 | 26 | 26 | 1 |
| 23 | 106 |||| 26 | 26 | 26 | 52 || 1 |
| 24 | 106 |||| 26 | 52 || 26 | 26 | 1 |
| 25 | 106 |||| 26 | 52 || 52 || 1 |
| 26 | 52 || 52 || – | 52 || 52 || 1 |
| 27 | 106 |||| – | 106 |||| 1 |
| 28 | 106 |||| 26 | 106 |||| 1 |

FIG. 30B

| | | | | | | | | |
|---|---|---|---|---|---|---|---|---|
| 29 | 26 | 26 | 26 | 26 | 52+26 multi-RU | 26 | 26 | 1 |
| 30 | 26 | 26 | 26 | 26 | 52+26 multi-RU | 52 | | 1 |
| 31 | 26 | 26 | 52+26 multi-RU | 26 | 26 | 26 | 26 | 1 |
| 32 | 26 | 26 | 52+26 multi-RU | 26 | 26 | 52 | | 1 |
| 33 | 26 | 26 | 52+26 multi-RU | 52 | 26 | 26 | | 1 |
| 34 | 26 | 26 | 52 | 52+26 multi-RU | 26 | 26 | | 1 |
| 35 | 26 | 26 | 52+26 multi-RU | 52 | 52 | | | 1 |
| 36 | 26 | 26 | 52 | 52+26 multi-RU | 52 | | | 1 |
| 37 | 52 | 26 | 26 | 52+26 multi-RU | 26 | 26 | | 1 |
| 38 | 52 | 26 | 26 | 52+26 multi-RU | 52 | | | 1 |
| 39 | 52 | 52+26 multi-RU | 26 | 26 | 26 | 26 | | 1 |
| 40 | 52 | 52+26 multi-RU | 26 | 26 | 52 | | | 1 |
| 41 | 52 | 52+26 multi-RU | 52 | 26 | 26 | | | 1 |
| 42 | 52 | 52 | 52+26 multi-RU | 26 | 26 | | | 1 |
| 43 | 52 | 52+26 multi-RU | 52 | 52 | | | | 1 |
| 44 | 52 | 52 | 52+26 multi-RU | 52 | | | | 1 |
| 45 | 26 | 26 | 52+26 multi-RU | 106 | | | | 1 |
| 46 | 52 | 52+26 multi-RU | 106 | | | | | 1 |
| 47 | 106 | 52+26 multi-RU | 26 | 26 | | | | 1 |
| 48 | 106 | 52+26 multi-RU | 52 | | | | | 1 |
| 49 | 26 | 26+52 multi-RU | 26 | 26 | 26 | 26 | 26 | 1 |
| 50 | 26 | 26+52 multi-RU | 26 | 26 | 26 | 52 | | 1 |
| 51 | 26 | 26+52 multi-RU | 26 | 52 | 26 | 26 | | 1 |
| 52 | 26 | 26+52 multi-RU | 26 | 52 | 52 | | | 1 |
| 53 | 26 | 26+52 multi-RU | 26 | 52+26 multi-RU | 26 | | | 1 |
| 54 | 26 | | 26 | 52+26 multi-RU | 26 | | | 1 |
| 55 | 52 | 26 | 26 | 26 | 52+26 multi-RU | 26 | | 1 |
| 56 | 52 | 52 | 26 | 52 | 26 | 26 | | 1 |
| 57 | 26 | 26+52 multi-RU | 26 | 106 | | | | 1 |
| 58 | | 26 | 52+26 multi-RU | 26 | | | | 1 |
| 59 | 106+26 multi-RU | 26 | 26 | 26 | 26 | | | 1 |
| 60 | 106+26 multi-RU | 26 | 26 | 52 | | | | 1 |
| 61 | 106+26 multi-RU | 52 | 26 | 26 | | | | 1 |
| 62 | 106+26 multi-RU | 52 | 52 | | | | | 1 |
| 63 | 106+26 multi-RU | 106 | | | | | | 1 |
| 64 | 26 | 26 | 26 | 26 | 26+106 multi-RU | | | 1 |
| 65 | 26 | 26 | 52 | 26+106 multi-RU | | | | 1 |
| 66 | 52 | 26 | 26 | 26+106 multi-RU | | | | 1 |
| 67 | 52 | 52 | 26+106 multi-RU | | | | | 1 |
| 68 | 106 | 26+106 multi-RU | | | | | | 1 |
| 69 | 26 | 26+52 multi-RU | 26+106 multi-RU | | | | | 1 |
| 70 | 106+26 multi-RU | 52+26 multi-RU | 26 | | | | | 1 |
| 71 | 26 | 26+52 multi-RU | 26 | 52+26 multi-RU | 26 | | | 1 |

FIG. 30C

| | | |
|---|---|---|
| 72-79(1001y 2y1y0) | 242 | 8 |
| 80 | 484 | 1 |
| 81 | 996 | 1 |
| 82 | 2xRU996 | 1 |
| 83 | RU484+RU242; MRU 1 – [empty-RU242 RU242 RU484] | 1 |
| 84 | RU484+RU242; MRU 2 – [RU242 empty-RU242 RU484] | 1 |
| 85 | RU484+RU242; MRU 3 – [RU484 empty-RU242 +RU242] | 1 |
| 86 | RU484+RU242; MRU 4 – [RU484 RU242 empty-RU242] | 1 |
| 87 | RU996+RU484; MRU 1 – [empty-RU484 RU484 RU996] | 1 |
| 88 | RU996+RU484; MRU 2 – [RU484 empty-RU484 RU996] | 1 |
| 89 | RU996+RU484; MRU 3 – [RU996 empty-RU484 RU484] | 1 |
| 90 | RU996+RU484; MRU 4 – [RU996 RU484 empty-RU484] | 1 |
| 91 | 2xRU996+RU484; MRU 1 – [empty-RU484 RU484 RU996 RU996] | 1 |
| 92 | 2xRU996+RU484; MRU 2 – [RU484 empty-RU484 RU996 RU996] | 1 |
| 93 | 2xRU996+RU484; MRU 3 – [RU996 RU996 empty-RU484 RU484] | 1 |
| 94 | 2xRU996+RU484; MRU 4 – [RU996 RU996 RU484 empty-RU484] | 1 |
| 95 | 3xRU996+RU484; MRU 1 – [empty-RU484 RU484 RU996 RU996 RU996] | 1 |
| 96 | 3xRU996+RU484; MRU 2 – [RU484 empty-RU484 RU996 RU996 RU996] | 1 |
| 97 | 3xRU996+RU484; MRU 3 – [RU996 RU996 RU996 empty-RU484 RU484] | 1 |
| 98 | 3xRU996+RU484; MRU 4 – [RU996 RU996 RU996 RU484 empty-RU484] | 1 |
| 99 | 3xRU996 (any 3); MRU 1 – [empty-RU996 RU996 RU996 RU996] | 1 |
| 100 | 3xRU996 (any 3); MRU 2 – [RU996 empty-RU996 RU996 RU996] | 1 |
| 101 | 3xRU996 (any 3); MRU 3 – [RU996 RU996 empty-RU996 RU996] | 1 |
| 102 | xRU996 (any 3); MRU 4 – [RU996 RU996 RU996 empty-RU996] | 1 |
| 103 | 242-tone RU empty (with zero users) | 1 |
| 104 | 242-tone RU; contributes zero User fields to the User Specific field | 1 |
| 105 | 484-tone RU; contributes zero User fields to the User Specific field | 1 |
| 106 | 996-tone RU; contributes zero User fields to the User Specific field | 1 |
| 107 | M-RU; contributes zero User fields to the User Specific field | 1 |
| 108-127 | 2xRU996 | 20 |

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 || 1 |
| 2 | 26 | 26 | 26 | 26 | 26 | 52 || 26 | 26 | 1 |
| 3 | 26 | 26 | 26 | 26 | 26 | 52 || 52 || 1 |
| 4 | 26 | 26 | 52 || 26 | 26 | 26 | 26 | 26 | 1 |
| 5 | 26 | 26 | 52 || 26 | 26 | 26 | 52 || 1 |
| 6 | 26 | 26 | 52 || 26 | 52 || 26 | 26 | 1 |
| 7 | 26 | 26 | 52 || 26 | 52 || 52 || 1 |
| 8 | 52 || 26 | 26 | 26 | 26 | 26 | 26 | 26 | 1 |
| 9 | 52 || 26 | 26 | 26 | 26 | 26 | 52 || 1 |
| 10 | 52 || 26 | 26 | 26 | 52 || 26 | 26 | 1 |
| 11 | 52 || 26 | 26 | 26 | 52 || 52 || 1 |
| 12 | 52 || 52 || 26 | 26 | 26 | 26 | 26 | 1 |
| 13 | 52 || 52 || 26 | 26 | 26 | 52 || 1 |
| 14 | 52 || 52 || 26 | 52 || 26 | 26 | 1 |
| 15 | 52 || 52 || 26 | 52 || 52 || 1 |
| 16 | 52 || 52 ||| 106 ||| 1 |
| 17 | 106 |||| 52 || 52 || 1 |
| 18 | 26 | 26 | 26 | 26 | 26 | 106 |||| 1 |
| 19 | 26 | 26 | 52 || 26 | 106 |||| 1 |
| 20 | 52 || 26 | 26 | 26 | 106 |||| 1 |
| 21 | 52 || 52 || 26 | 106 |||| 1 |
| 22 | 106 ||| 26 | 26 | 26 | 26 | 26 | 1 |
| 23 | 106 ||| 26 | 26 | 26 | 52 || 1 |
| 24 | 106 ||| 26 | 52 || 26 | 26 | 1 |
| 25 | 106 ||| 26 | 52 || 52 || 1 |
| 26 | 52 || 52 ||| 52 || 52 || 1 |
| 27 | 106 |||| 106 ||| 1 |
| 28 | 106 ||| 26 | 106 |||| 1 |

FIG. 31B

| Index | \ | \ | \ | \ | \ | \ | \ | N |
|---|---|---|---|---|---|---|---|---|
| 29 | 26 | 26 | 26 | 26 | 52+26 multi-RU | 26 | 26 | 1 |
| 30 | 26 | 26 | 26 | 26 | 52+26 multi-RU | 52 | | 1 |
| 31 | 26 | 26 | 52+26 multi-RU | | 26 | 26 | 26 | 26 | 1 |
| 32 | 26 | 26 | 52+26 multi-RU | | 26 | 26 | 52 | | 1 |
| 33 | 26 | 26 | 52+26 multi-RU | | 52 | | 26 | 26 | 1 |
| 34 | 26 | 26 | 52 | | 52+26 multi-RU | | 26 | 26 | 1 |
| 35 | 26 | 26 | 52+26 multi-RU | | 52 | | 52 | | 1 |
| 36 | 26 | 26 | 52 | | 52+26 multi-RU | | 52 | | 1 |
| 37 | 52 | | 26 | 26 | 52+26 multi-RU | | 26 | 26 | 1 |
| 38 | 52 | | 26 | 26 | 52+26 multi-RU | | 52 | | 1 |
| 39 | 52 | | 52+26 multi-RU | | 26 | 26 | 26 | 26 | 1 |
| 40 | 52 | | 52+26 multi-RU | | 26 | 26 | 52 | | 1 |
| 41 | 52 | | 52+26 multi-RU | | 52 | | 26 | 26 | 1 |
| 42 | 52 | | 52 | | 52+26 multi-RU | | 26 | 26 | 1 |
| 43 | 52 | | 52+26 multi-RU | | 52 | | 52 | | 1 |
| 44 | 52 | | 52 | | 52+26 multi-RU | | 52 | | 1 |
| 45 | 26 | 26 | 52+26 multi-RU | | 106 | | | | 1 |
| 46 | 52 | | 52+26 multi-RU | | 106 | | | | 1 |
| 47 | 106 | | | | 52+26 multi-RU | | 26 | 26 | 1 |
| 48 | 106 | | | | 52+26 multi-RU | | 52 | | 1 |
| 49 | 106+26 multi-RU | | | | 26 | 26 | 26 | 26 | 1 |
| 50 | 106+26 multi-RU | | | | 26 | 26 | 52 | | 1 |
| 51 | 106+26 multi-RU | | | | 52 | | 26 | 26 | 1 |
| 52 | 106+26 multi-RU | | | | 52 | | 52 | | 1 |
| 53 | 106+26 multi-RU | | | | 106 | | | | 1 |
| 54 | 26 | 26 | 26 | 26 | 26+106 multi-RU | | | | 1 |
| 55 | 26 | 26 | 52 | | 26+106 multi-RU | | | | 1 |
| 56 | 52 | | 26 | 26 | 26+106 multi-RU | | | | 1 |
| 57 | 52 | | 52 | | 26+106 multi-RU | | | | 1 |
| 58 | 106 | | | | 26+106 multi-RU | | | | 1 |
| 59 | 242-tone RU empty (with zero users) | | | | | | | | 1 |
| 60 | 242-tone RU; contributes zero User fields to the User Specific field | | | | | | | | 1 |
| 61 | 484-tone RU; contributes zero User fields to the User Specific field | | | | | | | | 1 |
| 62 | 996-tone RU; contributes zero User fields to the User Specific field | | | | | | | | 1 |
| 63 | M-RU; contributes zero User fields to the User Specific field | | | | | | | | 1 |
| 64-71(01000y2y1y0) | 242 | | | | | | | | 8 |
| 72-79(01001y2y1y0) | 484 | | | | | | | | 8 |
| 80-87(01010y2y1y0) | 996 | | | | | | | | 8 |
| 88-95(01011y2y1y0) | 2xRU996 | | | | | | | | 8 |

FIG. 31C

| 96-103(01100y2y1y0) | RU484+RU242; MRU 1 – [empty-RU242 RU242 RU484] | 8 |
|---|---|---|
| 104-111(01101y2y1y0) | RU484+RU242; MRU 2 – [RU242 empty-RU242 RU484] | 8 |
| 112-119(01110y2y1y0) | RU484+RU242; MRU 3 – [RU484 empty-RU242 RU242] | 8 |
| 120-127(01111y2y1y0) | RU484+RU242; MRU 4 – [RU484 RU242 empty-RU242] | 8 |
| 128-135(10000y2y1y0) | RU996+RU484; MRU 1 – [empty-RU484 RU484 RU996] | 8 |
| 136-143(10001y2y1y0) | RU996+RU484; MRU 2 – [RU484 empty-RU484 RU996] | 8 |
| 144-151(10010y2y1y0) | RU996+RU484; MRU 3 – [RU996 empty-RU484 RU484] | 8 |
| 152-159(10011y2y1y0) | RU996+RU484; MRU 4 – [RU996 RU484 empty-RU484] | 8 |
| 160-167(10100y2y1y0) | 2×RU996+RU484; MRU 1 – [empty-RU484 RU484 RU996 RU996] | 8 |
| 168-175(10101y2y1y0) | 2×RU996+RU484; MRU 2 – [RU484 empty-RU484 RU996 RU996] | 8 |
| 176-183(10110y2y1y0) | 2×RU996+RU484; MRU 3 – [RU996 RU996 empty-RU484 RU484] | 8 |
| 184-191(10111y2y1y0) | 2×RU996+RU484; MRU 4 – [RU996 RU996 RU484 empty-RU484] | 8 |
| 192-199(11000y2y1y0) | 3×RU996+RU484; MRU 1 – [empty-RU484 RU484 RU996 RU996 RU996] | 8 |
| 200-207(11001y2y1y0) | 3×RU996+RU484; MRU 2 – [RU484 empty-RU484 RU996 RU996 RU996] | 8 |
| 208-215(11010y2y1y0) | 3×RU996+RU484; MRU 3 – [RU996 RU996 RU996 empty-RU484 RU484] | 8 |
| 216-223(11011y2y1y0) | 3×RU996+RU484; MRU 4 – [RU996 RU996 RU996 RU484 empty-RU484] | 8 |
| 224-231(11100y2y1y0) | 3×RU996 (any 3); MRU 1 – [empty-RU996 RU996 RU996 RU996] | 8 |
| 232-239(11101y2y1y0) | 3×RU996 (any 3); MRU 2 – [RU996 empty-RU996 RU996 RU996] | 8 |
| 240-247(11110y2y1y0) | 3×RU996 (any 3); MRU 3 – [RU996 RU996 empty-RU996 RU996] | 8 |
| 248-255(11111y2y1y0) | 3×RU996 (any 3); MRU 4 – [RU996 RU996 RU996 empty-RU996] | 8 | of STAs multiplexed in multi-RU = $2^3 y11 + 2^2 y10 + 2y21 + y20 + 1$

COMMUNICATION BASED ON A MULTI-RESOURCE UNIT IN WIRELESS LOCAL AREA NETWORK SYSTEM

CROSS-REFERENCE TO RELATED APPLICATIONS

This application claims the benefit of U.S. Provisional Application Nos. 63/014,213, filed on Apr. 23, 2020 and 63/042,664, filed on Jun. 23, 2020 in the U.S. Patent Office and Korean Patent Application No. 10-2020-0175835, filed on Dec. 15, 2020, in the Korean Intellectual Property Office, the disclosures of which are incorporated by reference herein in their entireties.

BACKGROUND

The present disclosure relates to wireless communication, and more particularly, to an apparatus and method for communication based on a multi-resource unit (multi-RU) in a wireless local area network (WLAN) system.

WLAN systems connect devices using wireless signal transmissions. WLAN technology is based on the institute of electrical and electronics engineers (IEEE) 802.11 standard. The IEEE 802.11 standard includes various sub-standards. Some WLAN technologies support high signal transmission speeds using orthogonal frequency division multiplexing (OFDM) technology.

In the 802.11ac standard, data may be simultaneously transmitted to a number of users through a multi-user multi-input multi-output (MU-MIMO) scheme. In 802.11ax (referred to as the high efficiency (HE)) WLAN standard, multiple-unit access is achieved by providing available subcarriers to users with OFDMA technology as well as using MU-MIMO. In some cases, WLAN systems using 802.11ax is may effectively support communication in a crowded area and outdoors.

The 802.11be (extremely high throughput (EHT) WLAN) standard uses a 6 GHz unlicensed frequency band, with a bandwidth up to 320 MHz per channel. Hybrid automatic repeat and request (HARD) may also be used, along with MIMO up to 16×16. Therefore, there is a need in the art to effectively support low latency and ultra-fast transmission like new radio (NR) in 5G technology.

SUMMARY

The present disclosure describes systems and methods for efficiently allocating a multi-resource unit to a user in a wireless local area network (WLAN) system.

According to an aspect of the inventive concept, there is provided a method of wireless communication, the method comprising allocating, by a first device, at least one resource unit (RU) to a second device; generating an RU allocation subfield defining the allocated at least one RU; generating a physical layer protocol data unit (PPDU) including a preamble, wherein the preamble includes the RU allocation subfield; and transmitting the PPDU to the second device, wherein the allocating of the at least one RU comprises: allocating a single RU or a multi-RU to the second device; and setting a maximum of one multiplexed device in a single RU or in a multi-RU corresponding to less than 242 subcarriers.

According to another aspect of the inventive concept, there is provided a device, comprising a transceiver configured to transmit a PPDU to a second device, wherein the transceiver comprises a signal processor configured to allocate a single RU or a multi-RU to the second device, to generate a preamble including an RU allocation subfield defining allocated at least one RU, and to generate the PPDU including the preamble, and wherein the signal processor is configured to set a maximum of one multiplexed second device in a single RU and/or a multi-RU corresponding to less than 242 subcarriers.

According to another aspect of the inventive concept, there is provided a method of wireless communication, the method comprising receiving, at a second device, a PPDU from a first device; extracting an RU allocation subfield from a preamble included in the PPDU; and identifying an allocation of a RU and a number of multiplexed devices based on the RU allocation subfield, wherein the identifying of the allocation of the RU and the number of multiplexed devices comprises, when at least one of a single RU and a multi-RU corresponding to less than 242 subcarriers is identified, identifying a maximum of one multiplexed device.

According to another aspect of the inventive concept, there is provided a method of wireless communication, the method comprising allocating, by a first device, at least one RU to a second device; generating an RU allocation subfield defining the allocated at least one RU; generating a PPDU including a preamble, wherein the preamble includes the RU allocation subfield; and transmitting the PPDU to the second device, wherein the allocating of the at least one RU comprises allocating a single RU or a multi-RU to the second device; and setting a maximum of one multiplexed device in a single RU or a multi-RU corresponding to less than 106 subcarriers.

According to another aspect of the inventive concept, there is provided a method of communication, the method comprising allocating, by a first device, a single RU or a multi-RU to a second device; generating an RU allocation subfield defining at least one RU allocated to the second device; generating a PPDU including a preamble, wherein the preamble includes the RU allocation subfield; and transmitting the PPDU to the second device, wherein the generating of the RU allocation subfield comprises, when the allocated single RU or multi-RU corresponds to 242 or more subcarriers, generating a plurality of RU allocation subfields, and each of the plurality of RU allocation subfields defines at least a portion of the allocation of the at least one RU and a number of multiplexed devices in the at least one RU.

BRIEF DESCRIPTION OF THE DRAWINGS

Embodiments of the inventive concept will be more clearly understood from the following detailed description taken in conjunction with the accompanying drawings in which:

FIG. 20 is a table illustrating RU arrangement indexing;

FIG. 23 is a diagram illustrating examples of a multi-RU according to an embodiment;

FIGS. 24A to 24C are diagrams illustrating RU allocation indexing according to an embodiment;

FIGS. 25A to 25C are diagrams illustrating RU allocation indexing according to an embodiment;

FIGS. 26A to 26C are diagrams illustrating RU allocation indexing according to an embodiment;

FIGS. 27A to 27C are diagrams illustrating RU allocation indexing according to an embodiment;

FIGS. 28A to 28D are diagrams illustrating RU allocation indexing according to an embodiment;

FIGS. 29A to 29D are diagrams illustrating RU allocation indexing according to an embodiment;

FIGS. 30A to 30C are diagrams illustrating RU allocation indexing according to an embodiment;

FIGS. 31A to 31C are diagrams illustrating RU allocation indexing according to an embodiment;

DETAILED DESCRIPTION OF THE EMBODIMENTS

Figure 1:
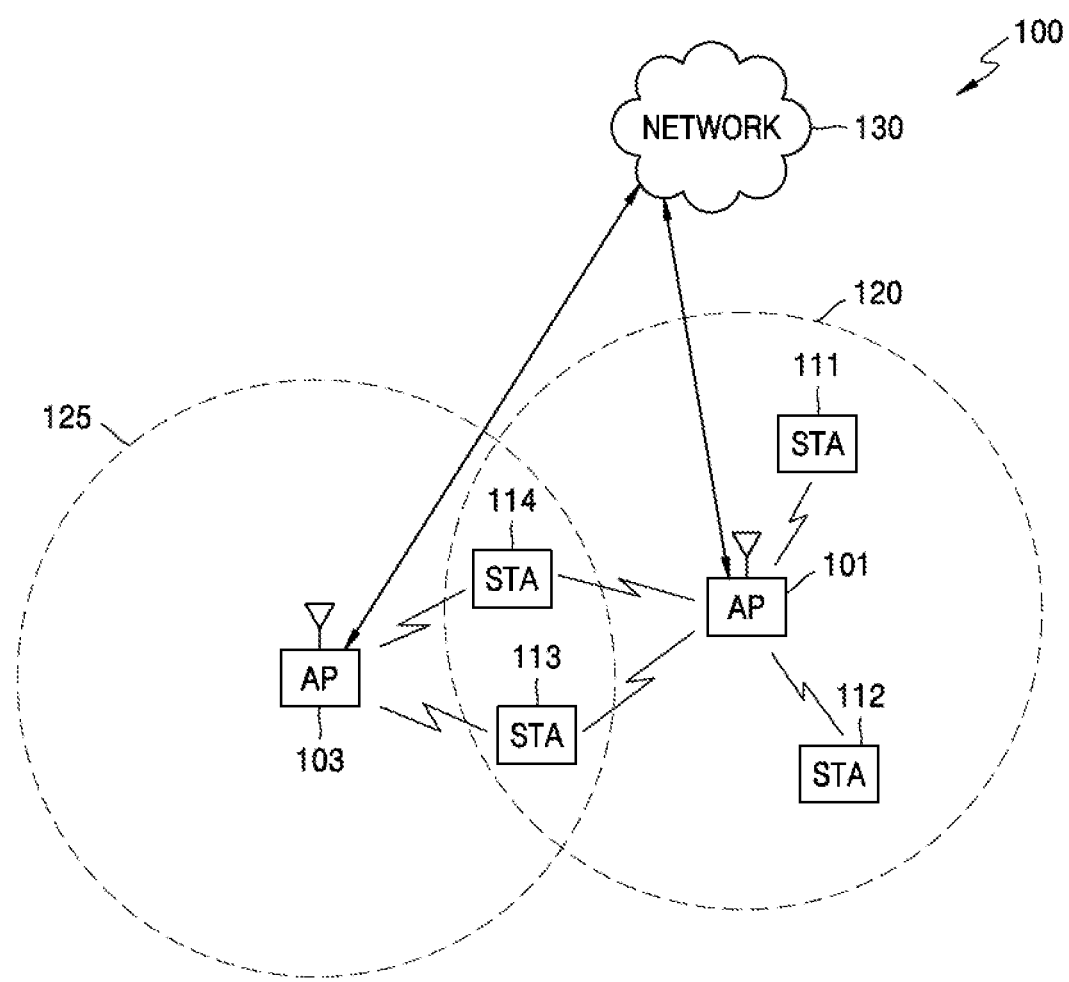
FIG. 1 is a view illustrating a wireless local area network (WLAN) system.

The present disclosure relates generally to wireless communication. Embodiments of the present disclosure include an apparatus and method for communication based on a multi-resource unit (multi-RU) in a wireless local area network (WLAN) system The present disclosure also describes various embodiments for an access point and a single station sharing information about allocation of a multi-resource unit supported in an extremely high throughput signal. For an access point and a single station to share information about resource unit allocation, a new resource unit allocation subfield, which defines allocations of multi-resource units, is used for extremely high throughput signals.

According to one embodiment, a first device communicates with at least one second device in a WLAN system. The first device may allocate at least one resource unit (RU) to the at least one second device, and may generate an RU allocation subfield defining the allocated RU. The allocation of the RU may include allocating a single RU or a multi-RU to a second device, as well as setting a maximum of one multiplexed second device in a single RU and/or a multi-RU corresponding to less than 242 subcarriers.

Hereinafter, embodiments of the inventive concept will be described in detail with reference to the accompanying drawings. Advantages and features of the inventive concept and a method of achieving the advantages and the features will be clarified with reference to embodiments described in detail with the accompanying drawings. However, the inventive concept is not limited to the embodiments illustrated hereinafter and is implemented in various forms. The embodiments of the present disclosure make the inventive concept complete. Additionally, or alternatively, the inventive concept is provided to completely inform those skilled in the art of the scope of the inventive concept and is defined by claims. Specific configurations described in the embodiments of the inventive concept may be used in other embodiments. Like reference numerals refer to like elements throughout.

Terms used in the present disclosure are for describing embodiments and are not for limiting the inventive concept. In the present disclosure, a singular form includes a plural form unless specially described. Described components, processes, operations and/or elements do not exclude the presence or addition of one or more other components, processes, operations and/or elements.

Unless otherwise defined, all the terms (including technological and scientific terms) used in the present disclosure may be used in the meaning that may be commonly understood by those skilled in the art. Additionally, or alternatively, terms defined in a commonly used dictionary are not ideologically or excessively interpreted unless specially defined.

Additionally, or alternatively, in describing the embodiments of the inventive concept, orthogonal frequency division multiplexing (OFDM) or an OFDM-based wireless communication system, in particular, the IEEE 802.11 standard is described. However, the gist of the inventive concept may be slightly modified and applied to other communication systems with a similar technological background and channel type (for example, a cellular communication system such as long term evolution (LTE), LTE-Advanced (LTE-A), new radio (NR), wireless broadband (WiBro), or global system for mobile communication (GSM) or a remote communication system such as Bluetooth or near field communication (NFC) without remarkably deviating from a range of the inventive concept by those skilled in the art.

Before performing a detailed description, predetermined words and phrases used over the present disclosure will be defined. "connects (combines)" and derivatives thereof refer to direct or indirect communication between two or more components that physically contact or do not physically contact. The terms "transmits", "receives", and "communicates" and derivatives thereof include all direct and indirect communication. "Comprises" and/or "comprising" used in the specification mean inclusion without limit. "or" is a collective term meaning 'and/or'. "is related to ~" and derivatives thereof mean includes, is included in ~, is connected to ~, implies, is implied in ~, is connected to ~, is combined with ~, may communicate with ~, cooperates with ~, interposes, puts in parallel, is close to ~, is bound to ~, has, has a feature of ~, and has a relation with ~. "a controller" means a certain device, system, or a part thereof controlling at least one operation. The controller may be implemented by hardware or a combination of hardware and software and/or firmware. A function related to a specific controller may be locally or remotely concentrated or dispersed. "at least one~" means that, when a list of items is used, one or more different combinations of the items may be used and only one item in the list may be used. For example, "at least one of A, B, and C" include one of the combinations of A, B, C, and A and B, A and C, B and C, and A and B and C.

Additionally, or alternatively, various functions described hereinafter may be implemented or supported by one or more computer programs and each of the programs is formed of computer-readable program code and is executed in a computer-readable recording medium. "an application" and "a program" refer to one or more computer programs, software components, instruction sets, processes, functions, objects, classes, instances, related data, or parts thereof suitable for implementation of pieces of computer-readable program code. "computer-readable program code" include all types of computer code including source code, object code, and execution code. "Computer-readable media" include all types of media that may be accessed by a computer such as read only memory (ROM), random access memory (RAM), a hard disk drive, a compact disk (CD), a digital video disk (DVD), and other types of memory. "non-transitory" computer-readable media exclude wired, wireless, optical, or other communication links transmitting temporary electrical or other signals. Non-temporary computer-readable media include a medium in which data may be permanently stored and a medium in which data may be stored and may be overwritten later, such as a rewritable optical disk or a deletable memory device.

In various embodiments of the inventive concept described hereinafter, a hardware access method will be described as an example. However, in various embodiments of the inventive concept, because a technology using both hardware and software is included, various embodiments of the inventive concept do not exclude a software-based access method.

Additionally, or alternatively, a term referring to control information used in the following description, a term referring to an entry, a term referring to a network entity, a term referring to a message, and a term referring to a component of a device are illustrated for the sake of convenience. Therefore, the inventive concept is not limited to the following terms, and other terms with the same technical meaning may be used.

Figure 2:
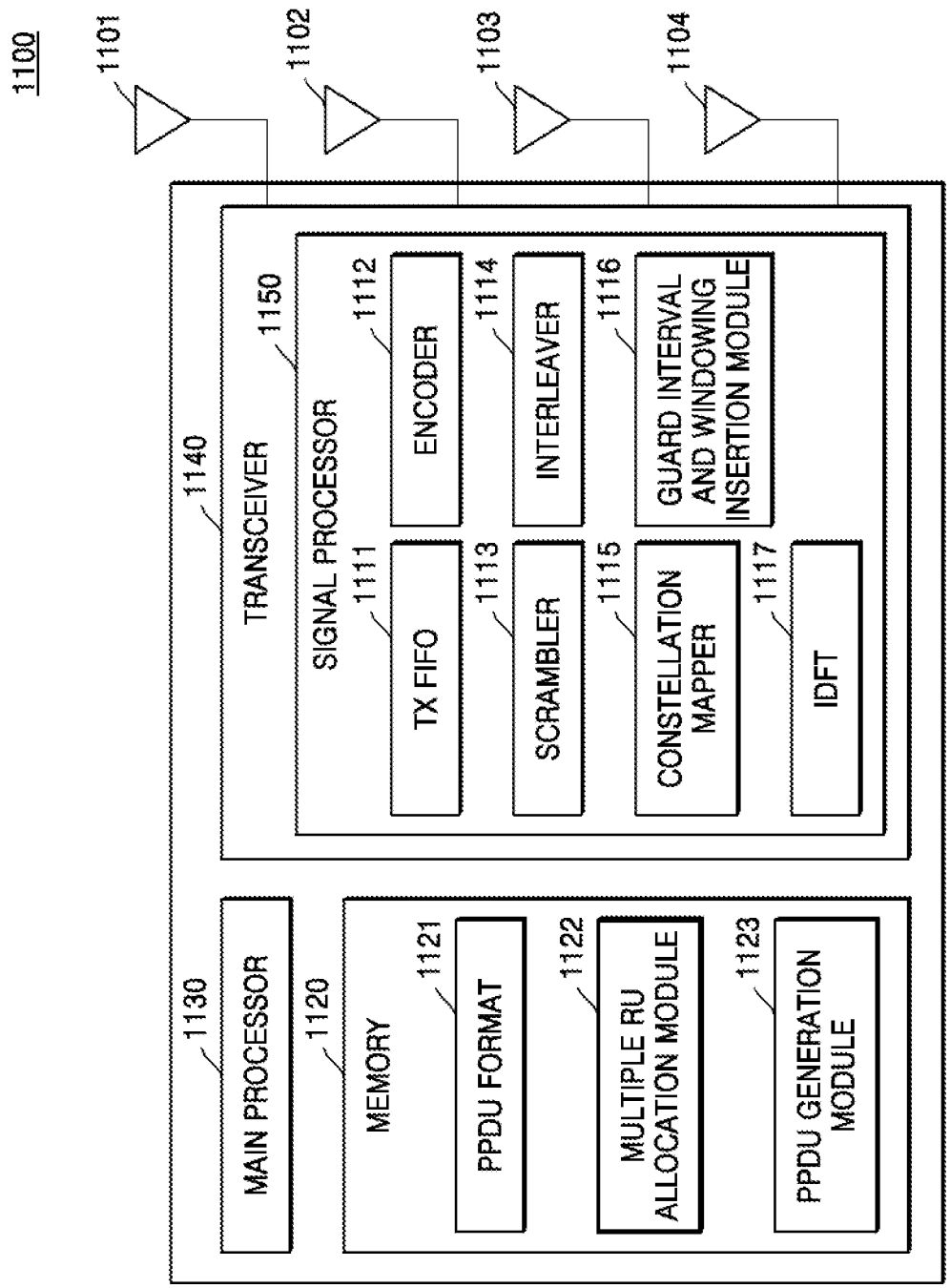
FIG. 2 is a block diagram illustrating a wireless communication device transmitting or receiving a physical layer convergence protocol (PLCP) protocol data unit (PPDU)

FIG. 1 is a view illustrating a wireless local area network (WLAN) system 100. FIG. 2 is a block diagram illustrating a wireless communication device 1100 transmitting or receiving a physical layer convergence protocol (PLCP) protocol data unit (PPDU). In some cases, the PPDU may include resource unit (RU) allocation information.

In some embodiments, an RU refers to a group of bandwidth subcarriers. For example, in OFDMA terminology for a WLAN standard, an RU may refer to a group of 78.125 kHz bandwidth subcarriers (tones) used in both Downlink (DL) and Uplink (UL) transmissions. In some examples, different transmit power settings may be used for different RUs. In some examples, there are a maximum of 9 RUs for 20 MHz of bandwidth, 18 RUs for 40 MHz, and more for 80 or 160 MHz bandwidth. The use of RUs can enable an Access Point (AP) 101 or 103 to provide multiple WLAN devices simultaneous access.

As illustrated in FIG. 1, the WLAN system 100 may include APs 101 and 103. The APs 101 and 103 may communicate with at least one network 130 such as the Internet, an internet protocol (IP) network, or another data network.

The APs 101 and 103 may provide wireless connection to the network 130 for a plurality of stations (STAs) 111 to 114 in coverage areas 120 and 125 thereof. The APs 101 and 103 may communicate with each other by using wireless fidelity (Wi-Fi) or other WLAN communication technologies. The APs 101 and 103 may communicate with the STAs 111 to 114 by using the Wi-Fi or other WLAN communication technologies. Herein, AP may be referred to a first device and STA may be referred to a second device. Accordingly, the first device may communicate with at least one second device.

For reference, in accordance with a network type, other well-known terms such as "a router" and "a gateway" may be used instead of "the AP". Additionally, or alternatively, in the WLAN, the AP is provided for a wireless channel. An AP may also be referred to as a station STA.

Additionally, or alternatively, in accordance with the network type, "the STA" may be used instead of other well-known terms such as "a mobile station", "a subscriber station", "a remote terminal", "user equipment", "a wireless terminal", "a user device", or "a user". For convenience, in the present disclosure, "the STA" is used for representing a remote wireless device wirelessly connected to the AP or connected to the wireless channel in the WLAN. In the present disclosure, the STA is considered as a mobile device (for example, a mobile telephone or a smartphone). However, the STA may be a fixed device (for example, a desktop computer, the AP, a media player, a fixed sensor, or a television set).

Approximate extents of the coverage areas 120 and 125 are marked with dashed lines. Here, the coverage areas 120 and 125 are illustrated as being circular for convenience. However, each of the coverage areas 120 and 125 related to the APs 101 and 103 may have another shape to which a varying change in wireless environment related to a natural or artificial obstruction is reflected or another irregular shape in accordance with the setting of the APs 101 and 103.

As described in detail later, the APs 101 and 103 may include circuitry and/or a program for managing transmission of an uplink multiuser (ULMU) or a downlink multiuser (DLMU) in the WLAN system 100.

Although FIG. 1 illustrates an example of the WLAN system 100, an embodiment of the inventive concept is not limited thereto. For example, various changes may be made to FIG. 1.

For example, the WLAN system 100 may include an arbitrary number of properly arranged APs and an arbitrary number of STAs. Additionally, or alternatively, the AP 101 may directly communicate with an arbitrary number of STAs. The AP 101 may provide wireless broadband access to the plurality of STAs 111 to 114 via the network 130.

Similarly, each of the APs 101 and 103 may directly communicate with the network 130 and may provide wireless broadband access to the plurality of STAs 111 to 114 via the network 130. Additionally, or alternatively, the APs 101 and 103 may be configured to connect to a varying external network such as an external telephone network or a data network.

Continuously, in FIG. 2, a wireless communication device transmitting or receiving the PPDU is illustrated.

For reference, the wireless communication device 1100 of FIG. 2 may be a transmission device (for example, the AP) or a receiving device (for example, the STA) with a transceiver capable of performing data communication. For example, the wireless communication device 1100 of FIG. 2 may be one of the APs 101 and 103 and the plurality of STAs 111 to 114 illustrated in FIG. 1 and may be applied to a sensor used for, for example, a computer, a smartphone, a portable electronic device, a tablet, a wearable device, or an Internet of Things (IoT).

For convenience, hereinafter, a case in which the wireless communication device 1100 is the transmission device is taken as an example.

The wireless communication device 1100 may include a main processor 1130, memory 1120, a transceiver 1140, and antenna arrays 1101 to 1104. The main processor 1130, the memory 1120, the transceiver 1140, and the antenna arrays 1101 to 1104 may be directly and indirectly connected to each other.

The main processor 1130 may control the memory 1120 and the transceiver 1140. A PPDU format and multiple resource unit (RU) allocation information may be stored in the memory 1120. Additionally, or alternatively, the transceiver 1140 may generate the PPDU by using the PPDU format and the multiple RU allocation information stored in the memory 1120. Furthermore, the transceiver 1140 may transmit the generated PPDU to an external receiving device (for example, the STA) through the antenna arrays 1101 to 1104.

Here, the memory 1120 may store a PPDU format 1121 including a multiple RU allocation signaling format according to an embodiment of the inventive concept, which will be described later. Additionally, or alternatively, the memory 1120 may store processor-executable instructions executing a multiple RU allocation module 1122 and a PPDU generation module 1123. The processor-executable instructions may be executed by the main processor 1130.

For reference, the multiple RU allocation module 1122 may use an RU allocation algorithm, method, or policy to allocate a multiple RU to a user (for example, the STA) according to an embodiment of the inventive concept. The PPDU generation module 1123 may generate signaling and indication related to multiple RU allocation in a control field (hereinafter, referred to as a signaling field; for example, HE-SIG-A, HE-SIG-B, or EHT-SIG) of the PPDU.

On the other hand, the transceiver 1140 may include a signal processor 1150. The signal processor 1150 may include various modules (for example, various transmission path modules) generating sections of the PPDU or various types of communication transmission units.

The signal processor 1150 may include a transmit first-in-first-out (TX FIFO) 1111, an encoder 1112, a scrambler 1113, an interleaver 1114, a constellation mapper 1115 capable of, for example, generating a QAM symbol, a guard interval and windowing insertion module 1116 capable of, for example, providing a guard interval on a frequency to reduce interference on a spectrum and transforming a signal through windowing, and an inversed discrete Fourier transformer (IDFT) 1117.

For reference, the transceiver 1140 may include parts well-known to those skilled in the art as illustrated in the drawing. The corresponding parts may be executed by a method well-known to those skilled in the art by using hardware, firmware, software logic, or a combination of hardware, firmware, and software logic.

When the wireless communication device 1100 is a receiving device, the transceiver 1140 illustrated in FIG. 2 may include components in a receiving path.

For example, when the wireless communication device 1100 is a receiving device, the transceiver 1140 may receive the PPDU with a preamble and a payload from the transmission device. The transceiver 1140 may decode the payload based on the preamble of the received PPDU. For example, the transceiver 1140 may identify an RU allocated for the receiving device by decoding the preamble of the PPDU through an internal decoder and may decode the payload (for example, the payload received from the transmission device) transmitted to the receiving device based on the identified RU.

A subject of 'the decoding work' may not be the transceiver 1140 but another component (for example, the main processor 1130). However, according to an embodiment of the inventive concept, it is illustrated that the payload is decoded based on the preamble of the PPDU received by the transceiver 1140.

Although FIG. 2 illustrates an example of the wireless communication device 1100, an embodiment of the inventive concept is not limited thereto. For example, various changes may be made to FIG. 2.

Hereinafter, high efficiency (HE) PPDUs used in the institute of electrical and electronics engineers (IEEE) standard (for example, 802.11ax) will be described with reference to FIGS. 3 to 15. For reference, the HE PPDUs described with reference to FIGS. 3 to 15 may be generated by the wireless communication device 1100 of FIG. 2.

Figure 3:
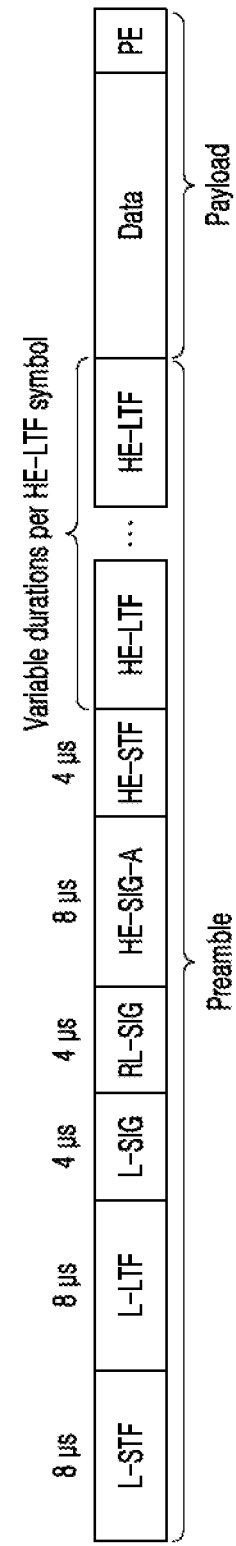
FIG. 3 is a view illustrating a structure of a high efficiency (HE) single user (SU) PPDU.
Figure 4:
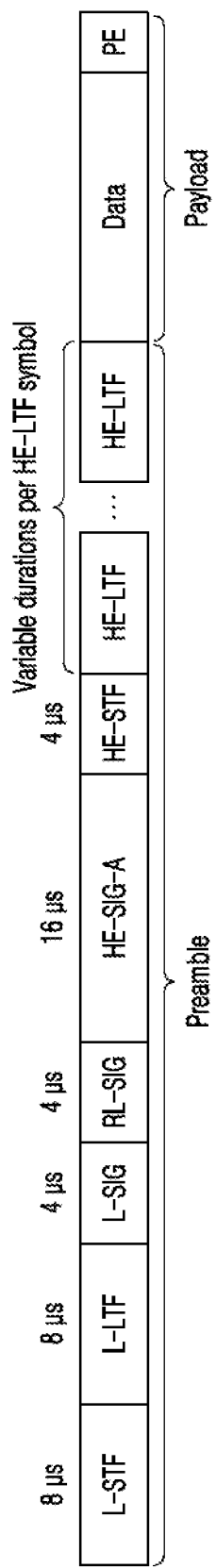
FIG. 4 is a view illustrating a structure of an HE extended range (ER) SU PPDU.
Figure 5:
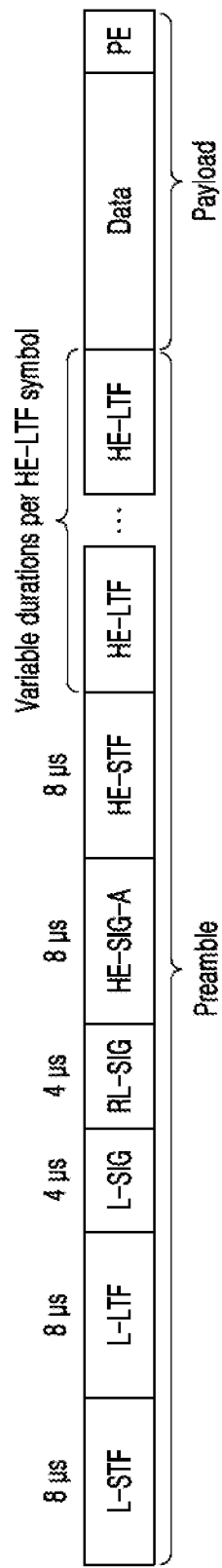
FIG. 5 is a view illustrating a structure of an HE trigger based (TB) PPDU.
Figure 6:
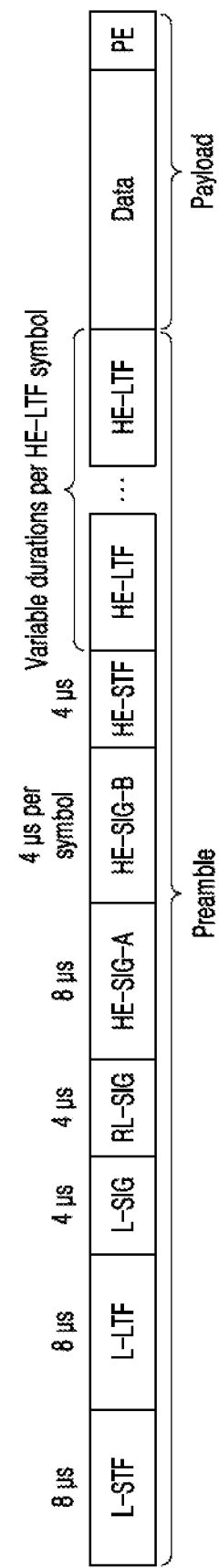
FIG. 6 is a view illustrating a structure of an HE multiuser (MU) PPDU.
Figure 7:
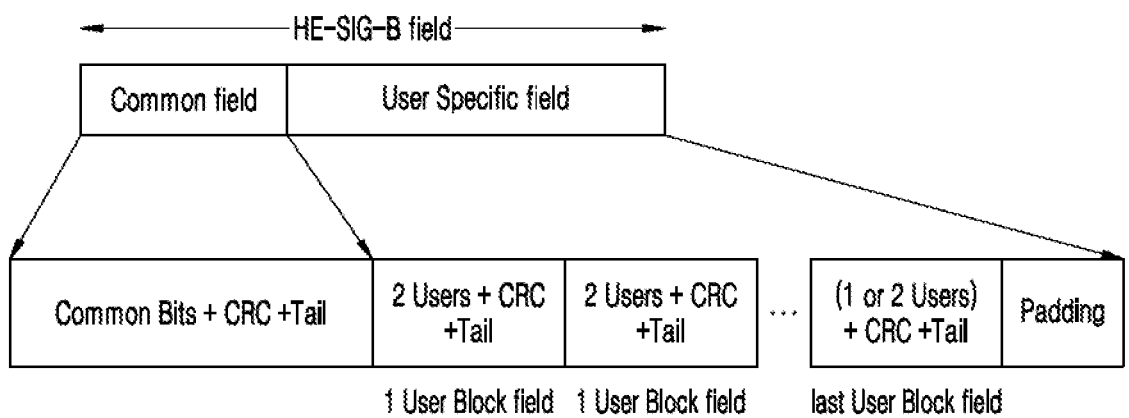
FIG. 7 is a view illustrating a structure of the HE-SIG-B field of FIG. 6.
Figure 8:
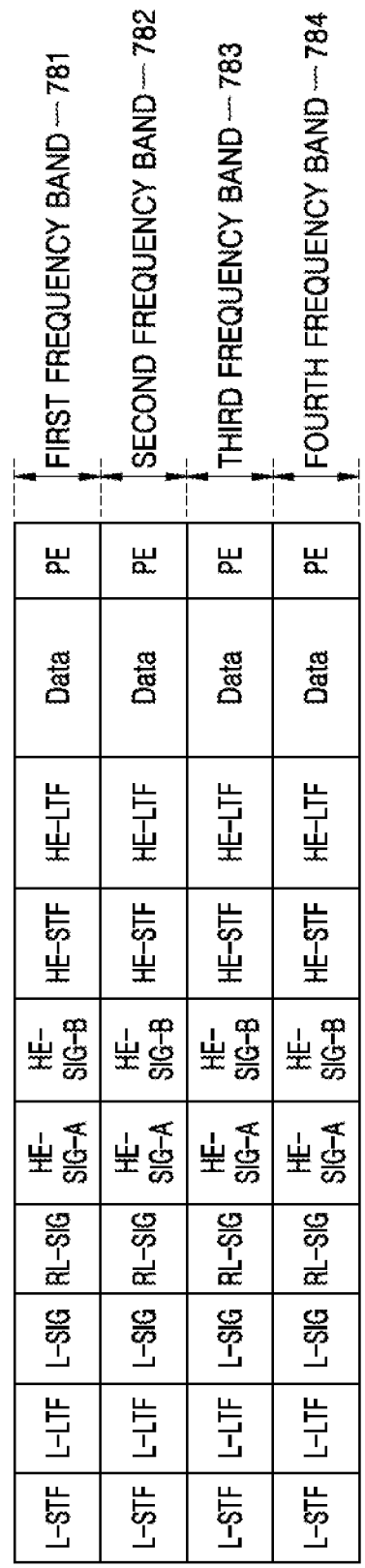
FIG. 8 is a view illustrating that the HE MU PPDU is arranged by frequency band.
Figure 9:
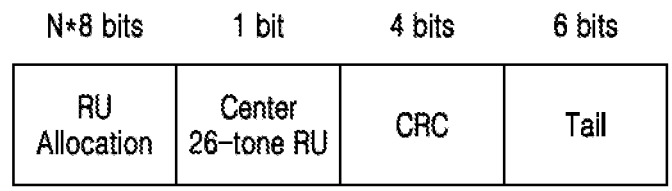
FIG. 9 is a view illustrating a structure of the common field of FIG. 7.
Figure 10:
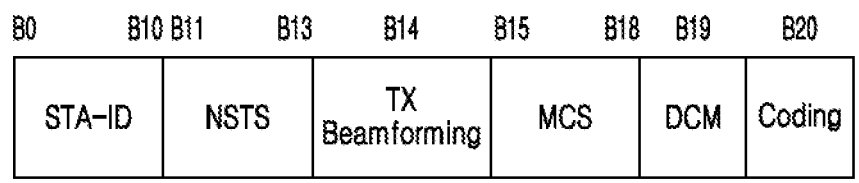
FIG. 10 is a view illustrating an example of the user specific field of FIG. 7.
Figure 11:
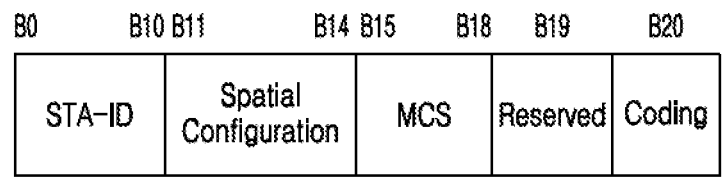
FIG. 11 is a view illustrating another example of the user specific field of FIG. 7.
Figure 12:
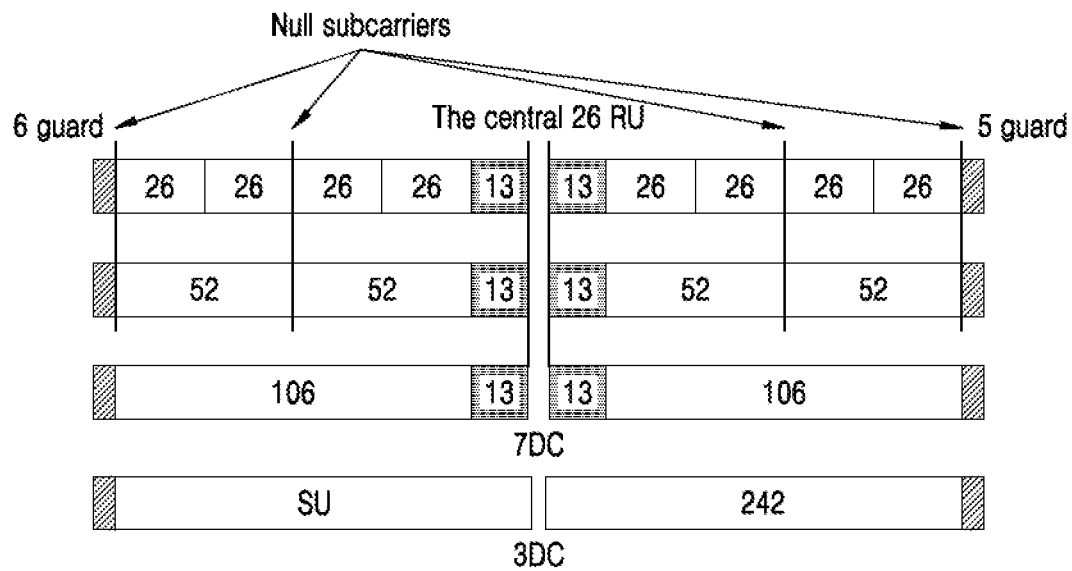
FIG. 12 is a view illustrating an example of a size and a position of a resource unit (RU) available in a 20 MHz OFDMA PPDU.
Figure 13:
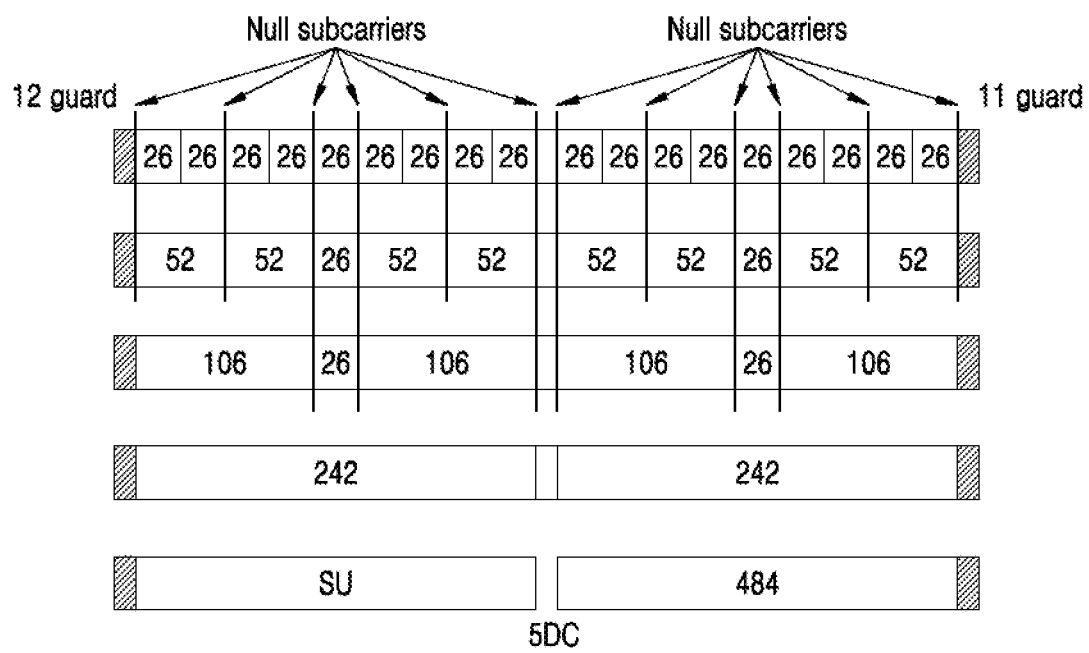
FIG. 13 is a view illustrating an example of a size and a position of an RU available in a 40 MHz OFDMA PPDU.
Figure 14:
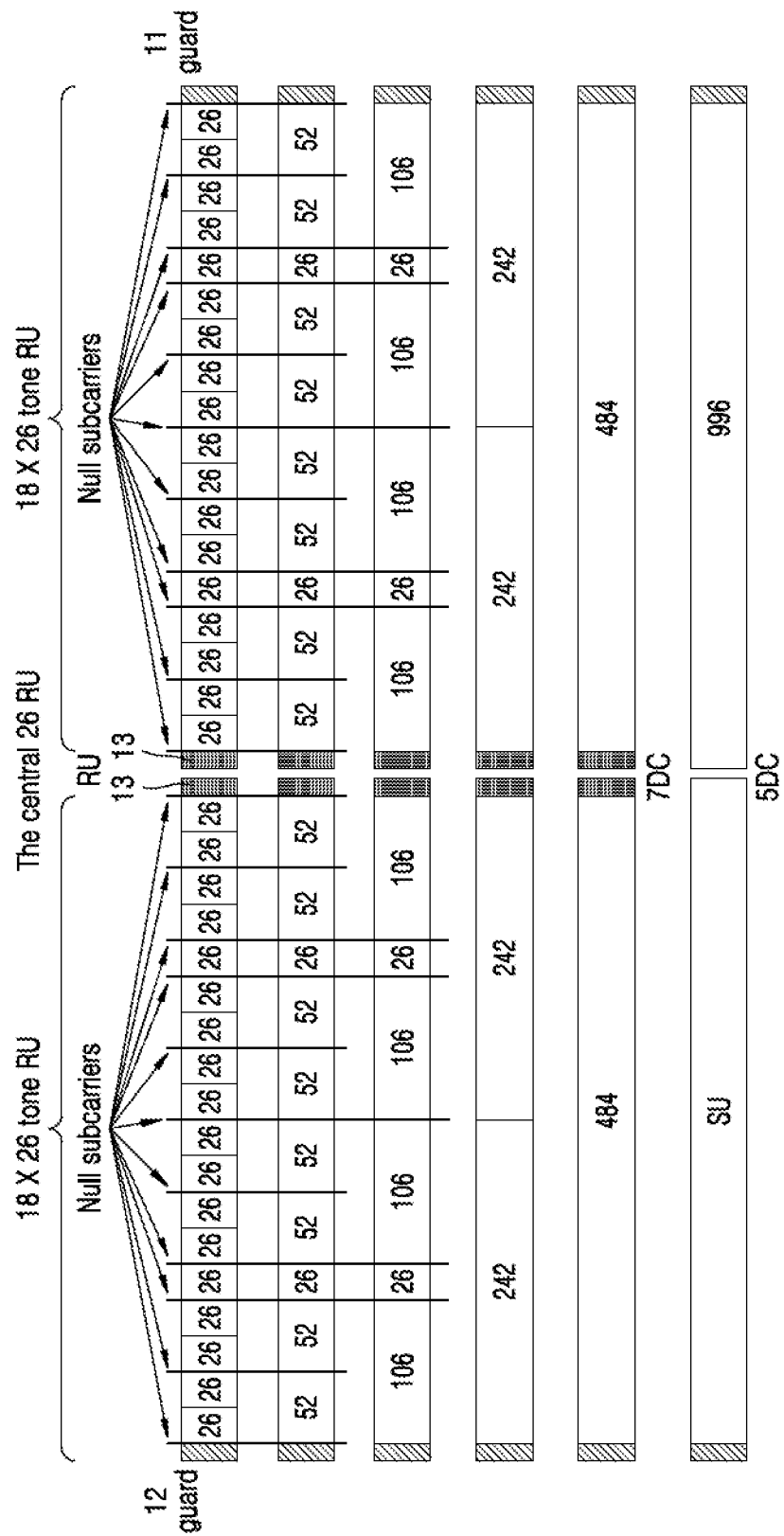
FIG. 14 is a view illustrating an example of a size and a position of an RU available in an 80 MHz OFDMA PPDU.
Figure 15:
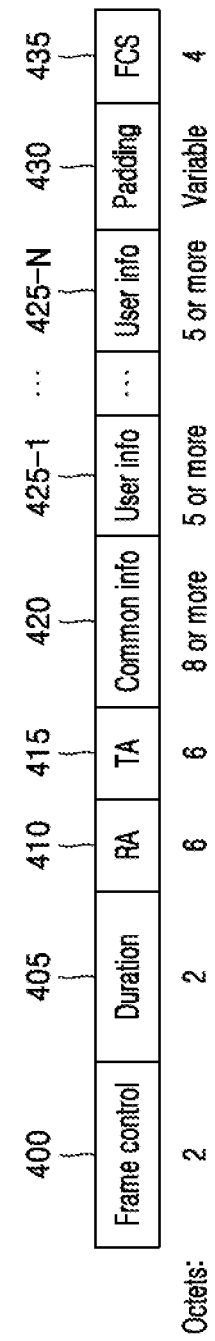
FIG. 15 is a view illustrating a structure of a trigger frame.

FIG. 3 is a view illustrating a structure of an HE single user (SU) PPDU. FIG. 4 is a view illustrating a structure of an HE extended range (ER) SU PPDU. FIG. 5 is a view illustrating a structure of an HE trigger-based (TB) PPDU. FIG. 6 is a view illustrating a structure of an HE multiuser (MU) PPDU. FIG. 7 is a view illustrating a structure of the HE-SIG-B field of FIG. 6. FIG. 8 is a view illustrating that the HE MU PPDU is arranged by frequency band. FIG. 9 is a view illustrating a structure of the common field of FIG. 7. FIG. 10 is a view illustrating an example of the user-specific field of FIG. 7. FIG. 11 is a view illustrating another example of the user-specific field of FIG. 7. FIG. 12 is a view illustrating an example of a size and a position of an RU available in a 20 MHz orthogonal frequency division multiple access (OFDMA) PPDU. FIG. 13 is a view illustrating an example of a size and a position of an RU available in a 40 MHz OFDMA PPDU. FIG. 14 is a view illustrating an example of a size and a position of an RU available in an 80 MHz OFDMA PPDU. FIG. 15 is a view illustrating a structure of a trigger frame.

As illustrated in FIGS. 3 to 6, each HE PPDU may include a preamble including a plurality of training fields and a plurality of signaling fields and a payload including a data (DATA) field and a packet extension (PE) field.

Each HE PPDU may include a legacy-short training field (L-STF) with a length of 8 us, a legacy-long training field (L-LTF) with a length of 8 us, a legacy-signal (L-SIG) field with a length of 4 us, a repeated L-SIG (RL-SIG) field with a length of 4 us, a high efficiency-signal-A (HE-SIG-A) field with a length of 8 us, an HE-STF with a length of 4 us, an HE-LTF, a DATA field, and a PE field.

The HE SU PPDU of FIG. 3 does not include an HE-SIG-B field, and the HE MU PPDU of FIG. 6 may further include the HE-SIG-B field. The HE ER SU PPDU of FIG. 4 does not include the HE-SIG-B field. However, a symbol of the HE-SIG-A field may be repeated with a length of 16 us. Additionally, or alternatively, the HE TB PPDU of FIG. 5 does not include the HE-SIG-B field. However, a symbol of the HE-STF may be repeated with a length of 8 us.

Here, the fields included in the preamble will be described as follows.

The L-STF may include a short training orthogonal frequency division multiplexing (OFDM) symbol and may be used for frame detection, automatic gain control (AGC), diversity detection, and coarse frequency/time synchronization.

The L-LTF may include a long training OFDM symbol and may be used for fine frequency/time synchronization and channel estimation.

The L-SIG field may be used for transmitting control information and may include information on a data rate and a data length. For reference, the L-SIG field may be repeatedly transmitted. A format in which the L-SIG field is repeated is referred to as the RL-SIG field.

The HE-SIG-A field may include control information common to the receiving device, which is as follows.

1) a downlink (DL)/uplink (UL) indicator
2) a basic service set (BSS) color field that is an identifier of a BSS
3) a field indicating a remaining time of a current transmission opportunity (TXOP) period
4) a bandwidth field indicating 20/40/80/160/80+80 MHz
5) a field indicating a modulation and coding scheme (MCS) applied to the HE-SIG-B field
6) a field indicating whether the HE-SIG-B field is modulated by a dual subcarrier modulation scheme
7) a field indicating the number of symbols used for the HE-SIG-B field
8) a field indicating whether the HE-SIG-B field is generated over the entire band
9) a field indicating the number of symbols of the HE-LTF
10) a field indicating a length of the HE-LTF and a length of a cyclic prefix (CP) field
11) a field indicating whether an additional OFDM symbol is provided for low-density parity check (LDPC) coding
12) a field indicating control information on the PE field
13) a field indicating information on a cyclical redundancy check (CRC) field of the HE-SIG-A field SIG-A field The HE-SIG-A field may further include various information items other than the above-described 1) to 13) or may not include partial information items among the above-described 1) to 13). In environments other than an MU environment, partial information items may be further added to the HE-SIG-A field or partial information items of the HE-SIG-A field may be omitted.

The HE-SIG-B field may be used for the PPDU for the MU. For example, the HE-SIG-B field may be omitted from the PPDU for the SU. For reference, because the HE-SIG-A field or the HE-SIG-B field may include RU allocation information on at least one receiving device, the HE-SIG-B field will be described hereinafter in detail with reference to FIGS. 7 to 11.

As illustrated in FIG. 7, the HE-SIG-B field may include a common field including common control information and a user-specific field including user-specific control information.

Here, the common field may be separately encoded from the user-specific field. Additionally, or alternatively, the common field may include RU allocation-related information and 'a CRC subfield' corresponding to the RU allocation-related information and may be coded by one binary convolutional coding (BCC) block. The user-specific field may include information for decoding payloads of two users (for example, two STAs) and 'a CRC subfield' corresponding to the information and may be coded by one BCC block.

For reference, the HE-SIG-B field may be obtained by duplicating an HE-SIG-B field of another frequency band.

For example, referring to FIG. 8, an HE-SIG-B field transmitted by a partial frequency band (for example, a fourth frequency band 784) may include control information for a data field of another frequency band (for example, a second frequency band 782) as well as a data field of the corresponding frequency band (for example, the fourth frequency band 784). Therefore, the HE-SIG-B field of a specific frequency band (for example, the second frequency band 782) may be a format (for example, a form) obtained by duplicating the HE-SIG-B field of another frequency band (for example, the fourth frequency band 784). Therefore, the HE-SIG-B field may be transmitted to an entire RU in encoded form.

On the other hand, as illustrated in FIG. 9, the common field of the HE-SIG-B field may include various subfields such as an RU allocation subfield, a center 26-tone RU subfield, a CRC subfield, and a tail subfield.

The RU allocation subfield may include N×8 (N is one of 1, 2, and 4) bits. The RU allocation subfield may indicate RU allocation in a frequency domain and the number of user fields (for example, the number of STAs) in each RU. Additionally, or alternatively, an RU with a size of no less than 106-subcarriers (for example, 106-tones) supporting multi-user multi-input multi-output (MU-MIMO) may indicate the number of multiplexed users by using the MU-MIMO.

For reference, N may be 1 for 20 MHz and 40 MHz HE MU PPDUs, N may be 2 for an 80 MHz HE MU PPDU, and N may be 4 for a 160 MHz or 80+80 MHz HE MU PPDU.

On the other hand, the center 26-tone RU subfield may include 1 bit and may be provided to indicate whether an entire bandwidth is 80 MHz, 160 MHz, or 80+80 MHz. The CRC subfield may include 4 bits and may be used for detecting an error for common field data. Additionally, or alternatively, the tail subfield may include 6 bits, may be used for terminating trellis of a convolution decoder, and may be set as 0.

Continuously, as illustrated in FIGS. 10 and 11, the user-specific field of the HE-SIG-B field may include various subfields such as an STA-ID subfield, an MCS subfield, a coding subfield.

For reference, configurations of subfields of the user-specific field of the HE-SIG-B field may change in accordance with whether the user-specific field is an MU-MIMO allocation field.

In FIG. 10, when the user-specific field of the HE-SIG-B field is not the MU-MIMO allocation field (for example, non-MU-MIMO), the user-specific field of the HE-SIG-B field may include an STA-ID subfield (including B0 to B10—11 bits), an NSTS subfield (including B11 to B13—3 bits), a TX beamforming subfield (including B14—1 bit), an MCS subfield (including B15 to B18—4 bits), a dual carrier modulation (DCM) subfield (including B19—1 bit), and a coding subfield (including B20—1 bit).

A value of the STA-ID subfield may be set as a value of a TXVECTOR parameter STA_ID. The NSTS subfield may be divided into a case in which the STA-ID subfield is 2046 and a case in which the STA-ID subfield is not 2046 and may indicate the number of space-time streams (NSTS). Therefore, when the STA-ID subfield is not 2046, the NSTS subfield may be set as the number of space-time streams−1. On the other hand, when the STA-ID subfield is 2046, the NSTS subfield may be set as an arbitrary value.

The TX beamforming subfield may be divided into a case in which the STA-ID subfield is 2046 and a case in which the STA-ID subfield is not 2046 and may be used for transmit beamforming. Therefore, when the STA-ID subfield is not 2046, the TX beamforming subfield may be set as 1 (for example, a case in which a beamforming steering matrix is applied to a waveform of SU transmission) or 0 (other cases). On the other hand, when the STA-ID subfield is 2046, the TX beamforming subfield may be set as an arbitrary value.

The MCS subfield may be divided into a case in which the STA-ID subfield is 2046 and a case in which the STA-ID subfield is not 2046 and may indicate a modulation and coding scheme. Therefore, when the STA-ID subfield is not 2046, the MCS subfield may be set as n (n=0, 1, 2, . . . , 11/12 to 15 are reserved). On the other hand, when the STA-ID subfield is 2046, the MCS subfield may be set as an arbitrary value.

The DCM subfield may be divided into a case in which the STA-ID subfield is 2046 and a case in which the STA-ID subfield is not 2046 and may indicate whether a DCM is used. Therefore, when the STA-ID subfield is not 2046, the DCM subfield may be set as 1 (representing that a corresponding payload of a user of the HE MU PPDU is modulated into the DCM) or 0 (representing that the corresponding payload of the user of the HE MU PPDU is not modulated into the DCM). On the other hand, when the STA-ID subfield is 2046, the DCM subfield may be set as an arbitrary value.

The coding subfield may be divided into a case in which the STA-ID subfield is 2046 and a case in which the STA-ID subfield is not 2046 and may indicate whether BCC or LDPC is used. Therefore, when the STA-ID subfield is 2046, the coding subfield may be set as 0 (representing that the BCC is used) or 1 (representing that the LDPC is used). On the other hand, when the STA-ID subfield is not 2046, the coding subfield may be set as an arbitrary value.

On the other hand, in FIG. 11, when the user-specific field of the HE-SIG-B field is the MU-MIMO allocation field (for example, MU-MIMO), the user-specific field of the HE-SIG-B field may include an STA-ID subfield (including B0 to B10—11 bits), a spatial configuration subfield (including B11 to B14—4 bits), an MCS subfield (including B15 to B18—4 bits), a reserved subfield (including B19—1 bit), and a coding subfield (including B20—1 bits).

A value of the STA-ID subfield may be set as a value indicated by a TXVECTOR parameter STA_ID. The spatial configuration subfield may be used for indicating the number of spatial streams for a user (for example, the STA) while allocating the MU-MIMO.

The MCS subfield may indicate a modulation and coding scheme. Therefore, the MCS subfield may be set as n (n=0, 1, 2, . . . , 11/12 to 15 are reserved).

The reserved subfield may be reserved and set as 0. The coding subfield may display whether the BCC or the LDPC is used. Therefore, the coding subfield may be set as 0 (representing that the BCC is used) or 1 (representing that the LDPC is used).

In FIG. 11, the coding subfield may be divided into a case in which the STA-ID subfield is 2046 and a case in which the STA-ID subfield is not 2046. The descriptions above are of the case in which the STA-ID subfield is not 2046. For example, when the STA-ID subfield is 2046, the spatial configuration subfield, the MCS subfield, the reserved subfield, and the coding subfield may be set as arbitrary values.

Because the HE-SIG-B field may be formed as described above, a detailed description thereof will not be given.

Referring to FIGS. 3 to 6 again, the HE-STF may be used for improving automatic gain control estimation in a multiple-input multiple-output (MIMO) environment or an OFDMA environment.

The HE-LTF may be used for estimating a channel in the MIMO environment or the OFDMA environment.

A magnitude of fast Fourier transform (FFT)/inverse fast Fourier transform (IFFT) applied to the HE-STF, and the fields after the HE-STF, may be different from a magnitude of FFT/IFFT applied to the fields before the HE-STF. For example, the magnitude of the FFT/IFFT applied to the HE-STF, and the fields after the HE-STF, may be greater than the magnitude of the FFT/IFFT applied to the fields before the HE-STF.

Therefore, a frequency band used by the fields before the HE-STF may not correctly coincide with a frequency band used by the HE-STF and the fields after the HE-STF. For convenience, FIGS. 3 to 6 illustrate the frequency band used by the fields before the HE-STF correctly coincides with the frequency band used by the HE-STF and the fields after the HE-STF.

Continuously, the fields included in the payload will be described as follows.

The data field may include data for at least one user. For example, the data field may carry a physical layer service data unit (PSDU) for at least one user.

Additionally, or alternatively, at least one RU including different numbers of tones (for example, subcarriers) may be arranged in a frequency domain of the data field based on the RU allocation information included in the signaling field of the preamble.

For example, as illustrated in FIGS. 12 to 14, at least one RU may be arranged in the frequency domain (for reference, the horizontal axis of each of FIGS. 12 to 14 represents the frequency domain) of the data field.

First, in FIG. 12, the arrangement of the RU available in the 20 MHz OFDMA PPDU is illustrated.

In the leftmost band of a 20 MHz band, six tones (for example, subcarriers) may be used as a guard band and, in the rightmost band of the 20 MHz band, five tones may be used as a guard band. Seven direct current (DC) tones may be inserted into a central band. For example, a DC band and a 26-subcarrier RU corresponding to 13 tones may be provided on each of left and right sides of the DC band. Additionally, or alternatively, 26-subcarrier RUs, 52-subcarrier RUs, and 106-subcarrier RUs may be allocated for other bands. Each RU may be allocated for a receiving device, for example, a user.

For reference, the RU arrangement of FIG. 12 may be used for a situation for an SU as well as a situation for a MU. Therefore, as illustrated in the uppermost portion of FIG. 12, a plurality of 26-subcarrier RUs may be arranged and, as illustrated in the lowermost portion of FIG. 12, one 242-subcarrier RU may be arranged (in this case, three DC tones may be inserted into the central band).

Various sizes of RUs, for example, the 26-subcarrier RUs, the 52-subcarrier RUs, the 106-subcarrier RUs, and the 242-subcarrier RU are suggested in an example of FIG. 12. Because the specific sizes of the RUs may increase, an embodiment of the inventive concept is not limited to the specific sizes (for example, the numbers of corresponding tones) of the RUs.

Continuously, in FIG. 13, the arrangement of the RU available in the 40 MHz OFDMA PPDU is illustrated.

In the leftmost band of a 40 MHz band, 12 tones (for example, subcarriers) may be used as a guard band and, in the rightmost band of the 40 MHz band, 11 tones may be used as a guard band. Additionally, or alternatively, five DC tones may be inserted into a central band, for example, a DC band. Additionally, or alternatively, 26-subcarrier RUs, 52-subcarrier RUs, 106-subcarrier RUs, and 242-subcarrier RUs may be allocated for other bands. Each RU may be allocated for a receiving device, for example, a user.

For reference, the RU arrangement of FIG. 13 may be used for a situation for a SU as well as a situation for a MU. Therefore, as illustrated in the lowermost portion of FIG. 13, one 484-subcarrier RU may be arranged (in this case, five DC tones may be inserted into the central band).

Various sizes of RUs, for example, the 26-subcarrier RUs, the 52-subcarrier RUs, the 106-subcarrier RUs, the 242-subcarrier RUs, and the 484-subcarrier RU are suggested in an example of FIG. 13. Because the specific sizes of the RUs may increase, an embodiment of the inventive concept is not limited to the specific sizes (for example, the numbers of corresponding tones) of the RUs.

Finally, in FIG. 14, the arrangement of the RU available in the 80 MHz OFDMA PPDU is illustrated.

In the leftmost band of an 80 MHz band, 12 tones (for example, subcarriers) may be used as a guard band and, in the rightmost band of the 80 MHz band, 11 tones may be used as a guard band. Additionally, or alternatively, seven DC tones may be inserted into a central band, for example, a DC band. Additionally, or alternatively, 26-subcarrier RUs, 52-subcarrier RUs, 106-subcarrier RUs, 242-subcarrier RUs, and 484-subcarrier RUs may be allocated for other bands. Each RU may be allocated for a receiving device, for example, a user.

For reference, the RU arrangement of FIG. 14 may be used for a situation for a SU as well as a situation for a MU. Therefore, as illustrated in the lowermost portion of FIG. 14, one 996-subcarrier RU may be arranged (in this case, five DC tones may be inserted into the central band).

Various sizes of RUs, for example, the 26-subcarrier RUs (hereinafter, mixed with RU26), the 52-subcarrier RUs (hereinafter, mixed with RU52), the 106-subcarrier RUs (hereinafter, mixed with RU106), the 242-subcarrier RUs (hereinafter, mixed with RU242), the 484-subcarrier RUs (hereinafter, mixed with RU484), and the 996-subcarrier RU (hereinafter, mixed with RU996) are suggested in an example of FIG. 14. Because the specific sizes of the RUs may increase, an embodiment of the inventive concept is not limited to the specific sizes (for example, the numbers of corresponding tones) of the RUs.

For reference, RU positions available in the 40 MHz OFDMA PPDU are the same as two replicas of RU positions available in the 20 MHz OFDMA PPDU. Additionally, or alternatively, RU positions available in the 80 MHz OFDMA PPDU are the same as two replicas of the RU positions available in the 40 MHz OFDMA PPDU. One OFDMA PPDU may include a combination of different RU sizes in each RU242 boundary.

As described above, at least one RU may be variously arranged in a frequency domain of a data field.

Referring to FIGS. 3 to 6 again, the PE field may have a duration of 4 us, 8 us, 12 us, or 16 us and may provide an additional receive processing time at an end of the HE PPDU.

Because the fields of the preamble and the payload of the HE PPDU are formed as described above, in an embodiment of the inventive concept, one of the above-described HE PPDUs may be applied.

For reference, when a UL transmission work is performed by one or more STAs (for example, non-AP STAs) on a frequency domain, the AP may allocate different frequency resources for one or more STAs as UL transmission resources based on the OFDMA. Here, the frequency resource may mean the RU and may be indicated by a trigger frame transmitted by the AP to the STA before the UL transmission work.

Therefore, to transmit the HE TB PPDU of FIG. 5, the trigger frame is used. The trigger frame is illustrated in FIG. 15.

The trigger frame may allocate the RU for UL multiple-user transmission and may be transmitted by the AP to the STA. Additionally, or alternatively, the trigger frame may be formed of a MAC frame and may be included in the PPDU.

The trigger frame may be transmitted through the PPDU illustrated in FIGS. 3 to 6 or a PPDU specially designed for the corresponding trigger frame. For reference, when the trigger frame is transmitted through the PPDU illustrated in FIGS. 3 to 6, the trigger frame may be included in the data field.

As illustrated in FIG. 15, a trigger frame may include a frame control field 400 (2 octets), a duration field 405 (2 octets), an RA field 410 (6 octets), a TA field 415 (6 octets), a common information field 420 (no less than 8 octets), individual user information fields 425-1 to 425-N (N is a natural number of no less than 1 and each no less than 5 octets), a padding field 430, and a frame check sequence (FCS) field 435 (no less than 4 octets).

First, the frame control field 400 may include information on a version of a MAC protocol and other additional control information items and the duration field 405 may include time information for setting a network allocation vector (NAV) or information on an identifier (for example, an association ID (AID)) of a terminal. Additionally, or alternatively, the RA field 410 may include address information of the receiving device (for example, the STA) of the corresponding trigger frame and may be omitted. The TA field 415 may include address information of the transmission devices (for example, the APs) of the corresponding trigger frame and the common information field 420 may include common control information applied to the receiving devices (for example, the STAs) receiving the corresponding trigger frame.

For reference, in the TA field 415, a field indicating a length of an L-SIG field of an UL PPDU transmitted to the corresponding trigger frame or information controlling the content of an SIG-A field (for example, the HE-SIG-A field) of the UL PPDU transmitted to the corresponding trigger frame may be included. Additionally, or alternatively, in the TA field 415, as common control information, information on a length of a CP of the UL PPDU transmitted to the corresponding trigger frame or information on a length of an LTF field may be included.

The trigger frame may include the individual user information fields 425-1 to 425-N (N is a natural number of no less than 1) corresponding to the number of receiving devices (for example, the STAs) receiving the trigger frame. For reference, the individual user information fields may be referred to as "RU allocation fields". The trigger frame may include the padding field 430 and the FCS field 435.

Some fields of the trigger frame may be omitted, and other fields may be added. Additionally, or alternatively, a length of each field may be differently changed from being illustrated.

As described above, because the various HE PPDUs are used in the IEEE standard (for example, 802.11ax), an embodiment of the inventive concept may be implemented in the signaling fields (for example, the HE-SIG-A field and the HE-SIG-B field) of the above-described various HE PPDUs.

For example, an embodiment of the inventive concept relates to the method and the apparatus for supporting the MU by using the OFDMA, and more particularly, to the method and the apparatus for the transmission devices (for example, the APs) allocating the multiple RU for at least one of the plurality of receiving devices (for example, the STAs) through the OFDMA. Therefore, according to an embodiment of the inventive concept, a method and an apparatus for forming the signaling fields indicating information on the multiple RU allocated for the receiving devices (for example, the STAs) are provided. However, an embodiment of the inventive concept may be applied to a case in which an STA transmits data to an STA and a case in which an STA transmits data to an AP. Additionally, or alternatively, an embodiment of the inventive concept may be applied to an environment in which a single user such as a SU PPDU is supported as well as a DL OFDMA method and a UL OFDMA.

Furthermore, an embodiment of the inventive concept may also be applied to 802.11be, which is a next-generation WLAN standard. Therefore, because the method and the apparatus for allocating the multiple RU according to an embodiment of the inventive concept may be implemented in signaling fields (for example, extremely high throughout (EHT)-SIG fields) of EHT PPDUs, hereinafter, with reference to FIGS. 16 and 17, the EHT PPDUs used in the IEEE standard (for example, 802.11be) will be described. For reference, the EHT PPDUs described with reference to FIGS. 16 and 17 may be generated by the wireless communication device 1100 of FIG. 2.

Figure 16:
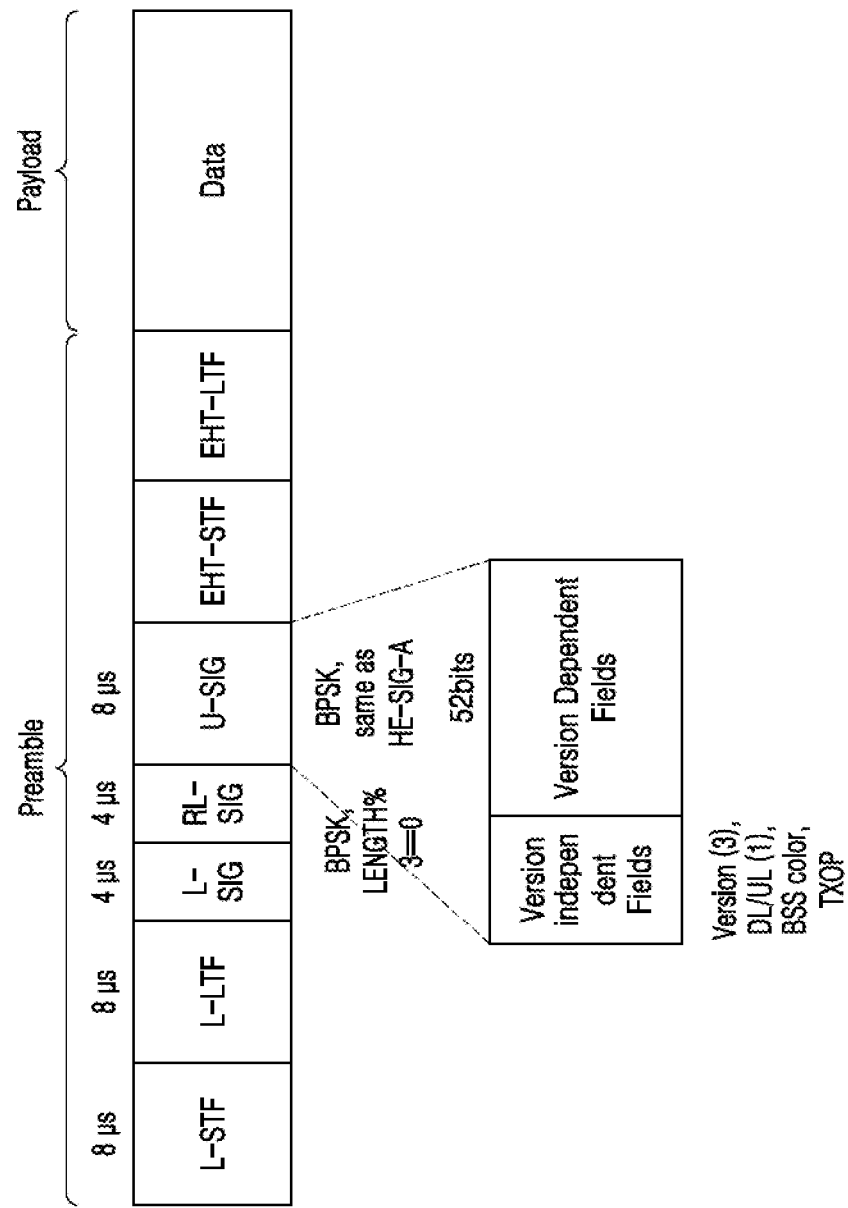
FIG. 16 is a view illustrating a structure of an extremely high throughput (EHT) TB PPDU.
Figure 17:
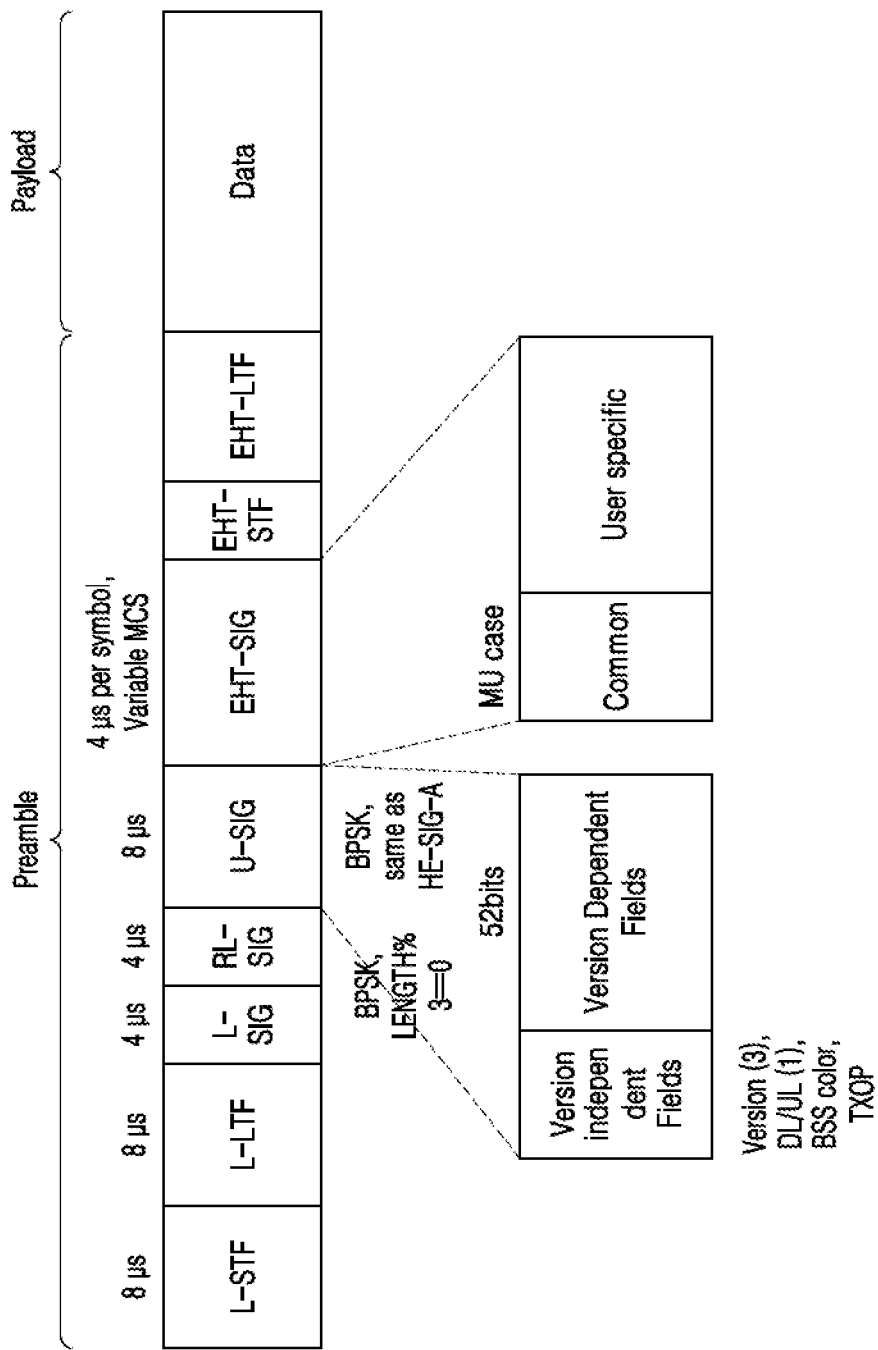
FIG. 17 is a view illustrating a structure of an EHT MU PPDU.

FIG. 16 is a view illustrating a structure of an EHT TB PPDU. FIG. 17 is a view illustrating a structure of an EHT MU PPDU.

As illustrated in FIGS. 16 and 17, each EHT PPDU may include a preamble including a plurality of training fields and a plurality of signaling fields, and a payload including a data field.

Each EHT PPDU may include an L-STF with a length of 8 us, an L-LTF with a length of 8 us, an L-SIG field with a length of 4 us, a repeated L-SIG (RL-SIG) field with a length of 4 us, a universal-signal (U-SIG) field with a length of 8 us, an EHT-STF, an EHT-LTF, and a DATA field.

The EHT TB PPDU of FIG. 16 does not include an EHT-SIG field. However, a symbol of the EHT-STF may be repeated. The EHT MU PPDU of FIG. 17 may include a plurality of OFDM symbols and may further include the EHT-SIG field. Additionally, or alternatively, like the above-described HE TB PPDU of FIG. 5, the EHT TB PPDU of FIG. 16 may use a trigger frame to transmit the EHT TB PPDU. The trigger frame for transmitting the EHT TB PPDU may have a structure and a function similar to those of the above-described trigger frame of FIG. 15.

For reference, a PE field may be further included in each EHT PPDU. However, according to an embodiment of the inventive concept, for convenience, it is illustrated that each EHT PPDU does not include the PE field.

On the other hand, fields included in each EHT PPDU will be described as follows.

For reference, because 'the L-STF', 'the L-LTF', 'the L-SIG field', and 'the RL-SIG field' of each EHT PPDU are the same as or similar to 'the L-STF', 'the L-LTF', 'the L-SIG field', and 'the RL-SIG field' of the above-described HE PPDU, detailed description thereof will not be given.

The U-SIG field performing a function similar to that of the HE-SIG-A field of the HE PPDU may be arranged immediately next to the RL-SIG field and may include commonly encoded two OFDM symbols.

The U-SIG field may include 'version-independent fields' and 'version-dependent fields' and 'the version-dependent fields' may be arranged next to 'the version-independent fields'.

Here, 'the version-independent fields' may have a static location and bit definition over different generations/physical versions.

Additionally, or alternatively, 'the version-independent fields' may include, for example, next control information.
1) a PHY version identifier (including three bits)
2) an uplink (UL)/downlink (DL) flag (including one bit)
3) a BSS color field that is an identifier of a BSS
4) a transmit opportunity (TXOP) duration (for example, a field indicating a remaining time of a current TXOP period)
5) a bandwidth field (that may carry partial puncturing information)

On the other hand, 'the version-dependent fields' may have variable bit definition in each PHY version.

Additionally, or alternatively, 'the version-dependent fields' may include, for example, next control information.
1) a PPDU type (a field indicating the PPDU type)
2) an EHT-SIG modulation and coding scheme (MCS) (a field indicating the MCS and provided in the U-SIG field of the EHT PPDU, which is transmitted to the MU)
3) the number of EHT-SIG symbols (a field indicating the number of symbols used for the EHT-SIG field and provided in the U-SIG field of the EHT PPDU, which is transmitted to the MU)

The U-SIG field may further include various information items other than the above-described control information or may not include partial information among the above-described control information items. In environments other than an MU environment, partial information may be further added to the U-SIG field or partial information of the U-SIG field may be omitted.

The EHT-SIG field performing a function similar to that of the HE-SIG-B field of the HE PPDU may be arranged immediately next to the U-SIG field in the EHT PPDU, which is transmitted to the MU, and may have a variable MCS and a variable length.

The EHT-SIG field may include a common field including common control information and a user-specific field including user-specific control information.

Here, the common field may be encoded apart from the user-specific field. Additionally, or alternatively, the common field may include RU allocation related information described later (for example, information including 'an RU allocation subfield' and 'an additional RU allocation subfield', which is described later) and the user-specific field may include information (for example, user information allocated for each RU) similar to information included in the user-specific field of the above-described HE-SIG-B field.

For reference, in the common field of the EHT-SIG field of the EHT PPDU, which is transmitted to the MU, at least one compression mode in which 'the RU allocation subfield' is not provided may be provided. Additionally, or alternatively, the EHT-SIG field may be basically used for the PPDU for the MU. However, unlike in 'the HE PPDU', when an overhead of the U-SIG field increases, the EHT-SIG field may be used for the PPDU for transmitting the SU.

Because the EHT-SIG field may be formed as described above, a detailed description thereof will not be given.

As described above, because the various EHT PPDUs may be used in the IEEE standard (for example, 802.11be) and the fields of the preambles and the payloads of the EHT PPDUs may be formed as described above, an embodiment of the inventive concept may be implemented in the signaling fields (for example, the U-SIG field and the EHT-SIG field) of the above-described various EHT PPDUs.

For example, because the method of allocating the multiple RU (for example, a method of forming a signaling field for multiple RU allocation) according to an embodiment of the inventive concept may be applied to both the signaling field of the HE PPDU and the signaling field of the EHT PPDU, hereinafter, with reference to FIGS. 18 to 26, the method of allocating the multiple RU according to an embodiment of the inventive concept will be described.

Figure 18:
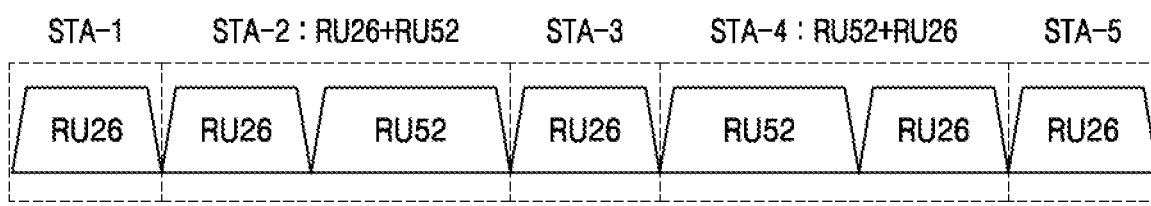
FIG. 18 is a view illustrating an example in which multiple RUs are allocated for stations (STA) in the 20 MHz OFDMA PPDU formed of small-size RUs.
Figure 19:
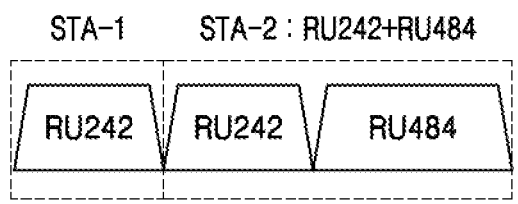
FIG. 19 is a view illustrating an example in which a multiple RU is allocated for an STA in the 80 MHz OFDMA PPDU formed of large-size RUs.

FIG. 18 is a view illustrating an example in which multiple RUs are allocated for STAs in the 20 MHz OFDMA PPDU formed of small-size RUs. FIG. 19 is a view illustrating an example in which a multiple RU is allocated for an STA in the 80 MHz OFDMA PPDU formed of large-size RUs. FIG. 20 is a table illustrating RU arrangement indexing. In some embodiments, an RU may include one single RU among a 26-subcarrier RU, a 52-subcarrier RU, a 106-subcarrier RU, a 242-subcarrier RU, a 484-subcarrier RU, and a 996-subcarrier RU and/or one multiple RU among a 26+52-subcarrier RU (a multiple RU of RU26+RU52), a 52+26-subcarrier RU (a multiple RU of RU52+RU26), a 26+106-subcarrier RU (a multiple RU of RU26+RU106), a 106+26-subcarrier RU (a multiple RU of RU106+RU26), a 484+242-subcarrier RU (a multiple RU of RU484+RU242), a 484+996-subcarrier RU (a multiple RU of RU484+RU996), and three 996-subcarrier RUs (a multiple RU of RU996+RU996+RU996).

First, referring to FIG. 20, a first table T1 may include allocations of various single RUs and values of RU allocation subfields corresponding thereto, and each of the RU allocation subfields may have a length of 8-bits. Also, the first table T1 may include a number of available entries in a corresponding row. For example, in the first table T1, an RU allocation subfield corresponding to the allocation of an RU with a maximum of sixteen multiplexed STAs may have a binary number '0110$y_1y_0z_1z_0$' corresponding to values of 96 to 111, and the number of multiplexed STAs may be calculated based on an equation '$2^3y_1+2^2y_0+2z_1+z_0+1$' based on lower significant four bits (i.e., '$y_1y_0z_1z_0$'). When a single RU is allocated to a single STA, an AP may provide the STA with a signaling field (i.e., an RU allocation subfield) that defines RU allocation, and the STA may identify the allocation of the RU based on the RU allocation subfield. For example, the AP may allocate an RU based on the first table T1 of FIG. 20, and the STA may identify the RU allocation based on the first table T1. However, as illustrated in FIGS. 18 and 19, an RU allocation subfield differing from an RU allocation subfield defined by the first table T1 may be used for sharing a multi-RU allocated to a single STA.

First, referring to FIGS. 18 and 19, an example in which multiple RUs are allocated for STAs in the 20 MHz OFDMA PPDU formed of the small-size RUs and an example in which a multiple RU is allocated for an STA in the 80 MHz OFDMA PPDU formed of the large-size RUs are illustrated.

For reference, for efficiency of multiple RU allocation, RUs may be divided into the small-size RUs and the large-size RUs in accordance with the sizes of the RUs.

Here, a small-size RU may be one among the 26-subcarrier RU, the 52-subcarrier RU, and the 106-subcarrier RU, and a large-size RU may be one among the 242-subcarrier RU, the 484-subcarrier RU, and the 996-subcarrier RU.

Therefore, as illustrated in FIG. 18 (a small-size RU case), RU26+RU52 (for example, the 26-subcarrier RU+the 52-subcarrier RU) that is a multiple RU is allocated for an STA-2 so that the STA-2 may receive data from the AP and RU52+RU26 (for example, the 52-subcarrier RU+the 26-subcarrier RU) that is a multiple RU is allocated for an STA-4 so that the STA-4 may receive data from the AP. One RU is allocated for the remaining STAs (for example, an STA-1, an STA-3, and an STA-5) so that the STA-1, the STA-3, and the STA-5 may receive data from the AP.

Additionally, or alternatively, as illustrated in FIG. 19 (a large-size RU case), RU242+RU484 (for example, the 242-subcarrier RU+the 484-subcarrier RU) that is a multiple RU is allocated for an STA-2 so that the STA-2 may receive data from the AP. One RU is allocated for a remaining STA (for example, an STA-1) so that the STA-1 may receive data from the AP.

As described above, when the STA receives data through the multiple RU, the corresponding STA knows which multiple RU is allocated therefore through the signaling field. Therefore, according to an embodiment of the inventive concept, a method of forming a signaling field indicating information on the multiple RU allocated for the STA is to be suggested. The method will be described in detail with reference drawings below. For reference, it is premised that a method of forming signaling fields of a PPDU, which will be described later, may be applied to both the HE PPDU and the EHT PPDU.

Figure 21:
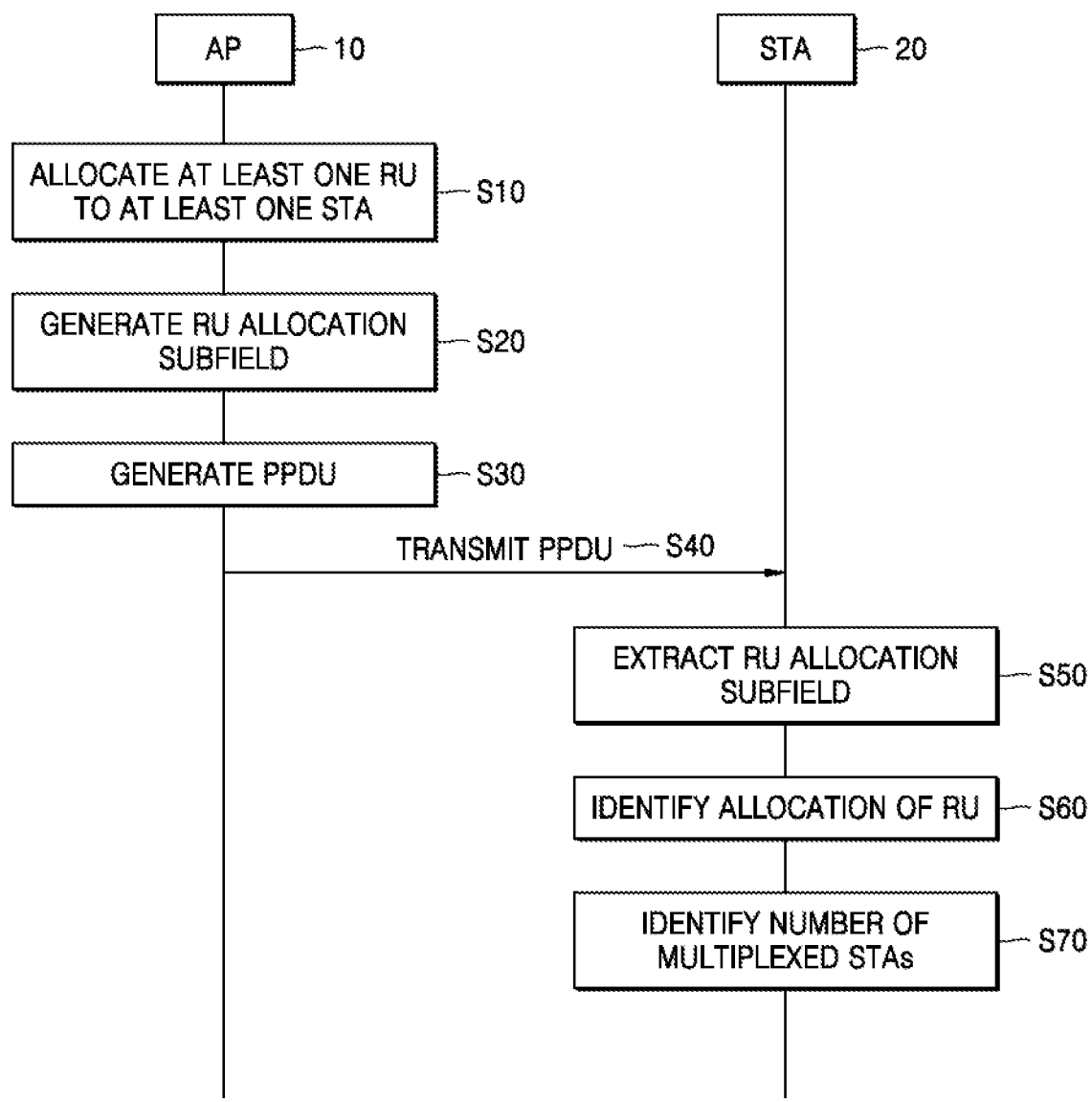
FIG. 21 is a message diagram illustrating a method for communication based on a multi-RU, according to an embodiment.

FIG. 21 is a message diagram illustrating a method for communication based on a multi-RU, according to an embodiment. In detail, the message diagram of FIG. 21 illustrates examples of operations of an AP 10 and an STA 20, which communicate with each other. In some embodiments, the AP 10 may communicate with at least one STA with the STA 20 included in a coverage area.

Referring to FIG. 21, in operation S10, the AP 10 may allocate at least one RU to at least one STA. For example, the AP 10 may allocate at least one RU to at least one STA, for communicating with the at least one STA with the STA 20. For example, the AP 10 may allocate a single RU or a multi-RU, corresponding to relatively more subcarriers, to an STA with relatively high data throughput and may allocate a single RU or a multi-RU, corresponding to relatively fewer subcarriers, to an STA with relatively low data throughput. An example of operation S10 will be described below with reference to FIG. 22.

In operation S20, the AP 10 may generate an RU allocation subfield. For example, the AP 10 may generate an RU allocation subfield based on the allocation of the RU, which is determined in operation S10. In some embodiments, the AP 10 may generate an RU allocation subfield based on a table shared with the STA 20, and the generated RU allocation subfield may define the allocation of a multi-RU as well as allocation of a single RU. An example of operation S20 will be described below with reference to FIG. 32, and examples of a table shared by the AP 10 and the STA 20 will be described below with reference to FIGS. 23 to 31C.

In operation S30, the AP 10 may generate a PPDU. For example, the AP 10 may generate a signaling field including the RU allocation subfield that is generated in operation S20, generate a preamble including a training field and a signaling field, and generate a PPDU including a preamble and a payload. Subsequently, in operation S40, the AP 10 may transmit the PPDU to the STA 20, and the STA 20 may receive the PPDU from the AP 10.

In operation S50, the STA 20 may extract an RU allocation subfield. For example, the STA 20 may extract a preamble from the PPDU which is received in operation S40 and may extract an RU allocation subfield from a signaling field included in the preamble.

In operation S60, the STA 20 may identify the allocation of the RU. For example, the STA 20 may identify the allocation of the RU corresponding to the RU allocation subfield that is extracted in operation S50, based on the table shared with the AP 10. The STA 20 may identify allocation of a multi-RU as well as allocation of a single RU, based on the RU allocation subfield.

In operation S70, the STA 20 may identify the number of multiplexed devices. For example, the STA 20 may identify the number of multiplexed STAs corresponding to the RU allocation subfield that is extracted in operation S50, based on the table shared with the AP 10. In some embodiments, the table shared by the STA 20 and the AP 10 may limit the number of multiplexed STAs to a fewer number than a maximum number (for example, 16) supportable by an EHT MU PPDU, based on a limited length of the RU allocation subfield.

Figure 22:
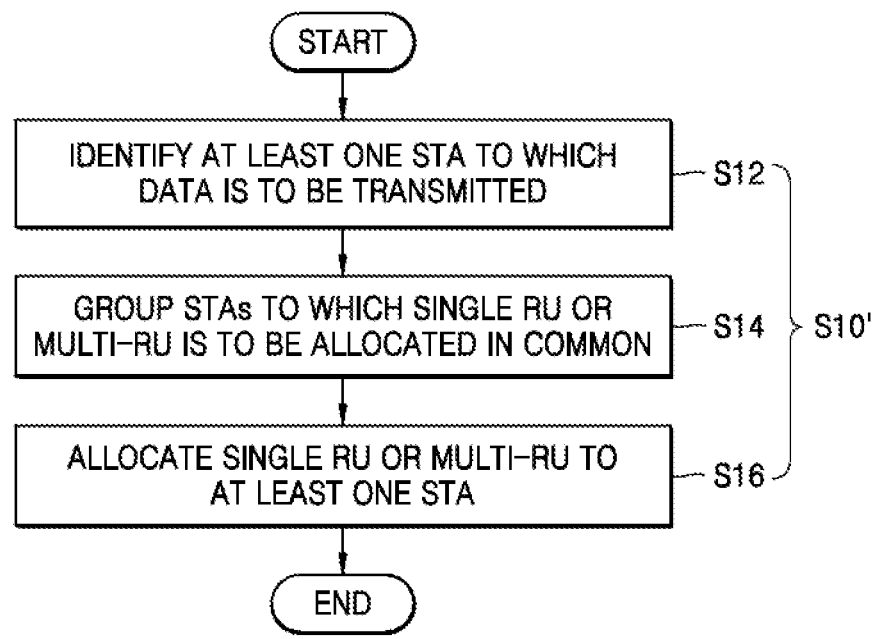
FIG. 22 is a flowchart illustrating a method for communication based on a multi-RU, according to an embodiment.

FIG. 22 is a flowchart illustrating a method for communication based on a multi-RU, according to an embodiment. In detail, the flowchart of FIG. 22 illustrates an example of operation S10 of FIG. 21. As described above with reference to FIG. 21, in operation S10' of FIG. 22, an operation of allocating at least one RU to at least one STA may be performed. As illustrated in FIG. 22, operation S10' may include operation S12, operation S14, and operation S16. Hereinafter, FIG. 22 will be described with reference to FIG. 21.

Referring to FIG. 22, in operation S12, at least one STA to which data is to be transmitted may be identified. As described above with reference to FIG. 1, the AP 10 may communicate with at least one STA with the STA 20 and may identify an STA to which data is to be transmitted.

In operation S14, STAs to which a single RU or a multi-RU is to be allocated in common may be grouped. For example, the AP 10 may determine whether each of the at least one STA identified in operation S12 is allocated to a single RU or a multi-RU. The AP 10 may determine at least one STA which is allocated to the same single RU in common and may group the determined at least one STA into one group. Also, the AP 10 may determine at least one STA which is allocated to the same multi-RU in common and may group the determined at least one STA into one group. Herein, a group including the STAs grouped in operation S12 may be referred to as an STA group.

In operation S16, a single RU or a multi-RU may be allocated to at least one STA. For example, the AP 10 may determine a single RU or a multi-RU which is to be allocated to a group (i.e., an STA group) generated in operation S14. Therefore, each of the at least one STA identified in operation S12 may be allocated to a single RU or a multi-RU allocated to an STA group including the identified at least one STA.

FIG. 23 is a diagram illustrating examples of a multi-RU according to an embodiment. In detail, a second table T2 of FIG. 23 visually shows allocations of multi-RUs defined in EHT.

Referring to FIG. 23, in the second table T2, RU26+RU52 (including RU52+RU26) and RU26+RU106 (including RU106+RU26) may each be defined as a small-size multi-RU. Also, in the second table T2, RU484+RU242 (including RU242+RU484), RU242+RU484 (including RU484+RU242), RU484+RU996 (including RU996+RU484), 2×RU996+RU484 (including RU484+2×RU996), 3×RU996+RU484 (including RU484+3×RU996), and 3×RU996 may each be defined as a large-size multi-RU. A table shared by the AP 10 and the STA 20 of FIG. 21 may define allocations of multi-RUs defined in the second table T2 of FIG. 23 as well as allocations of single RUs defined in the first table T1 of FIG. 20, for communication based on a multi-RU. Hereinafter, various examples of a table defining allocations of multi-RUs will be described with reference to the drawings.

FIGS. 24A to 24C are diagrams illustrating RU allocation indexing according to an embodiment. In detail, FIGS. 24A to 24C show a third table T3 which defines allocations of RUs and includes values of RU allocation subfields respectively corresponding to the allocations of the RUs, and for illustration, the third table T3 is divided in FIGS. 24A to 24C. As shown in FIGS. 24A to 24C, an RU allocation subfield may have a length of 8-bits. Hereinafter, FIGS. 24A to 24C will be described with reference to FIG. 21.

In some embodiments, the number of multiplexed STAs may be limited based on a size of an allocated RU, for defining allocation of a single RU and allocation of a multi-RU by an RU allocation subfield with a limited length. For example, as shown in FIG. 24A, the third table T3 may define a maximum of one multiplexed STA in single RUs and multi-RUs corresponding to less than 106 subcarriers, and the AP 10 may set a maximum of one multiplexed STA in single RUs and multi-RUs corresponding to less than 106 subcarriers. Therefore, as shown in FIGS. 24A and 24B, allocations of RUs including RU26, RU52, and/or RU26+RU52 (including RU52+RU26) may have a maximum of one multiplexed STA.

The third table T3 may define a maximum of four multiplexed STAs in single RUs and multi-RUs corresponding to 106 or more and less than 242 subcarriers. The AP 10 may set a maximum of four multiplexed STAs in single RUs and multi-RUs corresponding to 106 or more and less than 242 subcarriers. Therefore, as shown in FIGS. 24A and 24B, allocations of RUs including one of RU106 and RU106+RU26 (including RU26+RU106) may have a maximum of four multiplexed STAs, and an RU allocation subfield may have one of 16 different values so as to represent allocation of an RU including two of RU106 and RU106+RU26 (including RU26+RU106).

The third table T3 may define a maximum of eight multiplexed STAs in single RUs and multi-RUs corresponding to 242 or more and less than 996 subcarriers, and the AP 10 may set a maximum of eight multiplexed STAs in single RUs and multi-RUs corresponding to 242 or more and less than 996 subcarriers. Therefore, as shown in FIG. 24C, allocation of an RU including RU242 may have a maximum of eight multiplexed STAs. Also, as described below with reference to FIG. 33A, the number of multiplexed STAs may be defined in a separate RU allocation subfield, and thus, a maximum of eight multiplexed STAs may be defined in single RUs and multi-RUs corresponding to 242 or more and less than 996 subcarriers.

The third table T3 may define a maximum of 16 multiplexed STAs in single RUs and multi-RUs corresponding to 996 or more subcarriers, and the AP 10 may set a maximum of 16 multiplexed STAs in single RUs and multi-RUs corresponding to 996 or more subcarriers. As described below with reference to FIG. 33A, the number of multiplexed STAs may be defined in a separate RU allocation subfield, and thus, a maximum of 16 multiplexed STAs may be defined in single RUs and multi-RUs corresponding to 996 or more subcarriers.

FIGS. 25A to 25C are diagrams illustrating RU allocation indexing according to an embodiment. In detail, FIGS. 25A to 25C show a fourth table T4 which defines allocations of RUs and includes values of RU allocation subfields respectively corresponding to the allocations of the RUs, and for illustration, the fourth table T4 is divided in FIGS. 25A to 25C. As shown in FIGS. 25A to 25C, an RU allocation subfield may have a length of 8-bits. Hereinafter, FIGS. 25A to 25C will be described with reference to FIG. 21.

In some embodiments, the number of multiplexed STAs may be limited based on a size of an allocated RU, for defining the allocation of a single RU and allocation of a multi-RU by an RU allocation subfield with a limited length. For example, as shown in FIGS. 25A to 25C, the fourth table T4 may define a maximum of one multiplexed STA in single RUs and multi-RUs corresponding to less than 242 subcarriers, and the AP 10 may set a maximum of one multiplexed STA in single RUs and multi-RUs corresponding to less than 242 subcarriers. Therefore, as shown in FIGS. 25A to 25C, allocations of RUs including RU26, RU52, RU106, RU26+RU52 (including RU52+26), and/or RU26+RU106 (including RU106+RU26) may have a maximum of one multiplexed STA.

Referring to the fourth table T4, when RU26+RU52 is allocated to the STA 20, the AP 10 may select one value from among seven different values (for example, 29, 30, 31, 32, 37, 49, and 51) and may generate an RU allocation subfield with the selected value. When RU52+RU26 is allocated to the STA 20, the AP 10 may select one value from among seven different values (for example, 33, 34, 35, 36, 38, 50, and 51) and may generate an RU allocation subfield with the selected value. When RU106+RU26 is allocated to the STA 20, the AP 10 may select one value from among six or more different values (for example, 39, 40, 41, 42, 43, and 50) and may generate an RU allocation subfield with the selected value. When RU26+RU106 is allocated to the STA 20, the AP 10 may select one value from among six or more different values (for example, 44, 45, 46, 47, 48, and 49) and may generate an RU allocation subfield with the selected value.

The fourth table T4 may define a maximum of eight multiplexed STAs in single RUs and multi-RUs corresponding to 242 or more subcarriers, and the AP 10 may set a maximum of eight multiplexed STAs in single RUs and multi-RUs corresponding to 242 or more subcarriers. For example, as shown in FIGS. 25A to 25C, allocations of RUs including RU242, RU484, RU996, RU484+RU242 (including RU242+RU484), RU484+RU969 (including RU969+RU484), and/or 3×RU969 may have a maximum of eight multiplexed STAs.

Referring to the fourth table T4, when RU484+RU242 (including RU242+RU484) is allocated to the STA 20, the AP 10 may select one value from among 32 different values (for example, 80 to 111) based on the arrangement of RU484+RU242 (including RU242+RU484) and the number of multiplexed STAs, and may generate an RU allocation subfield with the selected value. When RU484+RU969 (including RU969+RU484) is allocated to the STA 20, the AP 10 may select one value from among 32 different values (for example, 112 to 143) based on the arrangement of RU484+RU969 (including RU969+RU484) and the number of multiplexed STAs, and may generate an RU allocation subfield with the selected value. When three RU96s are allocated to the STA 20, the AP 10 may select one value from among 32 different values (for example, 144 to 175) based on the arrangement of three RU969s and the number of multiplexed STAs and may generate an RU allocation subfield with the selected value.

FIGS. 26A to 26C are diagrams illustrating RU allocation indexing according to an embodiment. In detail, FIGS. 26A to 26C show a fifth table T5 which defines allocations of RUs and includes values of RU allocation subfields respectively corresponding to the allocations of the RUs, and for illustration, the fifth table T5 is divided in FIGS. 26A to 26C. As shown in FIGS. 26A to 26C, an RU allocation subfield may have a length of 9-bits. Hereinafter, FIGS. 26A to 26C will be described with reference to FIG. 21.

In some embodiments, the number of multiplexed STAs may be limited based on a size of an allocated RU, for defining the allocation of a single RU and allocation of a multi-RU by an RU allocation subfield with a limited length. For example, as shown in FIGS. 26A to 26C, the fifth table T5 may define a maximum of one multiplexed STA in single RUs and multi-RUs corresponding to less than 106 subcarriers, and the AP 10 may set a maximum of one multiplexed STA in single RUs and multi-RUs corresponding to less than 106 subcarriers. Therefore, as shown in FIGS. 26A to 26C, allocations of RUs including RU26, RU52, and/or RU26+RU52 (including RU52+RU26) may have a maximum of one multiplexed STA.

The fifth table T5 may define a maximum of four or eight multiplexed STAs in single RUs and multi-RUs corresponding to 106 or more and 242 less subcarriers, and the AP 10 may set a maximum of four or eight multiplexed STAs in single RUs and multi-RUs corresponding to 106 or more and 242 less subcarriers. Therefore, as shown in FIGS. 26A to 26C, allocation of an RU including one of RU106 and RU106+RU26 (including RU26+RU106) may have a maximum of four or eight multiplexed STAs, allocation of an RU including two RU106s may have a maximum of 16 multiplexed STAs, and allocation of an RU including RU106 and RU106+RU26 (including RU26+RU106) may have a maximum of 64 multiplexed STAs.

The fifth table T5 may define a maximum of 16 multiplexed STAs in single RUs and multi-RUs corresponding to 242 or more subcarriers, and the AP 10 may set a maximum of 16 multiplexed STAs in single RUs and multi-RUs corresponding to 242 or more subcarriers. Therefore, as shown in FIGS. 26A to 26C, allocation of an RU including RU242 may have a maximum of 16 multiplexed STAs. Also, in some embodiments, as described below with reference to FIG. 33A, the number of multiplexed STAs may be defined in a separate RU allocation subfield, and thus, a maximum of 16 multiplexed STAs may be defined in single RUs and multi-RUs corresponding to 242 or more subcarriers.

FIGS. 27A to 27C are diagrams illustrating RU allocation indexing according to an embodiment. In detail, FIGS. 27A to 27C show a sixth table T6 which defines allocations of RUs and includes values of RU allocation subfields respectively corresponding to the allocations of the RUs, and for illustration, the sixth table T6 is divided in FIGS. 27A to 27C. As shown in FIGS. 27A to 27C, an RU allocation subfield may have a length of 8-bits. Hereinafter, FIGS. 27A to 27C will be described with reference to FIG. 21.

In some embodiments, a table that defines all allocations of multi-RUs defined in EHT may be used. For example, comparing with the third table T3, the fourth table T4, and the fifth table T5 each described above, the sixth table T6 may define all allocations of multi-RUs defined in the second table T2 of FIG. 23. Therefore, as shown in FIG. 27C, the AP 10 may allocate two RU996s to the STA 20, allocate two RU996s and RU484 to the STA 20, allocate three RU996s and RU484 to the STA 20, and allocate three RU996s to the STA 20, with reference to the sixth table T6. Also, as shown in FIGS. 27A to 27C, the sixth table T6 may define a maximum of eight multiplexed STAs in single RUs and multi-RUs corresponding to 242 or more subcarriers, and the AP 10 may set a maximum of eight multiplexed STAs in single RUs and multi-RUs corresponding to 242 or more subcarriers.

FIGS. 28A to 28D are diagrams illustrating RU allocation indexing according to an embodiment. In detail, FIGS. 28A to 28C show a seventh table T7 which defines allocations of RUs and includes values of RU allocation subfields respectively corresponding to the allocations of the RUs, and for illustration, the seventh table T7 is divided in FIGS. 28A to 28D. As shown in FIGS. 28A to 28D, an RU allocation subfield may have a length of 9-bits. Hereinafter, FIGS. 28A to 28D will be described with reference to FIG. 21.

In some embodiments, a table that defines additional allocations of multi-RUs, as well as allocations of multi-RUs defined in ETH, may be used. For example, comparing with the sixth table T6 described above, the seventh table T7 may define allocations of RUs including a multi-RU including central RU26 and RU52 adjacent thereto, and thus, RU26+RU52 (including RU52+RU26) may be more uniformly allocated. With reference to the seventh table T7, the AP 10 may allocate a multi-RU, including central RU26 and RU52 adjacent thereto, to the STA 20, and thus, the STA 20 may process a signal received through a corresponding multi-RU, based on central RU26 which is a DC-tone of a total bandwidth. Therefore, as shown in FIG. 28B, the seventh table T7 may define 20 allocations of RUs including a multi-RU including central RU26, and an RU allocation subfield may represent one of the 20 allocations of the RUs as one of values of 29 to 48. Also, as shown in FIGS. 28A to 28D, the seventh table T7 may define a maximum of eight multiplexed STAs in single RUs and multi-RUs corresponding to 242 or more subcarriers, and the AP 10 may set a maximum of eight multiplexed STAs in single RUs and/or multi-RUs corresponding to 242 or more subcarriers.

FIGS. 29A to 29D are diagrams illustrating RU allocation indexing according to an embodiment. In detail, FIGS. 29A to 29C show an eighth table T8 which defines allocations of RUs and includes values of RU allocation subfields respectively corresponding to the allocations of the RUs, and for illustration, the eighth table T8 is divided in FIGS. 29A to 29D. As shown in FIGS. 29A to 29D, an RU allocation subfield may have a length of 8-bits. Hereinafter, FIGS. 29A to 29D will be described with reference to FIG. 21.

Similar to the seventh table T7 described above, the eighth table T8 may define allocations of RUs including a multi-RU including central RU26 and RU52 adjacent thereto and may define an RU allocation subfield of 8-bits, unlike the seventh table T7, which defines an RU allocation subfield of 9-bits. Like the seventh table T7, as described below with reference to FIG. 33B, the number of multiplexed STAs may be defined based on two or more RU allocation subfields, for defining a maximum of eight multiplexed STAs in single RUs and multi-RUs corresponding to 242 or more subcarriers.

FIGS. 30A to 30C are diagrams illustrating RU allocation indexing according to an embodiment. In detail, FIGS. 30A to 30C show a ninth table T9 which defines allocations of RUs and includes values of RU allocation subfields respectively corresponding to the allocations of the RUs, and for illustration, the ninth table T9 is divided in FIGS. 30A to 30C. As shown in FIGS. 30A to 30C, an RU allocation subfield may have a length of 7-bits. Hereinafter, FIGS. 30A to 30C will be described with reference to FIG. 21.

Similar to the seventh table T7 and the eighth table T8 described above, the ninth table T9 may define allocations of RUs including a multi-RU including central RU26 and RU52 adjacent thereto and may define an RU allocation subfield of 7-bits, which is shorter than 9-bits or 8-bits. As shown in FIG. 30C, the ninth table T9 may define a maximum of eight multiplexed STAs in single RUs and multi-RUs corresponding to 242 or more subcarriers, and the AP 10 may set a maximum of eight multiplexed STAs in single RUs and multi-RUs corresponding to 242 or more subcarriers. To define a maximum of eight multiplexed STAs by using an RU allocation subfield of 7-bits, as described below with reference to FIG. 33A, the number of multiplexed STAs may be defined in a separate RU allocation subfield, and thus, a maximum of eight multiplexed STAs may be defined in single RUs and multi-RUs corresponding to 242 or more subcarriers.

FIGS. 31A to 31C are diagrams illustrating RU allocation indexing according to an embodiment. In detail, FIGS. 31A to 31C show a tenth table T10 which defines allocations of RUs and includes values of RU allocation subfields respectively corresponding to the allocations of the RUs, and for illustration, the tenth table T10 is divided in FIGS. 31A to 31C. As shown in FIGS. 31A to 31C, an RU allocation subfield may have a length of 8-bits. Hereinafter, FIGS. 31A to 31C will be described with reference to FIG. 21.

Similar to the seventh table T7 described above, the tenth table T10 may define a maximum of eight multiplexed STAs in single RUs and multi-RUs corresponding to 242 or more subcarriers, define multi-RUs, including central RU26 and RU52 adjacent thereto, as RU26+RU52 (including RU52+RU26) unlike the seventh table T7, and define an RU allocation subfield of 8-bits. Therefore, the AP 10 may allocate RU26+RU52 (including RU52+RU26), including central RU26, to the STA 20 and may set a maximum of eight multiplexed STAs in single RUs and/or multi-RUs corresponding to 242 or more subcarriers.

Figure 32:
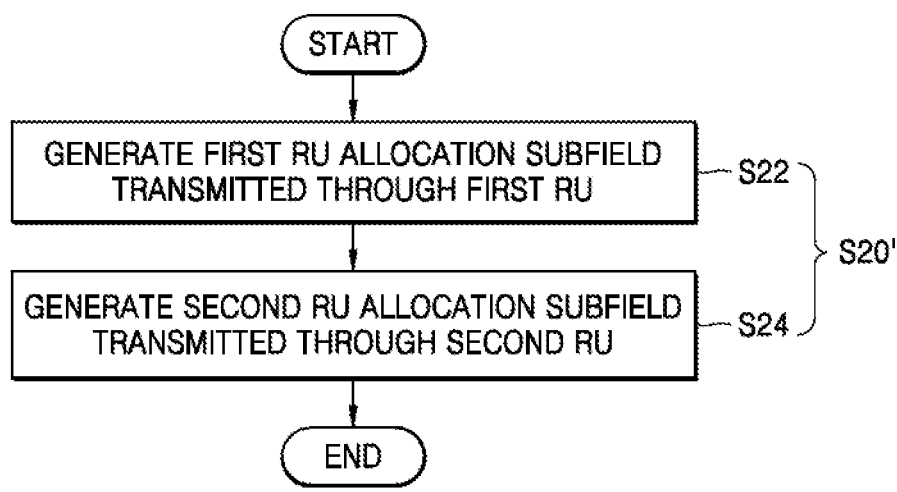
FIG. 32 is a flowchart illustrating a method for communication based on a multi-RU, according to an embodiment.

FIG. 32 is a flowchart illustrating a method for communication based on a multi-RU, according to an embodiment. In detail, the flowchart of FIG. 32 illustrates an example of operation S20 of FIG. 21. As described above with reference to FIG. 21, in operation S20' of FIG. 32, an RU allocation subfield may be generated. As illustrated in FIG. 32, operation S20' may include operation S22 and operation S24. Hereinafter, FIG. 32 will be described with reference to FIG. 21.

Referring to FIG. 32, a first RU allocation subfield transmitted through a first RU may be generated in operation S22, and a second RU allocation subfield transmitted through a second RU may be generated in operation S24. According to HE and EHT, information about allocation of an RU may be signaled at every sub-channel of 20 MHz, and the AP 10 may provide the STA 20 with an RU allocation subfield at every sub-channel of 20 MHz. For example, as a single RU, RU484 may correspond to two RU allocation subfields, and as a multi-RU, RU484+RU242 may correspond to three RU allocation subfields. Therefore, to provide the STA 20 with relatively various allocations of RUs and relatively more multiplexed STAs, the AP 10 may generate two or more RU allocation subfields (for example, a first RU allocation subfield and a second RU allocation subfield) corresponding to a single RU or a multi-RU. For example, each of the first RU allocation subfield and the second RU allocation subfield may define at least a portion of the number of multiplexed STAs in at least one RU and at least one allocation of RU. The STA 20 may combine the first RU allocation subfield and the second RU allocation subfield to identify the allocation of an RU. Therefore, a length (i.e., the number of bits) of an RU allocation subfield may not increase, and various allocations of RUs and the number of multiplexed STAs may be shared by the AP 10 and the STA 20. Examples of an operation of generating the first RU allocation subfield and the second RU allocation subfield so as to define RU allocation will be described below with reference to FIGS. 33A and 33B.

Figure 33A:
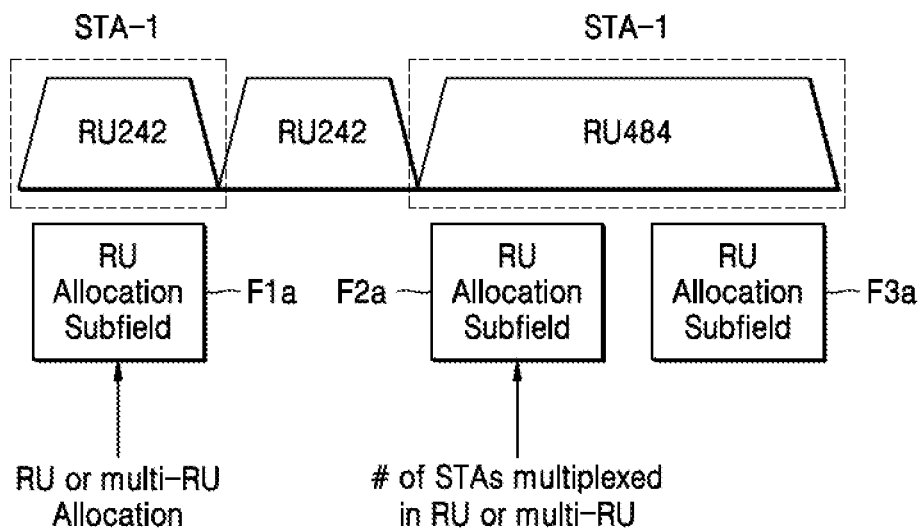
FIGS. 33A and 33B are diagrams illustrating examples which define allocation of a RU based on two or more RU allocation subfields, according to embodiments.
Figure 33B:
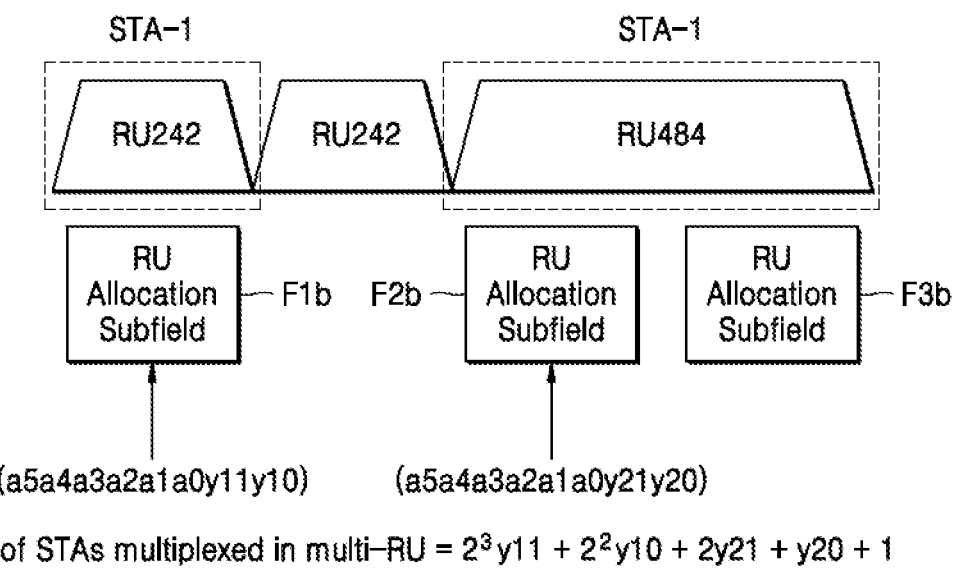

FIGS. 33A and 33B are diagrams illustrating examples that define the allocation of a RU based on two or more RU allocation subfields, according to embodiments. In detail, FIGS. 33A and 33B show an embodiment where RU242, RU242, and RU484 are sequentially allocated and first RU242 and RU484 are allocated to a first STA group STA-1 as multi-RUs in common. As described above with reference to FIG. 22, an STA group may denote a group of STAs to which a single RU or a multi-RU is allocated in common and may include one STA or a plurality of multiplexed STAs. In FIGS. 33A and 33B, the first STA group STA-1 may include a plurality of multiplexed STAs which are allocated to a multi-RU (i.e., RU242+RU484) in common. Hereinafter, an operation of an STA included in the first STA group STA-1 will be described as an operation of the first STA group STA-1, and descriptions which are the same as or similar to the descriptions of FIGS. 33A and 33B are omitted.

Referring to FIG. 33A, the first STA group STA-1 may receive a first RU allocation subfield F1a corresponding to RU242, a second RU allocation subfield F2a corresponding to RU484, and a third RU allocation subfield F3a corresponding to RU484. In some embodiments, an RU allocation subfield may be signaled for each sub-channel corresponding to 20 MHz, and thus, when a single RU or a multi-RU allocated to an STA group has a width which is greater than 20 MHz (i.e., a case which is greater than RU242), an AP may generate two or more RU allocation subfields and may define the allocation of an RU for an STA group based on a combination of two or more RU allocation subfields. For example, as illustrated in FIG. 33A, the AP may generate the first RU allocation subfield F1a defining allocation of an RU including at least one RU (for example, a single RU and/or a multi-RU) and may define the second RU allocation subfield F2a defining the number of multiplexed STAs in at least one RU. In a case where the AP generates an RU allocation subfield of 8-bits with reference to the third table T3 described above, the AP may generate the first RU allocation subfield F1a with 203 (i.e., a binary number '11001011'), generate the second RU allocation subfield F2a with a binary number '00001100' representing 13 multiplexed STAs ($2^3+2^2+1=13\leq16$), and generate the third RU allocation subfield F3a with 217 (i.e., a binary number '11011001'). Also, in a case where the AP generates an RU allocation subfield of 9-bits with reference to the fifth table T5 described above, the AP may generate the first RU allocation subfield F1a with 419 (i.e., a binary number '110100011'), generate the second RU allocation subfield F2a with a binary number '000001100' representing 13 multiplexed STAs ($2^3+2^2+1=13\leq16$), and generate the third RU allocation subfield F3a with 433 (i.e., a binary number '110110001'). Also, in a case where the AP generates an RU allocation subfield of 7-bits with reference to the ninth table T9 described above, the AP may generate the first RU allocation subfield F1a with 84 (i.e., a binary number '1010100'), generate the second RU allocation subfield F2a with a binary number '0000110' representing seven multiplexed STAs ($2^2+2+1=7\leq8$), and generate the third RU allocation subfield F3a with 107 (i.e., a binary number '1101011').

Referring to FIG. 33B, a first STA group STA-1 may receive a first RU allocation subfield F1b corresponding to RU242, a second RU allocation subfield F2b corresponding to RU484, and a third RU allocation subfield F3b corresponding to RU484. In some embodiments, each of the first RU allocation subfield F1b and the second RU allocation subfield F2b may include bits defining the allocation of at least one RU and bits defining some of multiplexed STAs allocated to at least one RU. For example, as illustrated in FIG. 33B, the first RU allocation subfield F1b may include six bits 'a5a4a3a2a1a0' including a most significant bit (MSB) and two bits 'y11y10' including a least significant bit (LSB). Also, the second RU allocation subfield F2b may include six bits 'a5a4a3a2a1a0' which are the same as the first RU allocation subfield F1b, and moreover, may include two bits 'y21y20' including an LSB. Allocation of an RU may be defined based on six upper bits 'a5a4a3a2a1a0' which are included in the first RU allocation subfield F1b and the second RU allocation subfield F2b in common. Also, the number of multiplexed STAs may be defined based on two lower bits 'y11y10' of the first RU allocation subfield F1b and two lower bits 'y21y20' of the second RU allocation subfield F2b, and as illustrated in FIG. 33B, the number of multiplexed STAs may be calculated based on '$2^3$y11+$2^2$y10+2y21+y20+1'. For example, in a case where the AP generates RU allocation subfields of 8-bits with reference to the eighth table T8 described above, the AP may generate '011000' as six upper bits 'a5a4a3a2a1a0' and may generate a binary number '0110' as 'y11y10y21y20' so as to define seven multiplexed STAs ($2^2+2+1=7\leq8$). Therefore, the AP may generate the first RU allocation subfield F1b with a binary number '01100001', generate the second RU allocation subfield F2b with a binary number '01100010', and generate the third RU allocation subfield F3b with 176 (i.e., a binary number '10110000').

Figure 34:
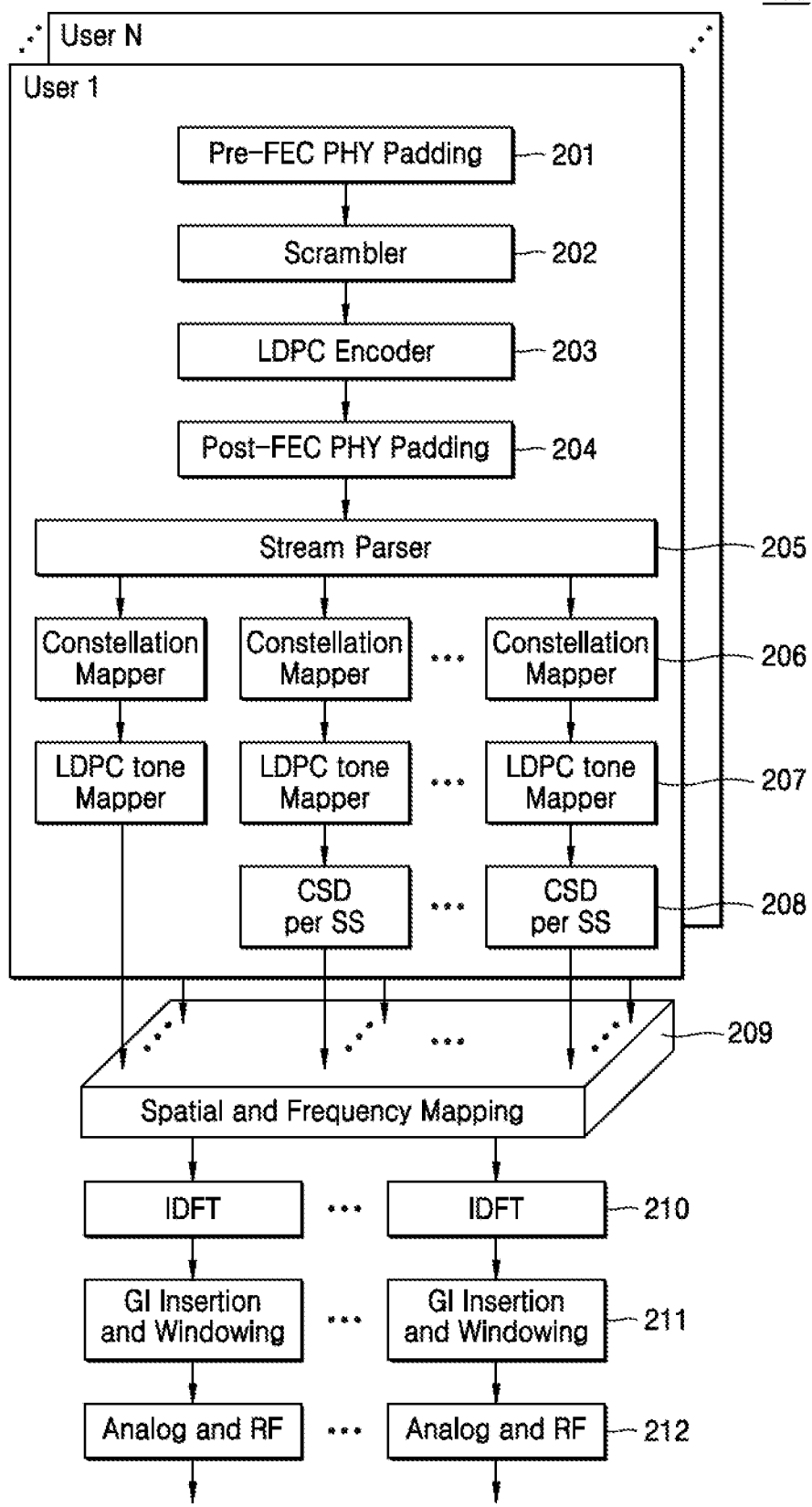
FIG. 34 is a block diagram illustrating a transmitter 200 according to an embodiment.

FIG. 34 is a block diagram illustrating a transmitter 200 according to an embodiment. In detail, the block diagram of FIG. 34 represents the transmitter 200 for multi-user MIMO (MU-MIMO) transmission. In some embodiments, each of the blocks included in the transmitter 200 may correspond to at least one of a program executed by a programmable component, a component providing a fixed-function such as an intellectual property (IP) core, and a reconfigurable component such as field-programmable gate array (FPGA). In FIG. 34, N may correspond to the total number of users.

Referring to FIG. 34, the transmitter 200 may include a pre-fast Ethernet controller (FEC) PHY padding block 201, a scrambler 202, a low-density parity check code (LDPC) encoder 203, a post-FEC PHY padding block 204, a stream parser 205, $N_{SS}$ number of constellation mappers 206, $N_{SS}$ number of LDPC tone mappers 207, $N_{SS}$-1 number of cyclic shift diversity (CSD) blocks 208, a spatial frequency mapping block 209, $N_{TX}$ number of inverse discrete Fourier transform (IDFT) blocks 210, $N_{TX}$ number of guard interval (GI) insertion and windowing blocks 211, and $N_{TX}$ number of analog and radio frequency (RF) blocks 212. Here, $N_{SS}$ and $N_{TX}$ may respectively correspond to the number of space streams and the number of transmission chains.

The pre-FEC PHY padding block 201, the scrambler 202, the LDPC encoder 203, and the post-FEC PHY padding block 204 may convert a PSDU into a sequence of encoded data bits. The stream parser 205 may rearrange the sequence of the encoded data bits in $N_{SS}$ number of data blocks, and one data block may correspond to a specific space stream. Each of the $N_{SS}$ constellation mappers 206 may map bits, encoded and interleaved in a data block, to modulation constellation points. Each of the NSS LDPC tone mappers 207 may drive an LDPC on modulation constellation points, and the NSS-1 CSD blocks 208 may insert cyclic shift except a first space stream.

The spatial frequency mapping block 209 may map, to $N_{TX}$ number of transmission chains, modulation constellation points of $N_{SS}$ number of space streams for a first user and modulation constellation points of $N_{SS}$ number of space streams for an $N^{th}$ user. In some embodiments, as described above with reference to the drawings, the spatial frequency mapping block 209 may allocate an RU to the first user and/or the $N^{th}$ user based on being defined in an RU allocation subfield. Each of the $N_{TX}$ IDFT blocks 210 may convert a modulation constellation point into a plurality of time domain OFDM symbols, in a transmission chain, and each of the $N_{TX}$ GI insertion and windowing blocks 211 may add a circular extension to a head of an OFDM symbol and may smooth edges of the OFDM symbol so as to increase spectral decay. Each of the $N_{TX}$ analog and RF blocks 212 may convert a plurality of time domain OFDM symbols into analog signals transmitted through at least one antenna.

While the inventive concept has been particularly shown and described with reference to embodiments thereof, it will be understood that various changes in form and details may be made therein without departing from the spirit and scope of the following claims.

What is claimed is:

1. A method of wireless communication, the method comprising:
    allocating, by a first device, at least one resource unit (RU) to at least one second device;
    generating an RU allocation subfield defining the allocated at least one RU;
    generating a physical layer protocol data unit (PPDU) including a preamble, wherein the preamble includes the RU allocation subfield; and
    transmitting the PPDU to the at least one second device, wherein the allocating of the at least one RU comprises:
    allocating a single RU or a multi-RU to the at least one second device; and
    setting a maximum of one multiplexed second device in any single RU and in any multi-RU corresponding to less than 242 subcarriers.

2. The method of claim 1, wherein the allocating of the at least one RU further comprises setting a maximum of eight multiplexed second devices in any single RU and in any multi-RU corresponding to 242 or more subcarriers.

3. The method of claim 1, wherein the single RU corresponds to one of a 26-subcarrier RU, a 52-subcarrier RU, a 106-subcarrier RU, a 242-subcarrier RU, a 484-subcarrier RU, and a 996-subcarrier RU, and
    the multi-RU corresponds to one of a set comprising a 26+52-subcarrier RU, a 52+26-subcarrier RU, a 106+26-subcarrier RU, a 26+106-subcarrier RU, a 484+242-subcarrier RU, a 484+996-subcarrier RU, and three 996-subcarrier RUs.

4. The method of claim 1, wherein the allocating of the single RU or the multi-RU comprises allocating a 26+52-subcarrier RU to a second device, and
    the generating of the RU allocation subfield comprises selecting one value from among seven different values based on allocated other RUs, in response to the 26+52-subcarrier RU.

5. The method of claim 1, wherein the allocating of the single RU or the multi-RU comprises allocating a 52+26-subcarrier RU to a second device, and
    the generating of the RU allocation subfield comprises selecting one value from among seven different values based on allocated other RUs, in response to the 52+26-subcarrier RU.

6. The method of claim 1, wherein the allocating of the single RU or the multi-RU comprises allocating a 106+26-subcarrier RU to a second device, and
    the generating of the RU allocation subfield comprises selecting one value from among six different values based on allocated other RUs, in response to the 106+26-subcarrier RU.

7. The method of claim 1, wherein the allocating of the single RU or the multi-RU comprises allocating a 26+106-subcarrier RU to a second device, and
    the generating of the RU allocation subfield comprises selecting one value from among six different values based on allocated other RUs, in response to the 26+106-subcarrier RU.

8. The method of claim 1, wherein the allocating of the single RU or the multi-RU comprises allocating a 484-subcarrier RU and a 242-subcarrier RU to a second device, and
    the generating of the RU allocation subfield comprises selecting one value from among 32 different values based on an arrangement of the 484-subcarrier RU and the 242-subcarrier RU and a number of multiplexed second devices, in response to the 484-subcarrier RU and the 242-subcarrier RU.

9. The method of claim 1, wherein the allocating of the single RU or the multi-RU comprises allocating a 484-subcarrier RU and a 996-subcarrier RU to a second device, and
    the generating of the RU allocation subfield comprises selecting one value from among 32 different values based on an arrangement of the 484-subcarrier RU and the 996-subcarrier RU and a number of multiplexed second devices, in response to the 484-subcarrier RU and the 996-subcarrier RU.

10. The method of claim 1, wherein the allocating of the single RU or the multi-RU comprises allocating three 996-subcarrier RUs to a second device, and
    the generating of the RU allocation subfield comprises selecting one value from among 32 different values based on an arrangement of the three 996-subcarrier RUs and a number of multiplexed second devices, in response to the three 996-subcarrier RUs.

11. The method of claim 1, wherein the allocating of the single RU or the multi-RU comprises:
    allocating two 996-subcarrier RUs to a second device;
    allocating two 996-subcarrier RUs and a 484-subcarrier RU to a second device;
    allocating three 996-subcarrier RUs and a 484-subcarrier RU to a second device; and
    allocating three 996-subcarrier RUs to a second device.

12. The method of claim 11, wherein the allocating of the single RU or the multi-RU comprises allocating a central 26-subcarrier RU and a 52-subcarrier RU adjacent to the central 26-subcarrier RU to a second device.

13. The method of claim 12, wherein the allocating of the at least one RU further comprises setting a maximum of eight multiplexed second devices in a single RU or a multi-RU corresponding to 242 or more subcarriers.

14. The method of claim 12, wherein the allocating of the at least one RU further comprises setting a maximum of four multiplexed second devices in a single RU or a multi-RU corresponding to 484 or more subcarriers.

15. The method of claim 12, wherein the allocating of the at least one RU further comprises setting a maximum of eight multiplexed second devices in a single RU or a multi-RU corresponding to 242 or more subcarriers, and
the generating of the RU allocation subfield comprises:
generating a first RU allocation subfield defining the allocation of the at least one RU; and
generating a second RU allocation subfield, defining number of second devices multiplexed in the at least one RU.

16. The method of claim 12, wherein a 26+52-subcarrier RU and a 52+26-subcarrier RU of allocated multi-RUs comprise the central 26-subcarrier RU.

17. A first device, comprising:
a transceiver configured to transmit a physical layer protocol data unit (PPDU) to at least one second device,
wherein the transceiver comprises a signal processor configured to allocate a single resource unit (RU) or a multi-RU to the at least one second device, to generate a preamble including an RU allocation subfield defining allocated at least one RU, and to generate the PPDU including the preamble, and
wherein the signal processor is configured to set a maximum of one multiplexed second device in any single RU and any multi-RU corresponding to less than 242 subcarriers.

18. The first device of claim 17, wherein the signal processor is configured to set a maximum of eight multiplexed second devices in any single RU and in any multi-RU corresponding to 242 or more subcarriers.

19. A method of wireless communication, the method comprising:
receiving, at a second device, a physical layer protocol data unit (PPDU) from a first device;
extracting an RU allocation subfield from a preamble included in the PPDU; and
identifying an allocation of a resource unit (RU) and a number of multiplexed devices based on the RU allocation subfield, wherein
the identifying of the allocation of the RU and the number of multiplexed devices comprises, when at least one of any single RU and any multi-RU corresponding to less than 242 subcarriers is identified, identifying a maximum of one multiplexed device.

20. The method of claim 19, wherein the identifying of the allocation of the RU and the number of multiplexed devices comprises, when at least one of any single RU and any multi-RU corresponding to 242 or more subcarriers is identified, identifying a maximum of eight multiplexed devices.

* * * * *